United States Patent
DeAndrea

(10) Patent No.: US 10,903,932 B2
(45) Date of Patent: Jan. 26, 2021

(54) METHOD AND APPARATUS FOR HARDWARE-CONFIGURED NETWORK

(71) Applicant: II-VI Delaware, Inc., Wilmington, DE (US)

(72) Inventor: John DeAndrea, New Hope, PA (US)

(73) Assignee: II-VI Delaware, Inc., Wilmington, DE (US)

( * ) Notice: Subject to any disclaimer, the term of this patent is extended or adjusted under 35 U.S.C. 154(b) by 0 days.

(21) Appl. No.: 16/901,772

(22) Filed: Jun. 15, 2020

(65) Prior Publication Data

US 2020/0313791 A1 Oct. 1, 2020

Related U.S. Application Data

(63) Continuation of application No. 16/159,698, filed on Oct. 14, 2018, now Pat. No. 10,721,011, which is a
(Continued)

(51) Int. Cl.
  *H04J 14/02* (2006.01)
  *H04B 10/077* (2013.01)

(52) U.S. Cl.
  CPC ...... *H04J 14/0278* (2013.01); *H04B 10/0773* (2013.01); *H04J 14/0212* (2013.01); *H04J 14/0228* (2013.01); *H04B 2210/074* (2013.01)

(58) Field of Classification Search
  CPC ............... H04J 14/0278; H04J 14/0212; H04J 14/0228; H04B 10/0773; H04B 2210/074
(Continued)

(56) References Cited

U.S. PATENT DOCUMENTS 5,615,034 A 3/1997 Hori
6,369,643 B1 4/2002 Lee et al.
(Continued)

FOREIGN PATENT DOCUMENTS

CN 101103560 A 1/2008
CN 101873513 A 10/2010
(Continued)

OTHER PUBLICATIONS

"Office Action" for Chinese Patent Application No. 201680028574.7, dated Jul. 9, 2019, 7 pages, China National Intellectual Property Administration.
(Continued)

*Primary Examiner* — Mohammad R Sedighian
(74) *Attorney, Agent, or Firm* — Blank Rome LLP

(57) ABSTRACT

A method for configuring hardware-configured optical links includes generating a first optical signal comprising a slow scan of wavelength channels where the slow scan has a dwell time on a particular wavelength channel. A second optical signal is generated comprising a fast scan of wavelength channels, where the fast scan has a dwell time on a particular wavelength channel and a complete channel scan time where the slow scan dwell time is greater than or equal to complete channel scan time. The first optical signal is transmitted over a link and a portion is then detected. A pulse of light having a duration that is less than the dwell time on the particular wavelength channel of the fast scan is then detected. Client data traffic is then sent over the link in response to the detected pulse of light and the detected portion of the first optical signal.

20 Claims, 56 Drawing Sheets

Related U.S. Application Data continuation-in-part of application No. 15/973,829, filed on May 8, 2018, now Pat. No. 10,615,905, which is a continuation of application No. 14/717,958, filed on May 20, 2015, now Pat. No. 9,998,254.

(60) Provisional application No. 62/573,142, filed on Oct. 16, 2017.

(58) Field of Classification Search
USPC .......................................................... 398/79
See application file for complete search history.

(56) References Cited

U.S. PATENT DOCUMENTS

| | | | |
|---|---|---|---|
| 6,728,027 | B2 | 4/2004 | Rapp |
| 6,873,797 | B2 | 3/2005 | Chang et al. |
| 6,940,863 | B2 | 9/2005 | Xue et al. |
| 7,480,103 | B2 | 1/2009 | Huang et al. |
| 7,840,103 | B2 | 11/2010 | Chen et al. |
| 9,444,553 | B2 | 9/2016 | Lee |
| 9,660,754 | B2 | 5/2017 | Dahlfort et al. |
| 9,692,547 | B2 * | 6/2017 | He .................. H04J 14/0295 |
| 9,832,166 | B1 | 11/2017 | Butler et al. |
| 10,148,382 | B1 * | 12/2018 | Olson ............... H04J 14/0282 |
| 10,374,742 | B2 | 8/2019 | Lin et al. |
| 2001/0017723 | A1 | 8/2001 | Chang et al. |
| 2002/0024707 | A1 | 2/2002 | Lee et al. |
| 2002/0131114 | A1 | 9/2002 | Yoo |
| 2002/0191250 | A1 | 12/2002 | Graves et al. |
| 2003/0048725 | A1 | 3/2003 | Lee et al. |
| 2003/0108004 | A1 | 6/2003 | Kolodziej et al. |
| 2004/0122888 | A1 | 6/2004 | Carmichael |
| 2004/0258356 | A1 | 12/2004 | Brice et al. |
| 2005/0163177 | A1 | 7/2005 | Kawanishi et al. |
| 2005/0232635 | A1 | 10/2005 | Aronson et al. |
| 2006/0024064 | A1 | 2/2006 | Hecker et al. |
| 2006/0120727 | A1 | 6/2006 | Lee et al. |
| 2006/0136798 | A1 | 6/2006 | Domagala |
| 2007/0014510 | A1 | 1/2007 | Kusama |
| 2007/0065149 | A1 | 3/2007 | Stevens et al. |
| 2008/0089699 | A1 | 4/2008 | Li et al. |
| 2010/0008677 | A1 | 1/2010 | Conroy et al. |
| 2010/0046944 | A1 | 2/2010 | Wagener et al. |
| 2010/0191911 | A1 | 7/2010 | Heddes et al. |
| 2010/0209114 | A1 | 8/2010 | Gloeckner et al. |
| 2010/0239253 | A1 | 9/2010 | Lin et al. |
| 2010/0329680 | A1 | 12/2010 | Presi et al. |
| 2012/0120851 | A1 | 5/2012 | Noble |
| 2012/0224851 | A1 | 9/2012 | Takara et al. |
| 2012/0301141 | A1 | 11/2012 | Sakamoto et al. |
| 2013/0004174 | A1 | 1/2013 | Lee et al. |
| 2013/0101254 | A1 | 4/2013 | Cai et al. |
| 2014/0010543 | A1 | 1/2014 | Lee |
| 2014/0161449 | A1 | 6/2014 | Doerr |
| 2014/0255032 | A1 | 9/2014 | Gottwald et al. |
| 2014/0376909 | A1 * | 12/2014 | Frisken ............ H04J 14/0276 398/26 |
| 2016/0344508 | A1 | 11/2016 | DeAndrea |
| 2017/0117960 | A1 | 4/2017 | Peng et al. |
| 2017/0155464 | A1 | 6/2017 | He et al. |
| 2017/0171647 | A1 | 6/2017 | Gao |
| 2017/0279554 | A1 | 9/2017 | Lin et al. |
| 2017/0353268 | A1 | 12/2017 | Jung et al. |
| 2018/0062825 | A1 | 3/2018 | Miao et al. |
| 2018/0131462 | A1 | 5/2018 | Yoshida |
| 2018/0175964 | A1 | 6/2018 | Zhao et al. |
| 2019/0069055 | A1 | 2/2019 | Campos et al. |
| 2019/0155066 | A1 | 5/2019 | Zhang et al. |
| 2019/0207702 | A1 | 7/2019 | Van Veen et al. |

FOREIGN PATENT DOCUMENTS

| | | |
|---|---|---|
| CN | 102150385 A | 8/2011 |
| CN | 207766387 U | 8/2018 |
| EP | 2139155 A1 | 12/2009 |
| EP | 3025177 A1 | 7/2013 |
| JP | 2006186760 | 7/2006 |
| JP | 2008-54093 A | 6/2008 |
| JP | 2014-150447 A | 8/2014 |
| WO | 03/069812 A1 | 8/2003 |
| WO | 2013064912 A2 | 5/2013 |

OTHER PUBLICATIONS

"Notice of Allowance" for Japanese Patent Application No. 2017-559853, dated Nov. 1, 2019, 3 pages, Japanese Patent Office, Japan.

"Office Action" for Japanese Patent Application No. 2019-067356, dated Apr. 9, 2020, 6 pages, Japanese Patent Office.

"Office Action" for Chinese Patent Application No. 201680028574.7, dated May 9, 2020, 8 pages, China National Intellectual Property Adminstration.

Effect Photonics develops auto wavelength tuning for efficient DWDM network deployment, Sep. 25, 2018, 3 Pages, Effect Photonics B.V., Eindhoven, The Netherlands.

Liu, et al., A Multichannel WDM-PON System with Port Agnostic Tunable SFP+ Transceiver Modules, 2018, 2 Pages, Zhejiang University CLEO Pacific Rim OSA, Hangzhou, China.

"Second Office Action" for Chinese Patent Application No. 201680028574.7, dated Nov. 29, 2019, 3 pages, China National Intellectual Property Administration, Beijing, China.

"Notification of Transmittal of the International Search Report and the Written Opinion of the International Searching Authority, or the Declaration" for International Patent No. PCT/US2018/055789, dated Feb. 1, 2019, 18 pages, The International Searching Authority/ Korean Intellectual Property Office, Daejeon, Republic of Korea.

'Notification of Transmittal of the International Search Report and the Written Opinion of the International Searching Authority, or the Declaration' for PCT/US2016/03310, dated Aug. 31, 2016, 18 pages, International Searching Authority, Korean Intellectual Property Office, Daejeon, Republic of Korea.

"Notification Concerning Transmittal of International Preliminary Report on Patentability (Chapter I of the Patent Cooperation Treaty)" for International Application No. PCT/US2016/033310, dated Nov. 30, 2017, 15 pages, The International Bureau of WIPO, Geneva, Switzerland.

"Search Report" for European Patent Application No. 16797312.2, dated Jan. 7, 2019, 9 pages, European Patent Office, Munich, Germany.

"Office Action" for Japanese Patent Application No. 2017-559853, dated Jun. 18, 2019, 3 pages, Japanese Patent Office.

\* cited by examiner

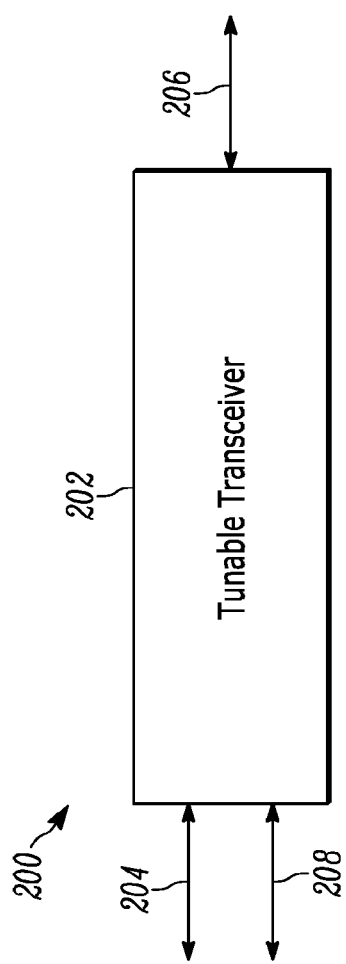

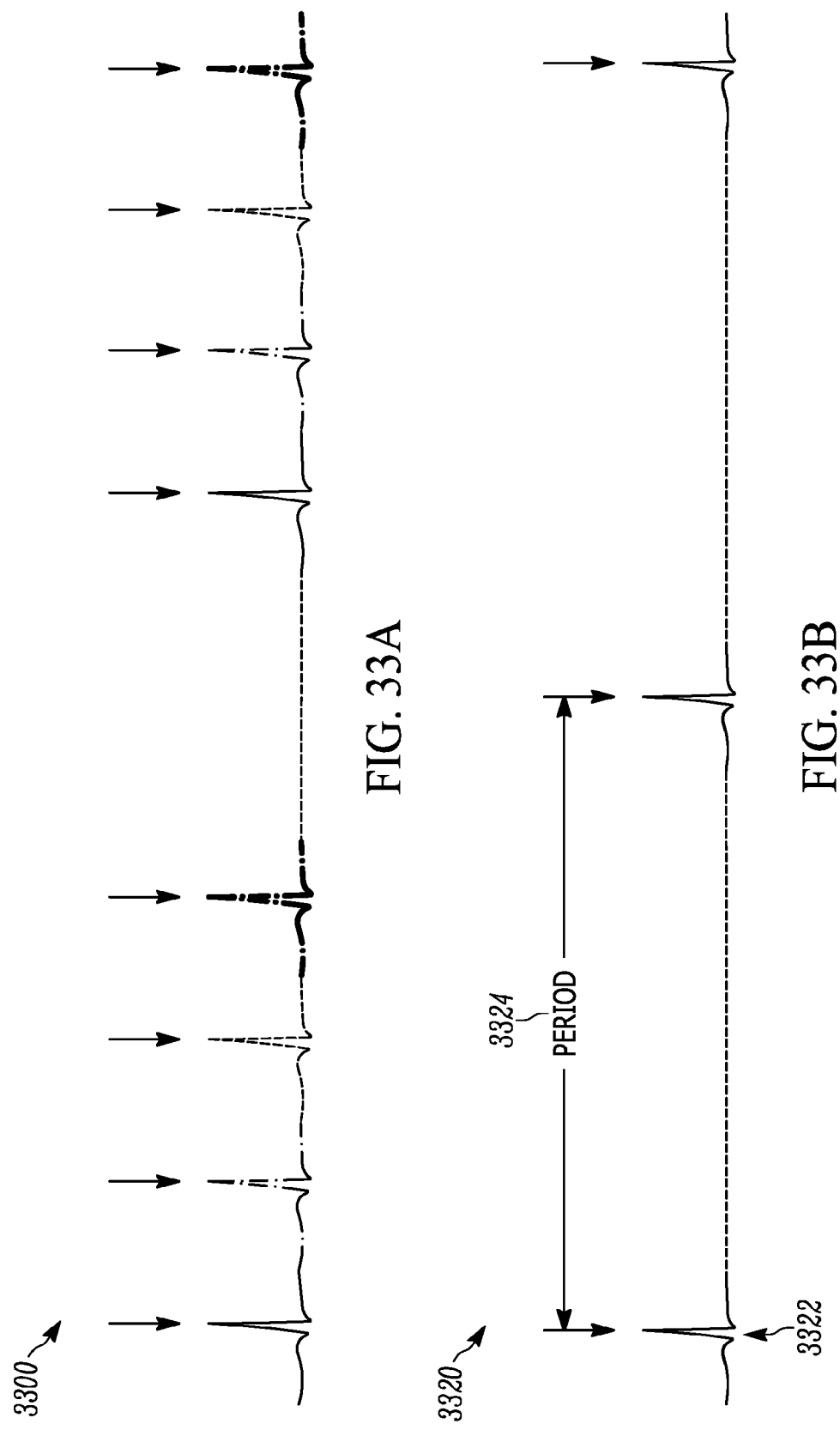

METHOD AND APPARATUS FOR HARDWARE-CONFIGURED NETWORK

CROSS-REFERENCE TO RELATED APPLICATION

The present application is a continuation of U.S. patent application Ser. No. 16/159,698, filed on Oct. 14, 2018, entitled "Method and Apparatus for Hardware Configured Network", which is a continuation-in-part of U.S. patent application Ser. No. 15/973,829, filed on May 8, 2018, entitled "Method and Apparatus for Hardware Configured Network", now U.S. Pat. No. 10,615,905, which is a continuation of U.S. patent application Ser. No. 14/717,958, filed on May 20, 2015, now U.S. Pat. No. 9,998,254, entitled "Method and Apparatus for Hardware Configured Network". U.S. patent application Ser. No. 16/159,698, filed on Oct. 14, 2018, entitled "Method and Apparatus for Hardware Configured Network" also claims priority to U.S. Provisional Application No. 62/573,142, filed on Oct. 14, 2018, entitled "Method and Apparatus for Hardware Configured Network. The entire contents of U.S. patent application Ser. No. 16/159,698, U.S. Pat. Nos. 10,615,905 and 9,998,254, and U.S. Provisional Patent No. 62/573,142 are all herein incorporated by reference.

The section headings used herein are for organizational purposes only and should not to be construed as limiting the subject matter described in the present application in any way.

INTRODUCTION

The increasing need for high capacity data transmissions through optical fibers, together with the increasing number of optical network elements that are being flexibly and dynamically networked together, presents significant challenges to the fiber-optic telecommunications industry. For example, higher capacity demand requires that more transceiver wavelengths be spaced more tightly together in the spectral domain to provide higher capacity on a single fiber or connection. These high-capacity, high-channel-count systems demand more real-time performance data monitoring to control the transceivers. Furthermore, the larger numbers of transceivers needed for these high-capacity, high-channel-count systems demand more automation of transceiver configuration to improve reliability and to reduce human operations. Additionally, configuring networks to include an increased number and variety of optical elements, including transceivers, amplifiers, wavelength filters, wavelength multiplexers, wavelength demultiplexers, cross connects, optical switches, passive splitters, and combiners, demands automation and control schemes that are able to operate across a variety of optical element types.

It is desirable for high-capacity, high-channel-count systems to have automated configurations that allow network elements to self-provision and self-monitor in order to reduce the burden on network operations personnel during network turn-up and during on-going operation. The automation allows larger-scale optical networks to be constructed and operated at lower cost.

It is also desirable for high-capacity, high-channel-count optical communications systems to have dynamic and reconfigurable optical networks that provide improved network flexibility and bandwidth utilization. These optical communications systems often demand real-time configuration in reaction to changing conditions and data traffic demands. In addition, support for dynamic traffic routing requires advanced wavelength and channel monitoring for tuning transceiver and wavelength selective switch (WSS) wavelengths.

Furthermore, scaling optical communications systems to achieve high capacity and high channel counts requires that the enhanced configuration capability be provided within the same or smaller footprint as that of currently deployed optical communications. Therefore, it is desirable for configuration methods and apparatus to re-use and/or rely largely on existing network element components.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. In the drawings, like reference characters generally refer to like features and structural elements throughout the various figures. The drawings are not intended to limit the scope of the Applicant's teaching in any way.

FIG. 2A illustrates a block diagram of an embodiment of a hardware-configured optical element of the present teaching comprising an optical transceiver with a tunable transmitter.

FIG. 33A illustrates a spectral time sequence of a transceiver in the tuning state with no RF modulation according to an embodiment of a method using a connection protocol of the present teaching.

FIG. 33B illustrates a spectral time sequence showing how a transceiver with no RF modulation tunes with a wait time between sequences to avoid collision according to an embodiment of a method using a connection protocol of the present teaching.

DESCRIPTION OF VARIOUS EMBODIMENTS

Figure 1A:
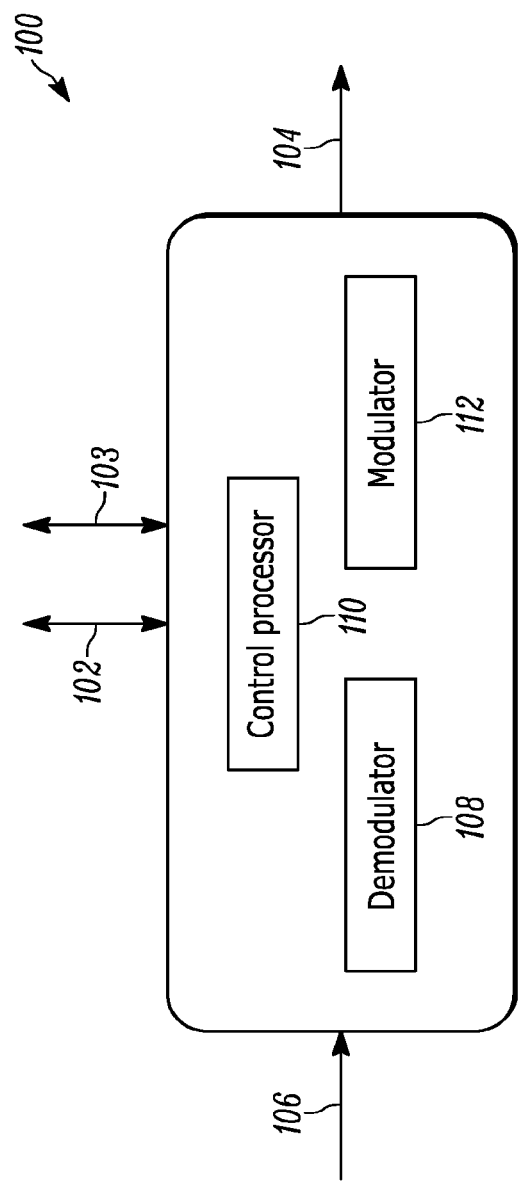
FIG. 1A illustrates a block diagram of an embodiment of a hardware-configured optical element of the present teaching.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the method of the present teachings may be performed in any order and/or simultaneously as long as the teaching remains operable. Furthermore, it should be understood that the apparatus and method of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teaching be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

The terms "element" or "network element" are used herein to describe various devices and optical subsystems used to build and operate optical networks. Some examples of these are transceivers, switches, wavelength selective switches, programmable filters, amplifiers, add drop multiplexers, and cross-connects. The term "component" as used herein describes the optical, mechanical, and electronic components that make up these subsystems. The term "network" describes a plurality of network elements connected to form a group or system of elements that exchange information and operate cooperatively.

When used in connection with networks in this disclosure, the terms "configuration," "configuring," and "configure" are meant to include a variety of network management, control, and operations functions. For example, the term "configure" includes tasks such as element audits, element diagnosis, element performance monitoring, and control of element operating parameters. Some terms of art that should be considered part of the definition of "configure" include network management, network operations, FCAPS (fault management, configuration, accounting, performance, security), and network monitoring and alerting. Network management includes tasks such as configuring, discovering, identifying, and auditing network elements, discovering and reacting to faults or misconfigurations of network elements, and monitoring performance of network elements. In addition, the term "configure" can apply to a single element, or it can apply to a collection of elements operating or intending to operate as a connected system or network. In particular, the term "configuring a network" includes tasks such as network discovery, passive monitoring, and active control of network operation.

State-of-the-art optical network elements are configured largely via the optical client interfaces. Little or no management information is exchanged directly between elements, such as transceivers, wavelength selective switches, amplifiers, and other elements in the optical network. Configuration information is typically sent on a single channel, which limits the amount of management information and the number of network elements that can be configured. A single management or supervisory channel also limits the amount of information available to external network management systems, especially during turn-up operations.

Furthermore, in state-of-the-art optical network configuration systems, a large amount of diagnostic information is sent from network elements to one or more external network management systems or users for processing. The diagnostic information is processed in the external network management system, and instructions are subsequently sent back to the elements to generate network configuration changes. This remote and/or hands-on configuration architecture of known systems limits the scale of the networks that can be configured. This limitation is especially true as the amount of information that is required to be processed from the network elements increases in order to improve element monitoring and/or to provide dynamic element operations. For example, support for dynamic traffic routing requires optical elements that provide significant amounts of real-time data for optical path calculations, including in-line amplifier performance and dynamic path spectral conditions.

Therefore, it is highly desirable to have methods and apparatus for configuring elements in an optical network that are automated, tunable across multiple channels, and that work across a variety of optical elements that constitute the network. The present teaching relates, at least in part, to embodiments of a method and apparatus for transmitting and processing control and management information for a hardware-configured network (HCN). The term "hardware-configured network" as used herein is a networked system of optical and electrical switching and transport elements and components that configure, control, and manage their operations automatically, with little or no user input.

One possible characteristic of a hardware-configured network is that it connects and provisions channels and wavelengths automatically, without a centralized command or user intervention. Another possible characteristic of a hardware-configured network is that it detects and corrects configuration errors without centralized command or user intervention. Yet another possible characteristic of a typical hardware-configured network is that it reconfigures optical elements without a centralized command or user intervention. Examples of configurations performed by hardware-configured networks include element turn up, tuning of tunable elements, programming of programmable optical filter characteristics (such as bandwidth, filter shape, dispersion, and other configurable parameters), setting attenuation levels of wavelength selective switches (WSS), setting gain and gain spectrum on erbium-doped fiber amplifiers (EDFA), configuring ports and wavelengths per port for optical switches and wavelength add-drop multiplexers and cross connects, and optical link establishment. While aspects of the hardware-configured network of the present teaching are described in connection with self-configuration of network elements, one skilled in the art will appreciate that user and/or centralized command or external management systems with access to information and configuration control of the hardware-configured network may also be used in conjunction with self-configuration of network elements.

FIG. 1A illustrates a block diagram of an embodiment of a hardware-configured optical element according to the present teaching. The hardware-configured network of the present teaching transmits control information over the network using a low-frequency modulation that is modulated onto various optical signals traversing the network instead of using a dedicated supervisory optical channel. That is, the optical carrier for the low-frequency modulation used to send and receive control information is some portion of the optical signals propagating in the network. These optical signals being used as the optical carrier in various embodiments of the hardware-configured network of the present teaching can include client data traffic, dummy signals, CW light, and amplified spontaneous emission. The term "optical carrier" as used herein is defined as any light upon which a modulation, which may be a low frequency modulation, is imposed. This definition is broader than other uses of this term in the art. For example, in some applications of optical communications, the term "optical carrier" is used to describe a particular wavelength of light used to carry data, often an ITU-grid-based wavelength from a laser transmitter. In various embodiments, the optical carriers can be generated in the optical element itself or can be an optical carrier that is received from the network.

The hardware-configurable optical element 100 includes an electronic control port 102 for sending and receiving electrical control information. An electronic control port 103 for sending and receiving client data traffic is also included. The hardware-configurable optical element 100 also includes an output port that is coupled to a transmit optical fiber 104 for transmitting optical signals to the optical network and an input port that is coupled to a receive optical fiber 106 for receiving optical signals from the optical network. A demodulator 108 decodes received control information that is received from the receive optical fiber 106, and sends the decoded control information to a control processor 110 that processes the information and then configures the optical element according to the control information.

An optical modulator 112 modulates an optical carrier with transmit control information so that transmit control information can be sent into the optical network. In one method of operation, the optical modulator 112 modulates the optical carrier with a low-frequency modulation representing the transmit control information. The transmit optical control signal is then sent to the network using a transmit fiber 104. In some methods of operation, the transmit optical control signal is imposed directly on a client data signal that serves as an optical carrier, and this combination of modulated optical signals is then transmitted on the transmit fiber 104.

Figure 1B:
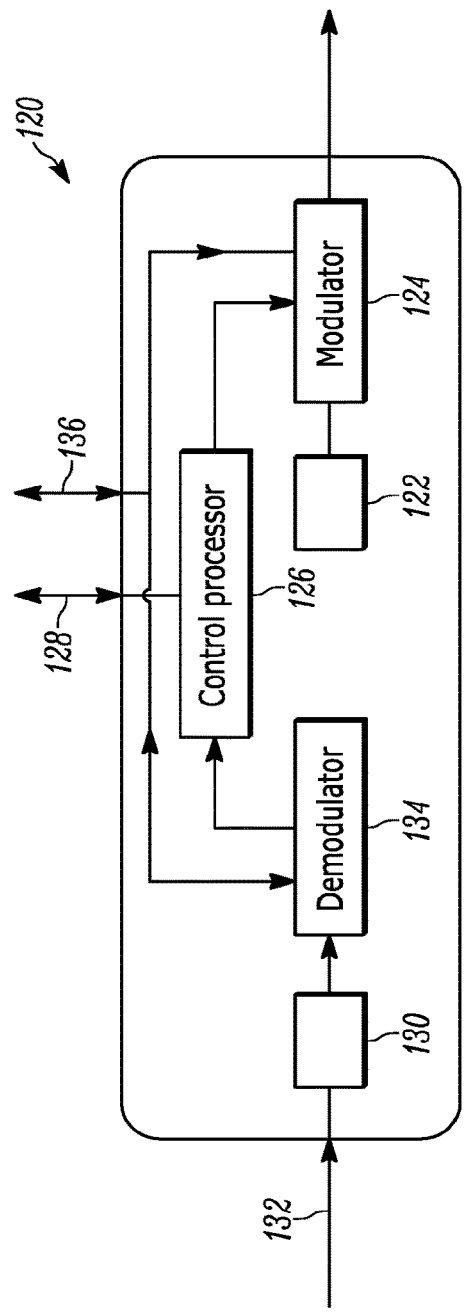
FIG. 1B illustrates a block diagram of an embodiment of a hardware-configured optical element of the present teaching in which the optical carrier signal is generated internal to the optical element.

FIG. 1B illustrates a block diagram of an embodiment of a hardware-configured optical element 120 of the present teaching in which the optical carrier signal is generated internal to the optical element. That is, the optical carrier signal is generated by an optical signal generator 122 internal to the optical element. In some embodiments, the optical signal generator 122 is part of a client transmitter of an optical transceiver element. In some embodiments, this transceiver operates using coherent signaling formats. In some embodiments, the optical transceiver is a tunable coherent transceiver and the optical signal generator is a tunable laser that generates a local oscillator signal. In some embodiments, the optical signal generator 122 includes an optical amplifier and the optical carrier is amplified spontaneous emission. A modulator 124 is used to modulate the optical carrier with control information. In some methods of operation, the control information is generated by a local processor 126. In other methods of operation, the control information is generated by a remote source having an output that is electrically connected to an electronic control port 128. In some embodiments, the optical amplifier gain generated by the optical amplifier that is part of the optical signal generator 122 is controlled by a pump laser. The low-frequency modulation is implemented as a gain change over time. Thus in some embodiments, the modulator 124 is a gain controller. In embodiments that include an optical amplifier that is modulated to add control information, if no optical carrier signals are present, then it is the amplified spontaneous emission from the amplifier that carriers the control information. If, on the other hand, one or more carriers are present, the modulation of the gain imparts the information on each of the one or more carriers. These various carriers may, for example, then follow different paths in the optical network, as they may occupy different wavelength channels that are routed differently. A port 136 for sending and receiving client data traffic is also provided that connects to modulator 124 and demodulator 134. A splitter 130 is used to separate a portion of the input optical signal that includes the receive control signal from the optical network 132. A demodulator 134 decodes the receive control information, and then sends that receive control information to a control processor 126 which configures the hardware-configured element 120 based on the control information provided.

Figure 1C:
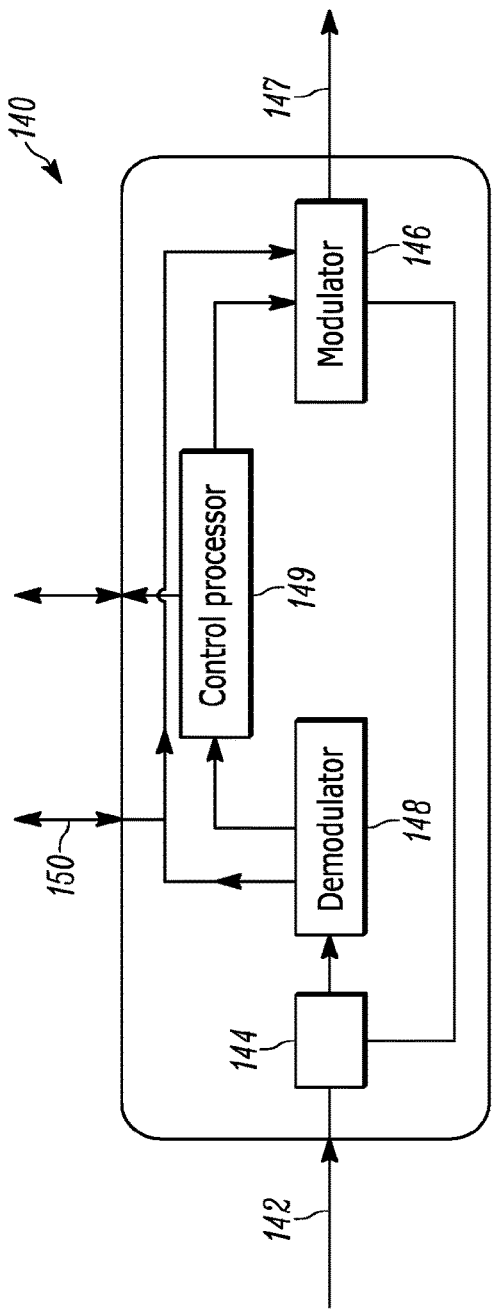
FIG. 1C illustrates a block diagram of an embodiment of a hardware-configured optical element of the present teaching in which the optical carrier signal originates external to the optical element.

FIG. 1C illustrates a block diagram of an embodiment of a hardware-configured optical element 140 of the present teaching in which the optical carrier signal originates external to the optical element. The optical carrier originates from the optical network and arrives on input fiber 142. A portion of the optical signal from the input fiber 142 is separated by a splitter 144 and sent to a demodulator 148. The demodulator 148 decodes the receive control information, and then sends that receive control information to a control processor 149 which configures the hardware-configured element 140 based on the control information provided. A portion of the optical signal is separated by the splitter 144 and sent to an optical modulator 146 that imparts the transmit control information onto the optical carrier in the form of low-frequency modulation. The transmit optical control signal then exits the optical element on transmit fiber 147. A port 150 for client data traffic is also provided that connects to demodulator 148 and modulator 146. In some embodiments, a wavelength selective switch with a photodiode is used as a demodulator 148. In some embodiments, a VOA with a wavelength selective switch is used as a modulator 146.

Figure 1D:
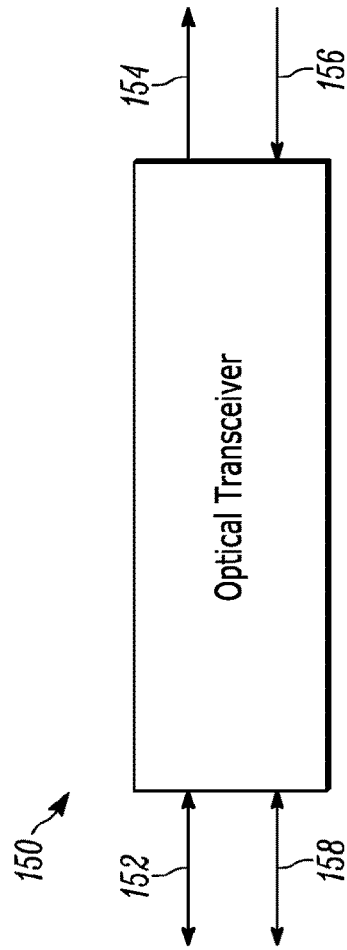
FIG. 1D illustrates a block diagram of one embodiment of a hardware-configured optical element comprising an optical transceiver.

In some embodiments, the optical carrier comprises a client data signal generated by an optical transceiver element upstream of the hardware-configured optical element 140. In some embodiments, the client data signal is generated using a coherent signaling format. In other embodiments, the optical carrier comprises amplified spontaneous emission from an upstream optical amplifier. FIG. 1D illustrates a block diagram of one embodiment of a hardware-configured optical element comprising an optical transceiver 150. The optical transceiver 150 includes an electrical control port 152 for sending and receiving electronic command and control information. Electrical port 158 provides and receives client data traffic. In some embodiments, the electrical control port 152 is an industry standard I2C interface. In other embodiments, the electrical control port 152 uses a multi-master, multi-slave, serial protocol used for embedded system control. The optical transceiver 150 also includes an output that is optically coupled to a transmit optical fiber 154 and an input that is optically coupled to a receive optical fiber 156 that carries the optical signals to the optical transceiver 150. In both the transmit 154 and the receive 156 optical fibers, the optical signals can include one or both of client data traffic and low-frequency control signals. The client data traffic can include network traffic being sent across a network. The low-frequency control signals can include various types of information used to configure the network elements.

Figure 1E:
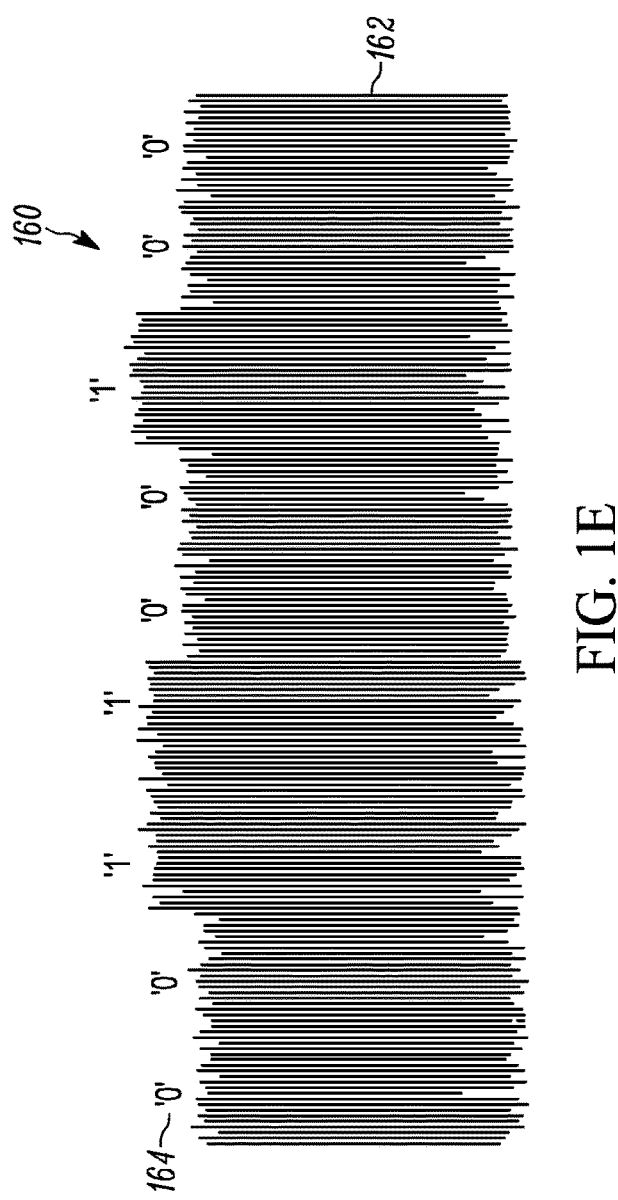
FIG. 1E illustrates an oscilloscope trace of a measured output of the optical transceiver described in connection with FIG. 1D on the transmit fiber.

FIG. 1E illustrates an oscilloscope trace of a measured output 160 of the optical transceiver 150 described in connection with FIG. 1D on the transmit fiber 154. Referring to both FIGS. 1D and 1E, in this embodiment, the optical transceiver 150 generates client data traffic 162 at 10 Gb/s data rate. The client data traffic 162 appears as high and low data levels as a function of time on a relatively long time scale. Modulated control signals 164 use a series of '1's and '0's at a low frequency imposed directly on the optical communications signal that includes the client data traffic 162.

Thus, one aspect of the present teaching is to encode control signals 164 using a series of '1's and '0's at a low frequency imposed directly on the optical communications signal emerging from the transceiver 100. In the embodiment shown in FIGS. 1D and 1E, the control signals 164 are imposed directly on the client data traffic 162 generated by the transceiver 150. In various embodiments, the low frequency "1"s and "0"s can be decoded at a corresponding receiving optical element (not shown) optically coupled to the transmit fiber 154. The low frequency modulation may be amplitude modulation as shown in FIG. 1E. In various other embodiments, the low frequency modulation can be any modulation format, such as phase modulation or frequency modulation.

It is important to note that the client data traffic 162 is not affected by the low frequency modulation. One advantage of encoding control signals using a series of "1"s and "0"s at a low frequency to provide control signals 164 imposed directly on the optical signal emerging from the transceiver 150 is that the frequencies used for the low-frequency modulation are typically not passed through the electrical filters in the receivers that decode the high-data rate of the client data traffic 162. Depending on the details of the modulation, scrambling and coding of the optical signal, baseline wander may set the low-frequency cut-off of these high-pass electrical filters to as low as 100 kHz. Consequently, the frequency of the low-frequency control signal is selected to be below the lowest frequency of the high-pass filtering used in the transceiver, and thus the low-frequency control signal will not impact the integrity of the client data traffic 162. Furthermore, the low-frequency-modulation-based encoding and decoding can be accomplished using relatively low cost, low bandwidth optics and electronics that are well known in the art and widely available. Some embodiments of the hardware-configured network according to the present teaching use optical and electrical components already available in the transceiver 150 elements currently deployed.

Figure 2B:
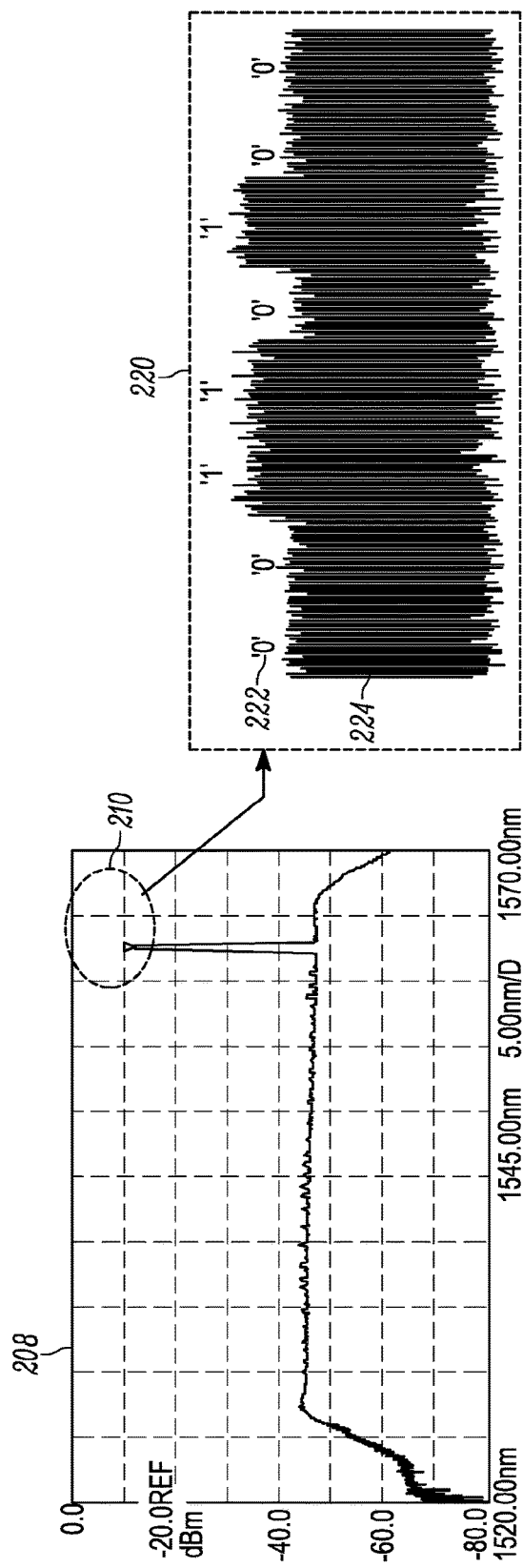
FIG. 2B illustrates an optical spectrum representing the measured output of a tunable transceiver on the transmit fiber according to the present teaching.

FIG. 2A illustrates a block diagram 200 of one embodiment of a hardware-configured optical element comprising an optical transceiver with a tunable transmitter 202. The optical transceiver may also include a detector and receiver. In some embodiments, the detector and receiver may be an LO detector and receiver that can process signals from the link. In some embodiments, this tunable transmitter 202 also includes a receiver with a detector that also may include a local oscillator detector for coherent detection of incoming signals. Some embodiments use two LO lasers, one for transmit and one for receive, and some embodiments use one LO laser that is used for both transmit and receive. The tunable transceiver 202 includes an electrical control port with an electrical input 204 for sending and receiving command and control information. In addition, a port 208 is used to input client data traffic. In some embodiments, the input port 208 used to input client data traffic may be the same input port as the electrical input 204 for sending and receiving command and control information. The input port 208 may be an electrical port. In some embodiments, the tunable transceiver 202 generates optical signals using coherent modulation formats, and receives signals using a coherent receiver. In some embodiments, the electrical control port 204 is an industry standard I2C interface. In other embodiments, the electrical control port 204 uses a multi-master, multi-slave serial protocol used for embedded system control. The tunable transceiver 202 includes an output that is optically coupled to a transmit and receive fiber 206. The transmit and receive fiber 206 provides optical signals to and from an optical link for both the communication of data signals and control signals of the present teaching. Signals received from the receive fiber 206 are detected by the detector and receiver that may be an LO detector and receiver that can process signals from the link FIG. 2B illustrates an optical spectrum 208 representing the measured output of a tunable transceiver on the transmit fiber 206 according to the present teaching. The optical spectrum 208 indicates that the tunable laser in the tunable transceiver 202 generates a modulated signal on a particular wavelength channel 210. In one particular embodiment, the tunable transceiver 202 wavelength or channel can be set and adjusted across a wavelength range from 1528 nm to 1567 nm.

Referring to both FIGS. 2A and 2B, in this embodiment, the optical transceiver 200 is generating client data traffic 224 at a 10 Gb/s data rate, which is shown as high and low data levels as a function of time with a relatively long time scale of the oscilloscope trace 220 of the measured modulated signal on a particular wavelength channel 210. The control and management information for configuring the network is encoded as a series of '1's and '0's 222 at a low frequency imposed directly on the client data traffic 224. In some methods of operation according to the present teaching, the typical output power for the tunable transceiver 202 is in the 0-3 dbm range, which corresponds to about 1-2 mW. Also, in some methods of operation the low-frequency encoded modulation format is a low frequency power variation of the tunable laser channel, thus operating at the wavelength of the laser channel set point. In addition, in some methods of operation, the modulation depth of the low-frequency modulation is between about 0.5% and 10%. In some embodiments the low frequency modulation is 5% or below. In various embodiments, the client data traffic 224 uses various known modulation formats. For example, the client data traffic 224 may utilize coherent modulation.

Figure 2C:
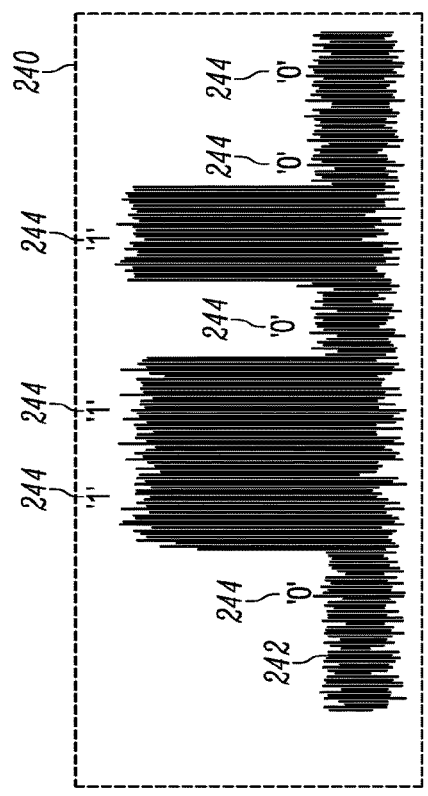
FIG. 2C illustrates a long-time-scale oscilloscope trace of low frequency modulation measured at an output of a tunable transceiver on the transmit fiber according to the present teaching.

One feature of the present teaching is that the low frequency modulation can exhibit high-extinction low frequency modulation. For example, the transceiver of FIG. 2A may be turned on and off at a low frequency. In this case, the control signal "zero" will be when the transceiver is turned off, and the low frequency "one" will be when the transceiver is turned on. FIG. 2C illustrates a long-time-scale oscilloscope trace 240 of low frequency modulation measured at an output of a tunable transceiver on the transmit fiber according to the present teaching. The transceiver client data traffic 242 is generated at a 10 Gb/s data rate. The control and management information for configuring the network is encoded as a series of '1's and '0's 244 at a low frequency imposed directly on the client data traffic 242 and is shown as high and low data levels as a function of time with a relatively long time scale of the oscilloscope trace 240. In this embodiment, the extinction of the low frequency modulation is very high, however, the frequency of the low-frequency control signal is selected to be below the lowest frequency of the high-pass filtering used in the transceiver, and thus the low-frequency control signal will not impact the integrity of the client data traffic 242.

Thus, one feature of the hardware-configured network according to the present teaching is that the control information is encoded on a tunable transmitter signal so the wavelength carrying the encoded control information is tunable based on the tuning configuration of the tunable transmitter. Consequently, by tuning the wavelength of the signal carrying the encoded information, the destination of the encoded control information can be changed based on the particular wavelength paths that are configured in the optical network. For example, the configurations of the wavelength switches, filters, and amplifiers that comprise the optical network establish wavelength paths from source to destination in an optical network. The wavelength paths from various sources to various destinations may also change based on reconfigurations of network elements. The source wavelength may be tuned to follow a desired wavelength path to a particular destination or set of destinations, and, therefore, a low-frequency control signal imposed on the optical signal at that source wavelength will provide encoded control information to that particular destination or set of destinations. The destination of the low frequency control signal, therefore, can be changed by simply tuning the laser wavelength of the tunable transceiver. This ability to select the wavelength carrying the low-frequency modulated control signal allows the encoded control information from one network element to potentially reach any of various different elements in the network by selecting the particular wavelength path.

Another feature of the hardware-configured network according to the present teaching is that the low-frequency encoding of the control signal on a particular wavelength has no effect on other wavelengths propagating in the optical fiber or in the entire optical network.

Figure 3A:
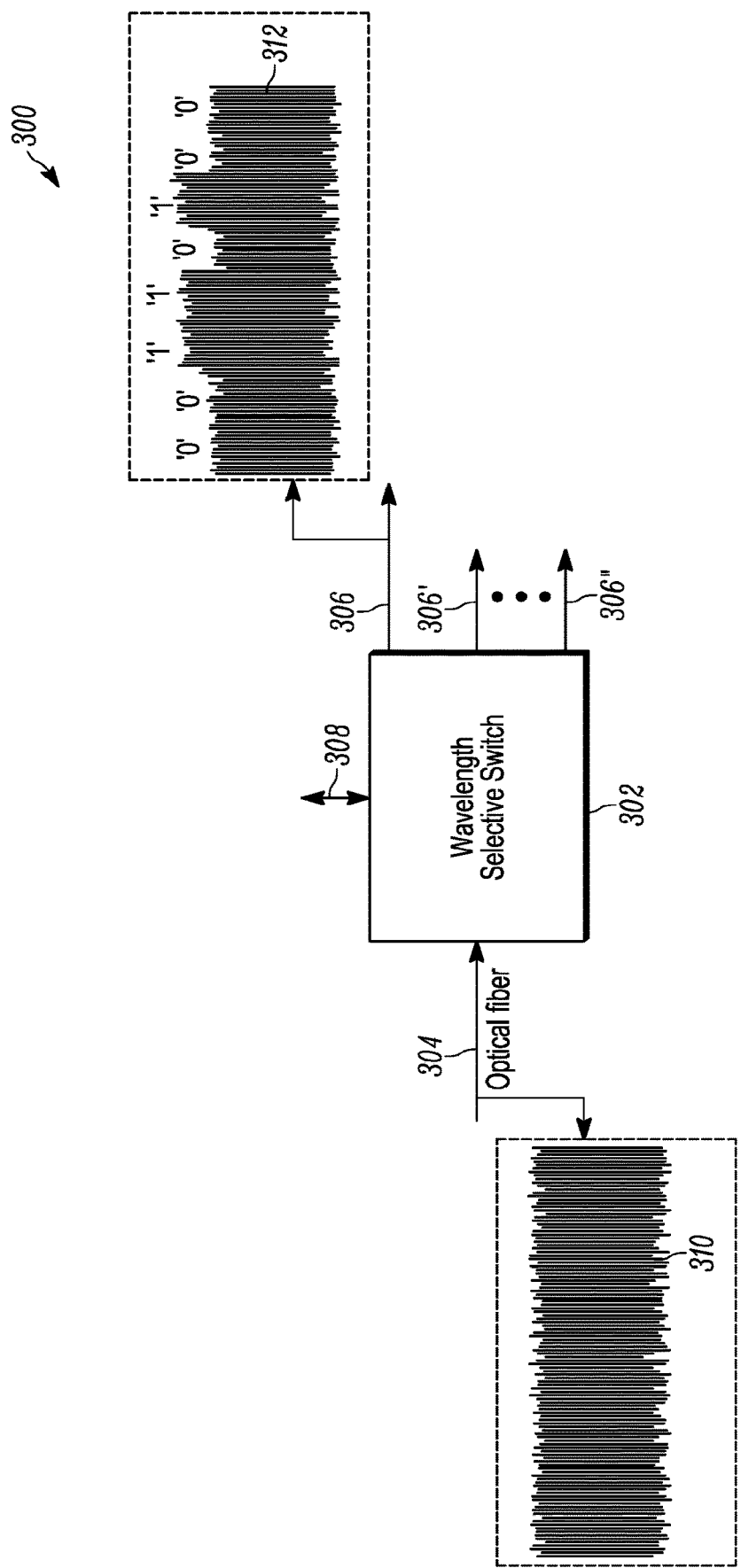
FIG. 3A illustrates an embodiment of a hardware-configured network element according to the present teaching that includes a wavelength selective switch.

FIG. 3A illustrates an embodiment of a hardware-configured optical element 300 according to the present teaching that includes a wavelength selective switch 302. In some embodiments according to the present teaching, the wavelength selective switch 302 is a standard commercially available wavelength selective switch 302 with no special modifications. Wavelength selective switches are widely available in a range of port configurations and channel plans, and are currently being used in state-of-the-art optical networks. Wavelength selective switches, such as the wavelength selective switch manufactured by Finisar Corporation, provide a highly programmable and flexible switching platform that switches traffic from one optical link to another optical link across multiple wavelengths in the same network. However, a wavelength selective switch according to the present teaching can be constructed to have additional features according to the present teaching. In one embodiment of the present teaching, the wavelength selective switch 302 includes one or more low frequency photodiodes for directly detecting encoded control data.

Furthermore, wavelength selective switches used in the hardware-configured network according to the present teaching are bi-direction and can operate equivalently in both directions. Thus, one aspect of the present teaching is that the wavelength selective switch 302 can also receive and decode control signals from other optical elements in the network as well as transmit and encode control signals intended for other optical elements in the network.

The hardware-configured optical element 300 comprises a wavelength selective switch 302 with at least one optical input that is optically connected to receive optical fiber 304 and a plurality of optical outputs that are optically connected to a plurality of transmit optical fibers 306, 306', 306". The wavelength selective switch 302 also has an electrical control port 308. In some methods of operation according to the present teaching, the receive optical fiber 304 propagates optical signals on one or a plurality of wavelengths. Referring back to FIGS. 2A, 2B, the optical signals may include client data traffic originating from a tunable optical transceiver 202.

FIG. 3A illustrates client data traffic 310 on the receive fiber 304. One function commonly performed by the wavelength selective switch 302 is changing attenuation of received light signals in response to electronic control signals, and generating an amplitude modulated signal from that changing attenuation. The result is a low frequency modulation imposed on the optical signals that are received on the optical inputs of the wavelength selective switch 302 that can be independently imposed on the optical signals at any or all of the wavelengths or channels passing through the wavelength selective switch 302.

FIG. 3A also illustrates the client data traffic 310 with a low frequency control signal 312 in the form of a series of '1's and '0's encoded by the electronic control signals. Note that the integrity of the client data traffic 310 is not affected by the low frequency control signal. The low frequency control signal is imposed selectively on the desired wavelength channels that are routed to any of the plurality of transmit fibers 306, 306', 306" using an electronic control signal that selectively controls the attenuation of particular wavelength channels of the wavelength selective switch 302.

Figure 3B:
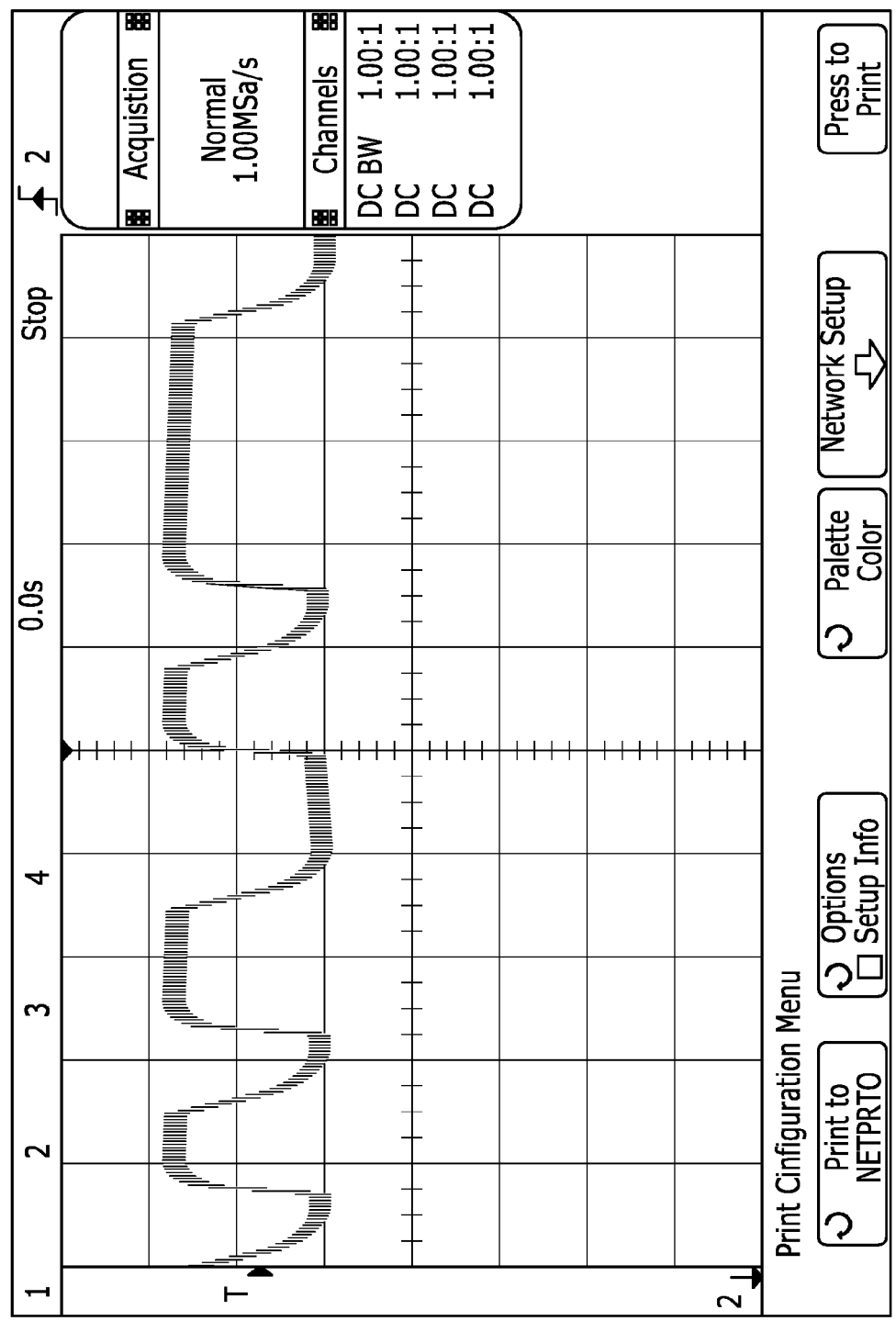
FIG. 3B illustrates an oscilloscope trace of a measured output of a wavelength selective switch showing a low-frequency control signal according to the present teaching.

The low frequency control signal in the form of a series of '1's and '0's 312 generated by the wavelength selective switch 302 can be filtered to eliminate the high frequency signal from the client data traffic, as shown in the oscilloscope trace 350 illustrated in FIG. 3B. FIG. 3B illustrates an oscilloscope trace 350 of the measured output of the wavelength selective switch 302 showing a low-frequency control signal according to the present teaching. The measured output is measured at the receive fiber 306 with the client data traffic filtered according to the present teaching. The result is a first signal level for the '1's resulting from low attenuation through the wavelength selective switch 302 and a second lower signal level for the '0's resulting from higher attenuation through the wavelength selective switch 302. The data rate for the filtered control signal can be relatively low. For example, the data rate of the low frequency control signal can be on the order of about 5 bits/s below the client traffic rate.

Figure 4:
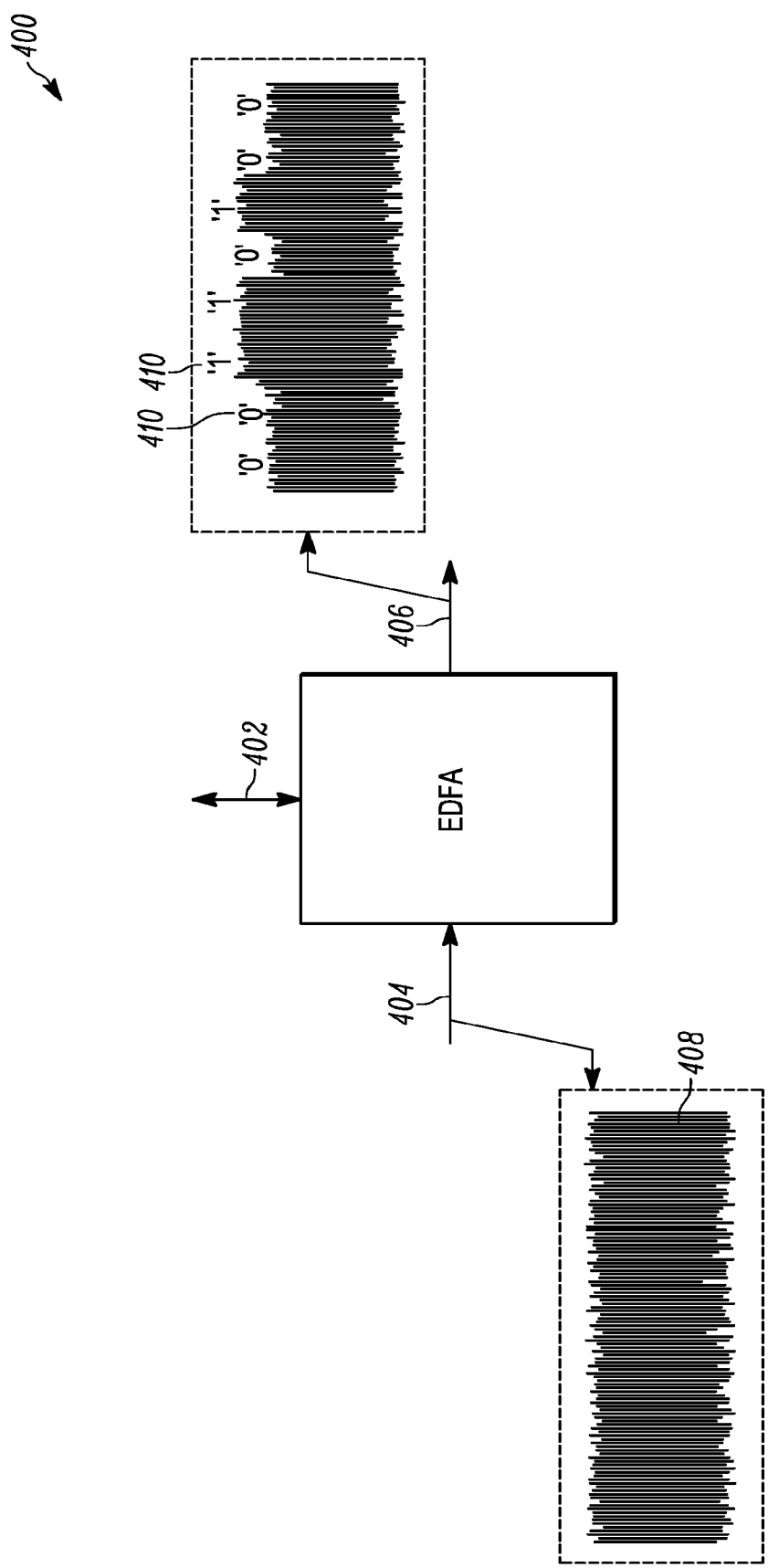
FIG. 4 illustrates a block diagram of one embodiment of a hardware-configured optical element including an optical amplifier according to the present teaching.

FIG. 4 illustrates a block diagram of one embodiment of a hardware-configured optical amplifier 400 according to the present teaching. In the embodiment shown, the hardware-configured optical amplifier 400 is an erbium-doped fiber amplifier (EDFA), which is a commonly used optical amplifier in modern optical communications systems. One skilled in the art will appreciate that numerous other types of optical amplifiers can be used, including Raman and/or Raman/EDFA combinations. The optical amplifier 400 includes an electrical control port 402 configured for sending and receiving electrical command and control information. The optical amplifier 400 also includes an optical input port that is coupled to a receive optical fiber 404 that provides the optical signal to be amplified and an optical output port that is coupled to a transmit optical fiber 406 that transmits the amplified optical signal, which may also include a low-frequency control signal, according to the present teaching.

FIG. 4 also illustrates an oscilloscope trace of input client data traffic 408 provided by the receive fiber 404 to be amplified by the optical amplifier 400. In this embodiment, the client data traffic 408 is modulated at, for example, a 10 Gb/s data rate. The optical amplifier 400 changes the attenuation of the received light signals and generates a low-frequency amplitude modulated control signal 410.

In the embodiment shown in FIG. 4, configuration information is encoded onto the low-frequency modulated control signal using electronic control signals provided by the control port 402. The configuration information data in the low-frequency amplitude modulated control signal 410 is encoded as a series of '1's and '0's using low frequency modulation imposed on the client data traffic 408, as shown in FIG. 4. The integrity of the client data traffic 408 is not affected by the low-frequency amplitude modulated control signals because the amplitude modulation depth of the low frequency modulation is small relative to the modulation depth of the client data traffic. In addition, the integrity of the client data traffic 408 is not affected by the low-frequency amplitude modulated control signals because the frequency of the low-frequency modulation is too low to pass through the receive filters of the client data traffic.

As described herein, one feature of the hardware-configured network of the present teaching is that the integrity of the client data traffic 408 is not affected by the small amount of low frequency modulation imparted by the optical amplifier 400. In some embodiments, the amplitude modulation imparted by the optical amplifier 400 provides low frequency modulation to the entire spectral bandwidth of the optical amplifier 400. In other words, all the channels amplified by the optical amplifier experience substantially the same low frequency modulation. In these embodiments, all the channels passing through the optical amplifier 400 receive the same encoded information from an electronic control signal. However, in other embodiments of the present teaching, the optical amplifier 400 has gain control that is capable of controlling the gain for specific channels or bands of channels passing through the optical amplifier 400. In these embodiments, the control signal is encoded on a selection of one or more channels, wavelengths or bands passing through the optical amplifier 400. In some embodiments, the modulation is encoded by modulating the power of a pump laser that controls the gain of the amplifier 400.

One feature of the present teaching is that the low frequency control signals can be imposed on existing optical signals of various types. For the embodiments illustrated in connection with FIGS. 1D-1E and 2, the existing light signal comprises client data traffic that originates from a transceiver element. In some embodiments, the existing light signal comprises no live data traffic. For example, the existing optical signal can include a dummy communication data signal. In other embodiments, the existing optical signal comprises the CW output of an optical transceiver or amplified spontaneous emission from an optical amplifier.

Also, in some embodiments, the existing optical signal originates from the same optical element that imposes the electronic control information on the existing light signal. In other embodiments, the existing optical signal originates from other optical elements upstream from the optical element that imposes the electronic control information on the existing light signal. In some embodiments, the electronic control information from one or more separate elements connected in the network is imposed on the same existing optical signal. In some embodiments, an electronic control port provides the configuration information for the optical control signal. In some embodiments, a processor in the optical network element provides the configuration information for the optical control signal. In some embodiments the configuration information for a transmit optical control signal provided by a processor in the optical network element is generated based on a received optical control signal.

In one embodiment of the present teaching, the hardware-configured optical element comprises a counter-propagating Raman pump unit and a variable gain (VG) optical amplifier, such as a variable gain EDFA optical amplifier. The Raman pump unit and variable gain optical amplifier can be integrated to provide very low noise figure and excellent gain flatness, which are to characteristics that are highly desirable for ultra-long haul optical communications systems. State-of-the-art optical amplifier modules can currently support up to three Raman/EDFA pump optical amplifiers in various configurations.

In embodiments using Raman pump units and variable gain optical amplifiers, fast automatic gain control (AGC) circuitry can be used to provide a high degree of transient suppression that allows the optical amplifier to keep the gain constant during operating conditions where there are fast and large changes in the input power that are independent of the amplified stimulated emission (ASE) produced by the Raman pump optical amplifier. Suitable variable gain dual-stage erbium-doped fiber amplifiers that provide flattened gain across the C-band with low noise figure and a large dynamic gain range (up to 15 dB) are commercially available from Finisar Corporation. In some embodiments, the optical amplifier includes features such as comprehensive transient control, tunable mid-stage access (MSA) loss, and gain tilting functionality that all may be used, together or separately, to control attenuation through the device to impose the low frequency modulation on the existing optical signals.

One feature of the present teaching is that the hardware-configured optical elements provide means for transmitting configuration information to elements in a network that includes numerous hardware-configured optical elements. The method and apparatus of the present teaching are compatible with existing and deployed optical elements in known networks, and can be readily implemented using known low-frequency modulation techniques and known methods of information processing. Compatible existing networks include industry-standard data communications and telecommunications networks, such as large service provider networks and enterprise networks, as well as private networks and purpose-built network systems, such as those used for industrial control. In some embodiments of the present teaching, the configuration information, or control signal, is exchanged between optical elements in a point-to-point manner. In other embodiments, the configuration information is exchanged between optical elements in a broadcast manner or a multi-cast manner to some or all of the optical elements on the network. In yet other embodiments, the configuration information is exchanged in a multi-point manner or a cascade manner. In various embodiments, any combination of these means for exchanging configuration information or control signal information between optical elements can be used.

Another feature of the hardware-configured network comprising the hardware-configured optical elements of the present teaching is that known communications protocols and known management information protocols may be used to configure network elements. That is, known systems of rules for collecting information from and configuring network element can be used. These protocols include data communication, telecommunication transport, and management protocols that are used, for example, to manage data format, addressing, routing, error and fault management, flow and sequence control, and other known management elements and functions. In various embodiments, these protocols comprise embedded systems, real-time systems, and computer bus protocols.

Figure 5:
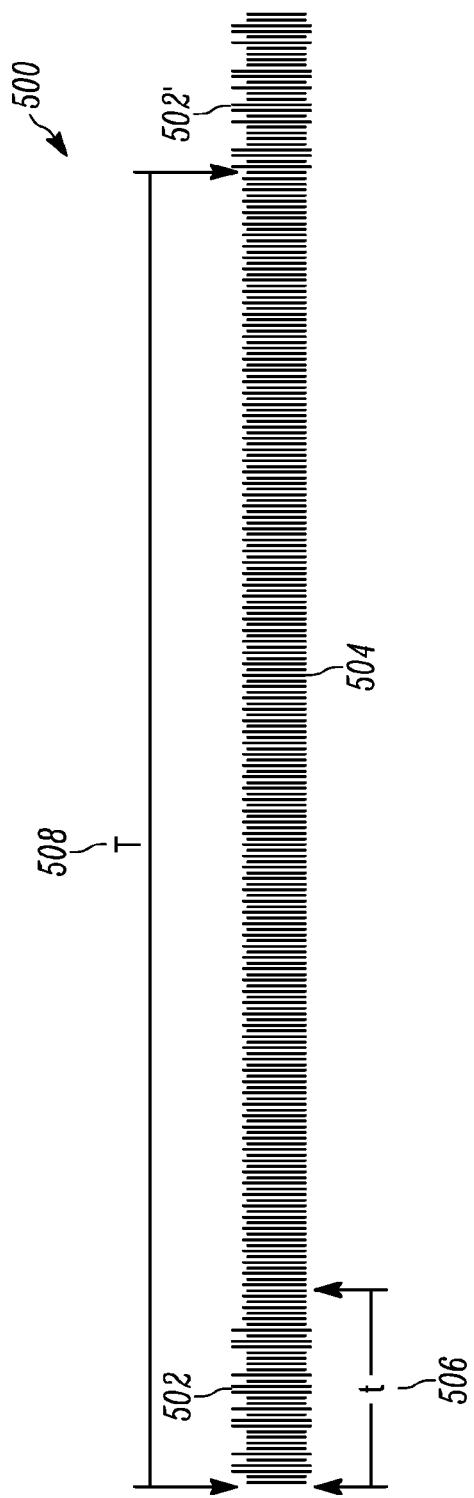
FIG. 5 illustrates an oscilloscope trace of a low frequency control signal according to the present teaching comprising a collision avoidance protocol based on modification to the well-known Ethernet protocol.

FIG. 5 illustrates an oscilloscope trace of a low frequency control signal 500 according to the present teaching comprising a collision avoidance protocol based on modification to the well-known Ethernet protocol. The low frequency control signal 500 shown in FIG. 5 includes a protocol that is suitable for multi-point communication. The encoded control information is transmitted in "bursts", shown as the regions 502, 502', where modulated '1's and '0's appear on the client data traffic 504. The burst duration, shown as time t 506, is small in comparison to the retransmission time T 508. In some embodiments, the ratio of t/T is 0.1, such that the packet time is only 10% of the retransmission time. Each transceiver utilizes a random percent of the retransmission time for the packet burst in order to avoid potential collisions of packets that are sent from different transmitters and improve reliability of decoding at the receiver. In other words, the t/T for various transmitters is randomly chosen.

One aspect of the present teaching is that the optical elements in the hardware-configured network can be arranged in any network configuration, including mesh, point-to-point, ring, bus, tree, and other known configurations. Furthermore, the optical elements of the hardware-configured networks of the present teaching may include several different element types, including transceivers, amplifiers, optical channel monitors (OCM), wavelength selective switches, wavelength division multiplexed (WDM) multiplexers and WDM demultiplexers, cross connects, and optical switches. Thus, the configuration system of the present teaching supports a large number of network topologies, network sizes and scopes, and network services.

Another aspect of the present teaching is that a heterogeneous combination of optical network elements, including transceivers, amplifiers, optical channel monitors, wavelength selective switches, multiplexers/demultiplexers, cross-connects and optical switches can be configured with a common configuration scheme, as described herein.

Figure 6:
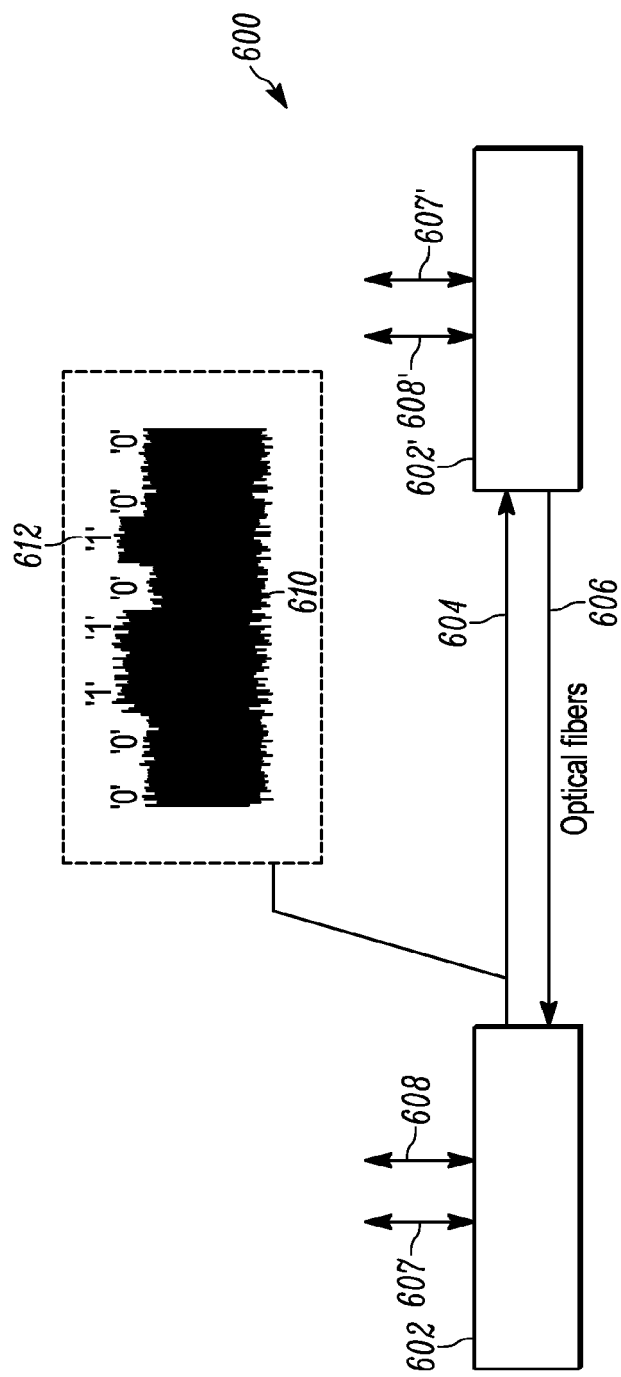
FIG. 6 illustrates an embodiment of a hardware-configured network of the present teaching in a point-to-point transceiver topology, sometimes referred to in the art as an optical link.

FIG. 6 illustrates an embodiment of a hardware-configured network of the present teaching in a point-to-point transceiver topology, sometimes referred to in the art as an optical link. The point-to-point configuration shown in FIG. 6 can be extended to other, more complex network topologies that include additional optical transceiver elements, such as mesh, ring, and bus. In the embodiment illustrated in FIG. 6, two optical transceivers 602, 602' are connected via one optical fiber 604 for transmitting from the first transceiver 602 to the second transceiver 602'. A second optical fiber 606 transmits information from the second transceiver 602' to the first transceiver 602. In some embodiments the optical link operates using a coherent optical signal format.

The transceivers 602 comprise control ports 608, 608' for sending and receiving command and control information signals. There is also a port 607, 607' for sending and receiving client data traffic on each transceiver 602, 602'. An oscilloscope trace of the measured output of the first transceiver 602 shows the normal client data traffic 610 at a 10 Gb/s data rate and the low frequency control signal 612. Note that the integrity of the client data traffic 610 is not affected by the low frequency control signal 612. The low frequency control signal 612 shown in FIG. 6 is an amplitude modulated signal, but one skilled in the art will appreciate that any modulation format can be used. The low frequency control signal 612 comprises control and management information sent from the first transceiver 602. A microprocessor in the second optical transceiver 602' is used to decode the series of '1's and '0's received from the first optical transceiver 602. In this way, configuration information is shared from the first optical transceiver 602 to the second optical transceiver 602'.

The second optical fiber 606 is used to send configuration information from the second transceiver 602' to the first transceiver 602. In this way, configuration information is shared from the second optical transceiver 602' to the first optical transceiver 602. The control ports 608, 608' on the first and second transceivers 602, 602' can include an industry standard I2C interface or other type of communication interface. Thus, using the low-frequency modulation method of the current teaching, digital diagnostic information can be encoded, shared, and decoded in both directions between the two transceivers 602, 602'. There is no need for one or the other of the transceivers 602, 602' to communicate with a separate control processor or management system to configure the link as in prior art link configuration systems. In some embodiments, the low-frequency modulation is caused by tuning wavelengths in one and/or the other transceiver 602, 602'. In these embodiments, the tuning through different wavelength channels causes low-frequency detected signals to appear while detecting signals at the input to the transceivers 602, 602'. Tuning through wavelength channels occurs during various wavelength channel scans described in more detail herein, for example, slow scans and fast scans of wavelength channels.

Figure 7:
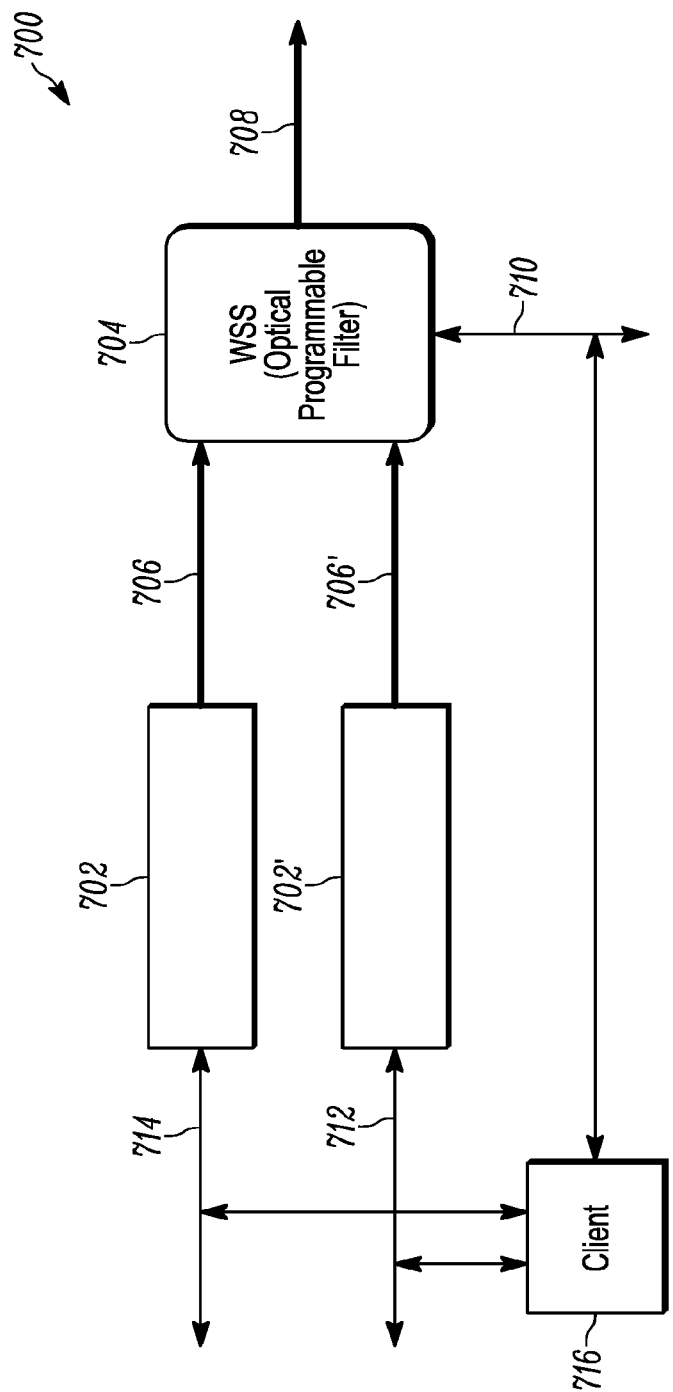
FIG. 7 illustrates an embodiment of a hardware-configured network of the present teaching comprising multiple tunable transceivers connected to a wavelength selective switch or to an optical programmable filter element.

Hardware configured links that operate autonomously without the need for communication with a separate management system or controller can be scaled to large optical systems. For example, large wavelength count optical links that comprise a large number of transceivers can be configured using various embodiments of the method and apparatus of the present teaching. FIG. 7 illustrates an embodiment of a hardware-configured network 700 of the present teaching comprising multiple tunable optical transceivers 702, 702' connected to a wavelength selective switch or to an optical programmable filter element 704. As with other embodiments described herein, the transceivers 702, 702' can include a client traffic port. The wavelength selective switch can be used to route optical signals between optical fibers based on a particular wavelength or channel. A wavelength selective switch can be configured as a reconfigurable optical add drop multiplexer and functions as an automated patch panel that shifts wavelengths and bandwidth quickly to different fibers. For example, Flexgrid™ technology products, commercially available from Finisar Corporation, provide dynamic control of the channel center frequency with 6.25 GHz resolution and a channel width resolution of 12.5 GHz within a wavelength selective switch. With Flexgrid™ technology, once deployed, channel plans are configurable "on-the-fly," meaning that channel bandwidths can be adjusted to most efficiently carry future demands as they arise, or for any other purpose.

One example of a state-of-the-art programmable optical filter is the WaveShaper family of programmable optical processors, which is commercially available from Finisar Corporation.

Programmable optical filters provide a range of programmable optical filtering and switching, including extremely fine control of filter characteristics, such as center wavelength, bandwidth, shape and dispersion, and attenuation. A programmable optical filter can provide functions such as tunable optical filtering, optical bandwidth management, dynamic gain equalization, programmable optical filtering, polarization processing, and multiport optical processing. All these parameters of wavelength selective switches and programmable optical filters can be configured using the hardware-configured network method and apparatus of the present teaching.

FIG. 7 illustrates two optical transceivers 702, 702' having optical output that are connected to inputs of the programmable filter element 704 with optical fibers 706, 706'. The optical connections between the two transceivers 702, 702' and the programmable filter element 704 may be bi-directional in some embodiments. The programmable filter element 704 includes an output that is optically connected to an output fiber 708 and an electronic control port 710 that receives electronic control signals. The two optical transceivers 702, 702' have electronic control ports 712, 714 that receive electronic control signals.

In some embodiments, the optical transceivers 702, 702' are tunable, and are set to transmit and receive different wavelength channels. In the configuration shown in FIG. 7, the programmable filter element 704 is programmed to receive the two wavelength channels and to transmit them on the output fiber 708. One skilled in the art will appreciate that any number of transceivers with any number of channels can be used with the method and apparatus of the present teaching.

In some embodiments, a local client 716 is used to provide the control information to configure the programmable filter element 704 and to set the wavelength channels from the transceivers 702, 702'. In some embodiments, the control information is provided independently from an external source using the control ports 710, 712, and 714. The control information is encoded onto a low frequency control signal imposed on an existing optical signal that propagates on the optical fibers 706, 706', and 708. In this way, information for element configurations is transferred through the network. Both local-client-based and independent input methods are used in some embodiments. In various embodiments, the local client may or may not be co-located with the optical elements. In various embodiments, the local client is pre-programmed to, e.g. autostart the components and provide other local control information such that the element, for example a transceiver 702, 702' and/or a WSS or programmable filter 704, can operate autonomously without the need for an external management system or controller to start and/or configure a link.

Figure 8:
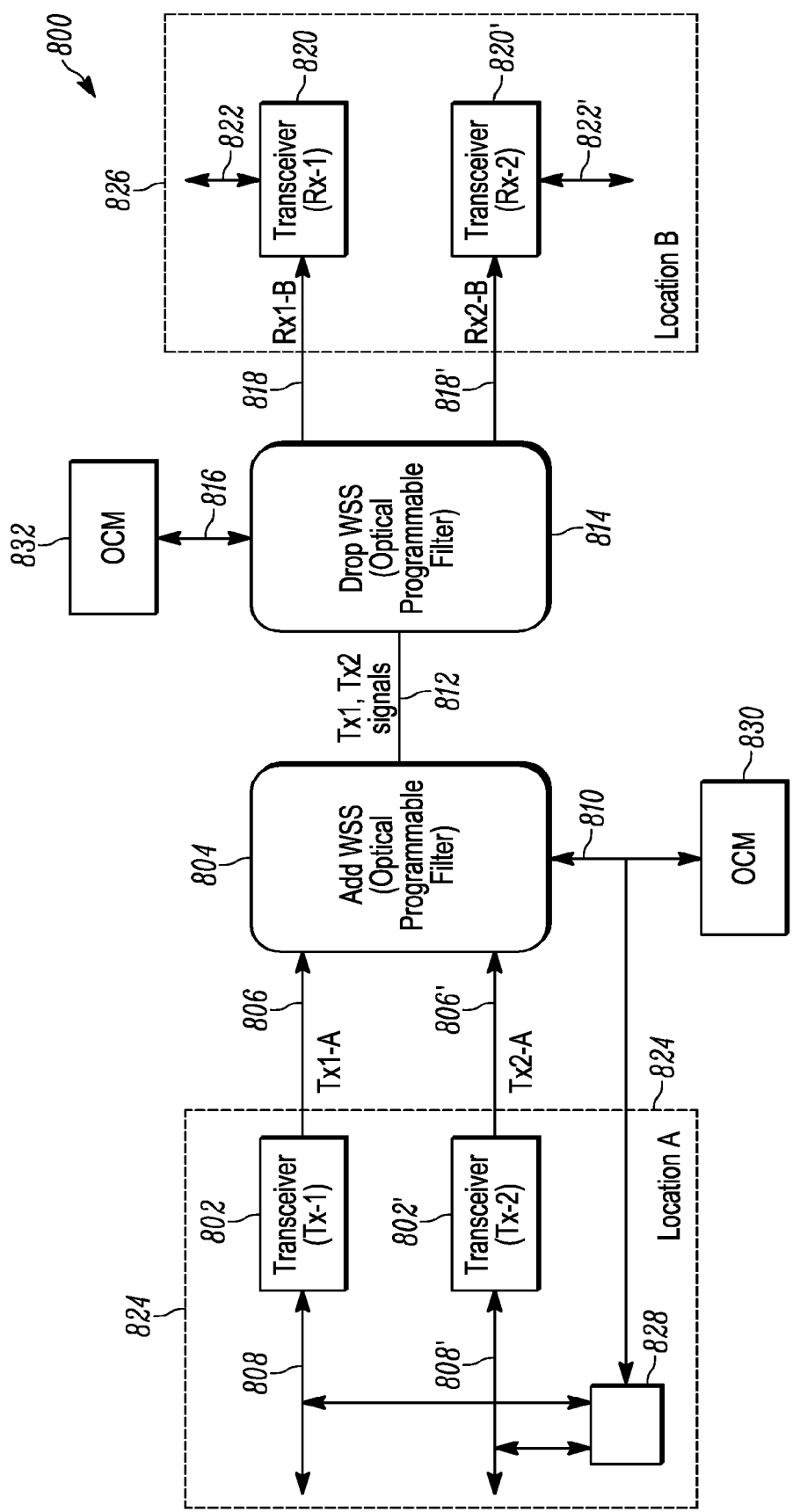
FIG. 8 illustrates an embodiment of the hardware-configured network of the present teaching comprising a wavelength division multiplexed network with wavelength selective switched optical elements.

FIG. 8 illustrates an embodiment of the hardware-configured network 800 of the present teaching comprising a wavelength division multiplexed network with wavelength selective switched optical elements. Many known network element configurations rely on the use of a client to communicate the configuration information to the various elements in the wavelength division multiplexed network using a separate "supervisory" channel. One feature of the hardware-configured networks of the present teaching is that the known client hardware is no longer necessary to provide element configuration. Client hardware and other external management systems can be present and used in the network, but they are no longer necessary for element configuration. Also, if these client hardware and other external management systems are used, they can have a greatly reduced role. Instead, configuration information is provided via a low-frequency control signal imposed on an existing optical signal in the optical network, as described herein.

FIG. 8 illustrates a first and second transceivers 802, 802' having bi-directional optical ports that are optically coupled to an add wavelength selective switch 804 with optical fibers 806, 806'. In some embodiments, there is bi-directional communications between the first and second transceivers 802, 802' and the add wavelength selective switch 804. In other embodiments, there is only one-way communications from the first and second transceivers 802, 802' to the add wavelength selective switch 804. The transceivers 802, 802' also include control ports 808, 808' that receive control information.

The add wavelength selective switch 804 has an electrical control port 810 that receives control information. In some embodiments, the electrical control port 810 is not used, and the control information is provided via the optical fibers 806, 806'. In addition, the add wavelength selective switch 804 includes an optical bi-directional port that is optically coupled to a bi-directional port of the drop wavelength selective switch 814 with the optical fiber 812. The drop wavelength selective switch 814 has an electrical control port 816 that receives control information. In operation, the add wavelength selective switch 804 can be configured to connect various wavelengths from various input ports to a particular output port in a controllable way. The drop wavelength selective switch 814 can also be configured to connect various wavelengths from a particular input port to one or more of various output ports in a controllable way. One skilled in the art will appreciate that the add wavelength selective switch 804 and the drop wavelength selective switch 814 can also operate in the reverse direction so that the add wavelength selective switch 804 becomes a drop wavelength selective switch, and vice versa.

The drop wavelength selective switch 814 also includes two bi-directional ports that are optically coupled to a first and a second optical fiber 818, 818'. In the embodiments shown, the optical fibers 818, 818' transmit optical signals from the drop wavelength selective switch 814 to transceivers 820, 820'. The transceivers 820, 820' have electrical control ports 822, 822'. In the embodiment shown in FIG. 8, the transceiver 802, 802' transmit through the add wavelength selective switch 804 to the drop wavelength selective switch 814 to the transceivers 820, 820' that receive the signal. As with other embodiments described herein, the transceivers 802, 802', 820, 820' can include client data traffic ports.

In the embodiment illustrated in FIG. 8, the transceiver 802 at location A 824 is in a transmit mode and is optically coupled to transceiver 820, which is in a receive mode at location B 826. Similarly, the transceiver 802' at location A 824 is in a transmit mode and is connected to transceiver 820' at location B 826, which is in a receive mode. In one method of operation, the transceiver 802 is at least partially configured using a client configuration device 828 to provide data on a particular wavelength channel.

Encoded control information is imposed using low-frequency modulation on the wavelength channel originating from transceiver 802 that is sent to the add wavelength selective switch 804. The encoded control information is received by add wavelength selective switch 804 and then decoded and used to configure the add wavelength selective switch 804 to pass the signal from transceiver 802 to the output fiber 812 that is connected to drop wavelength selective switch 814. This action causes the control signal to pass to the drop wavelength selective switch 814, where it is subsequently decoded. The drop wavelength selective switch 814 then uses the decoded control information to configure the drop wavelength selective switch 814 to pass the signal from transceiver 802 to the fiber 818. This configuration of drop wavelength selective switch 814 thereby passes the signal and encoded control information originating from transceiver 802 to receiver 820. The encoded control information is received at transceiver 820, and is used to configure the transceiver 820 to receive signal data from transceiver 802.

In some embodiments, one or more optical channel monitors 830, 832, provide control information to the hardware-configurable add and drop wavelength switches 804, 814. The optical channel monitors 830, 832 monitor the details of the optical signals passing through the add wavelength selective switch 804 or drop wavelength selective switch 814, or both, and use that information to inform various control actions of the hardware-configured network. The control actions are signaled to the network via the low-frequency modulation encoding described herein. As described above, the elements in the hardware-configured network are therefore able to automatically configure and/or otherwise manage and control the connectivity of the hardware-configured network.

One skilled in the art will appreciate that the add wavelength selective switch 804 and the drop wavelength selective switch 814 are capable of running traffic simultaneously in both the forward and the reverse direction. However, two optical fibers between each element are required for propagating traffic in both directions, and can be configured for bi-directional transceivers for client traffic.

One skilled in the art will appreciate that the particular sequence of events showing automated configuration and provisioning use of the hardware-configured network shown in FIG. 8 is illustrative, and does not limit the present teaching in any way. For example, various protocols can be used to establish network connectivity and network configurations amongst the optical elements in various sequences using the low frequency control signals described herein. Also, a client can be used to provide the electronic control signal to any of the elements in the network for any or all of the configuration events. In addition, the client can be used to initiate one or more configuration events, and the automated encoded information is used for the remainder of the configuration events.

One aspect of the present teaching is that installation errors can be detected in an automated fashion without the use of clients or external network managers. Installation errors cause actual deployed hardware physical connections to deviate from planned hardware physical connections. The term "physical connection" is referred to herein as a connection of a particular port of one or more optical elements to particular fibers or to particular ports on optical elements. When installation errors occur, planned element configurations that are pre-programmed into optical elements presuming planned hardware physical connections will not result in proper optical signal paths amongst elements. In known configuration systems, the only way to recover from installation errors is to use expensive human intervention to both detect the erroneous connections and to also re-deploy the hardware to establish the planned hardware physical connections.

Figure 9:
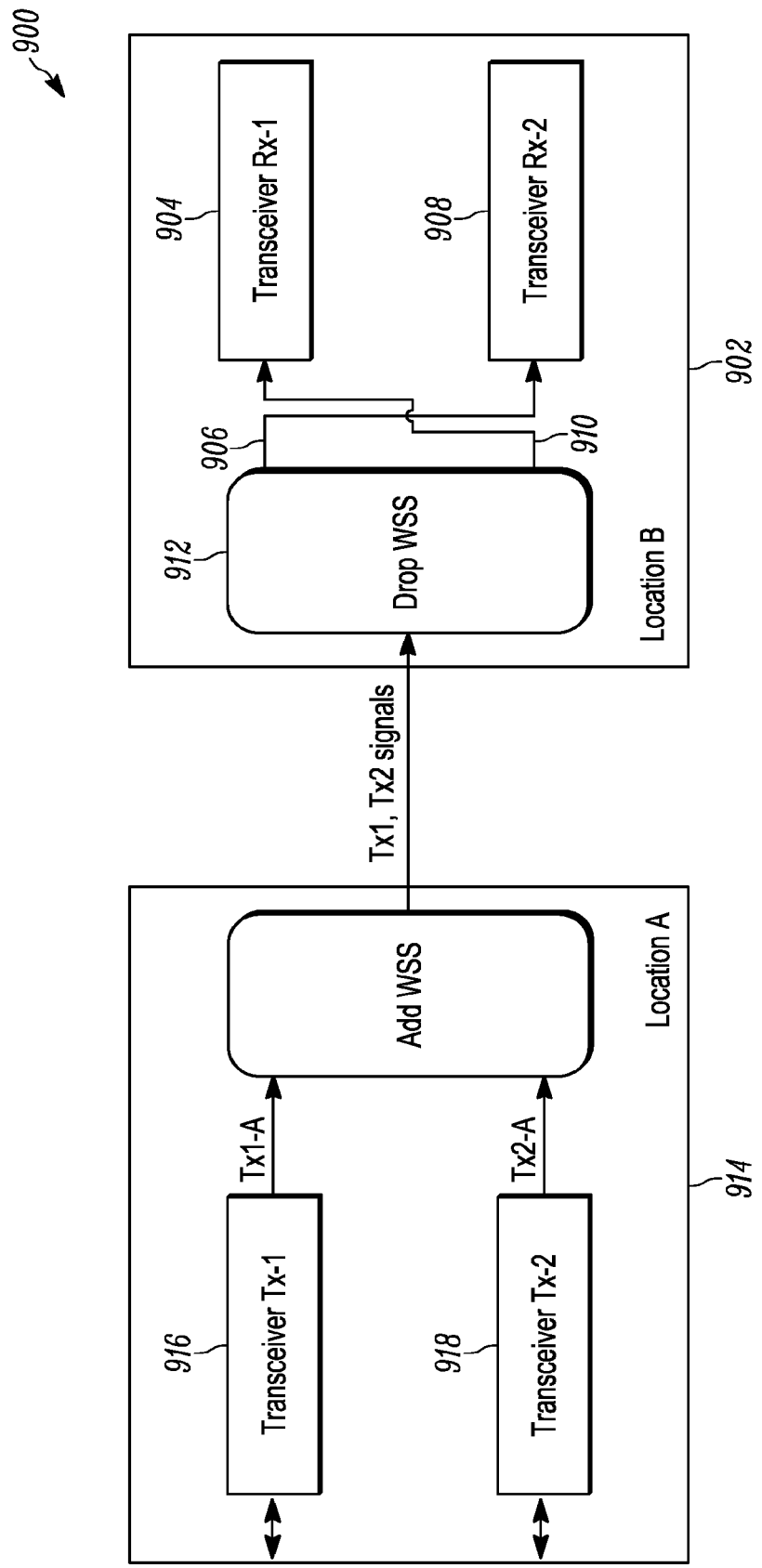
FIG. 9 illustrates the hardware-configured network of FIG. 8 in which the wiring is incorrectly installed in Location B.

FIG. 9 illustrates the hardware-configured network 900 of FIG. 8 in which the wiring is incorrectly installed in Location B. The installation error causes a crossed wiring condition in location B 902. The planned wiring connection calls for receiving transceiver RX-1 904 to be connected with optical fiber 906 and receiving transceiver RX-2 908 to be connected with optical fiber 910. The installer error results in the receiving transceiver RX-1 904 being connected with the optical fiber 910 and receiving transceiver RX-2 908 being connected with optical fiber 906, as shown in FIG. 9. Such installation errors are unfortunately a common occurrence for telecommunications service providers, and cause significant service turn-up delays and added cost. The crossed wiring condition is both difficult to detect and difficult to correct, even with state-of-the-art network hardware configuration systems. Detecting the installation error condition requires correlation of error conditions from multiple network elements using human operators, as well as subsequent service calls by field technicians to locate and reconnect the equipment to the planned physical connections. For example, in a system in which a transceiver port is swapped to a different channel, either intentionally or by accident, the different channel which is connected can be identified by the connected transceiver, which may be a client. The filter connected to the client can be determined by polling the transceiver that is connected. In some embodiments, client data traffic that is detected can be used to provide additional troubleshooting information, but the frames modulated at low frequency need to be decoded and compared. Simple low speed polling of the channels connected by the debug port will indicate the mistake.

Using the hardware-configured network apparatus and method of the present teaching, the cross-wired installation error of FIG. 9 can be automatically detected and corrected with virtually no human intervention or truck rolls. Specifically, at start up, the drop wavelength selective switch 912 sends an optical signal including low-frequency control signal according to the present teaching from the transmit transceiver TX-1 916 at location A 914 to the receiving transceiver RX-2 908 at location B 902. The receiving transceiver RX-2 908 at location B 902 identifies the connection error because the encoded configuration information on the low-frequency control signal is from TX-1 916 at location A 914 and not from TX-2 918 at location A 914, as expected. Receiving transceiver RX-2 908 at location B 902 then initiates corrective action by encoding corrective configuration information on a low-frequency control signal directed to the appropriate network elements in order to provide corrective action mitigating the installation error.

In particular, the wiring error is corrected using a reconfiguration of the drop wavelength selective switch 912. Reconfiguration is initiated by encoded information sent from receiving transceiver RX-2 908 at location B 902 to the drop wavelength selective switch 912 at location B 902 to reconfigure the drop channels such that RX-2 908 at location B 902 receives the optical signals from TX-2 918 at location A 914. Thus, drop wavelength selective switch 912 is reconfigured based on control information sent from receiving transceiver RX-2 908 such that signals from TX-1 916 at location A 914 emerge on deployed fiber 910, rather than the planned fiber 906, and signals from TX-2 918 at location A 914 emerge on deployed fiber 906, rather than the planned fiber 908. In this way, a reconfiguration of optical elements in the hardware-configured network of the present teaching corrects the installation error with no expensive human intervention. Extension to other installation errors and requisite reconfiguration steps are well understood by those familiar with the state of the art in network configuration and fault recovery.

Figure 10:
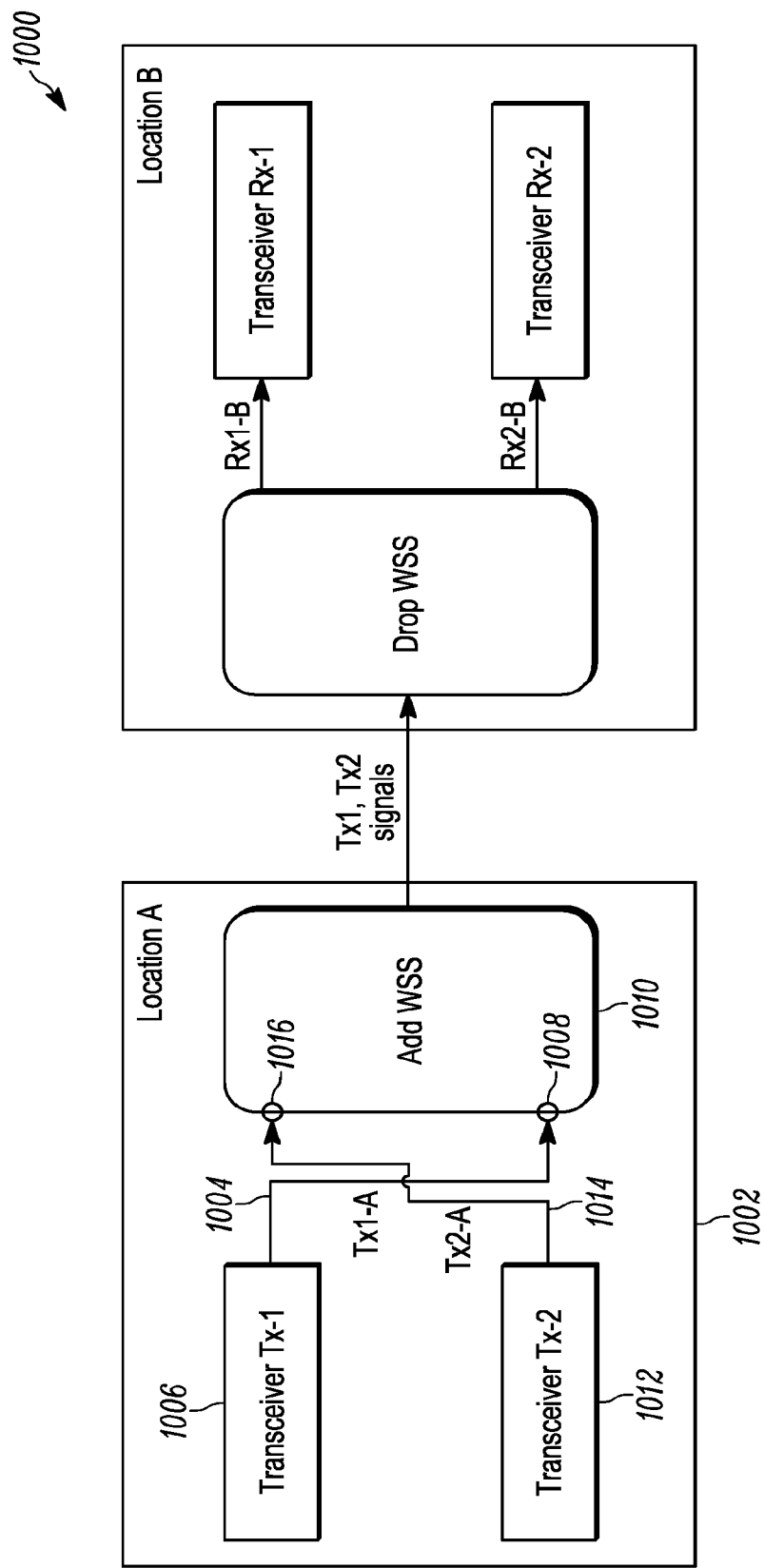
FIG. 10 illustrates the hardware-configured network of FIG. 8 in which the installer makes a mistake wiring the elements in Location A.

One aspect of the present teaching is the ability to catch installation errors early at the transmit side of the network, rather than detecting configuration errors only when the signal arrives at the receive end of the network, as is currently done in known systems. FIG. 10 illustrates the hardware-configured network 1000 of FIG. 8 in which the installer makes a mistake wiring the elements in Location A 1002. Specifically, the fiber 1004 originating from transmitting transceiver TX-1 1006 is connected to an input 1008 on add wavelength selective switch 1010 that was actually planned for the fiber transmitting receiver TX-2 1012. Also the fiber 1014 originating from transmitting transceiver TX-2 1012 is connected to the input 1016 on add wavelength selective switch 1010 that was planned for transmitting receiver TX-1 1006. Stated another way, the connections from the transceivers 1006, 1012 to the add wavelength selective switch 1010 are swapped on the inputs 1008, 1016 with respect to the planned deployment because of the installation error. In this erroneous configuration, the add wavelength selective switch 1010, which is configured at start-up to route signals that appear on input 1016 from transmitting transceiver TX-1 1006, instead receives signals from transceiver TX-2 1012 on that port 1016. The encoded configuring information provided on the low-frequency control signal detected by the add wavelength selective switch 1010 causes this error to be detected immediately within the add wavelength selective switch 1010. In some methods of operation, the error can be remediated by having the hardware-configured network notify the client or third party manager that the wiring needs to be fixed. In other automatic method of operation, the hardware-configured network automatically reconfigures the transceivers 1006, 1012, or automatically reconfigures the add wavelength selective switch 1010. The automatic reconfiguration is initiated based on control information sent to the optical element that can be reconfigured to remediate the error from the optical element that detected the error.

Figure 11:
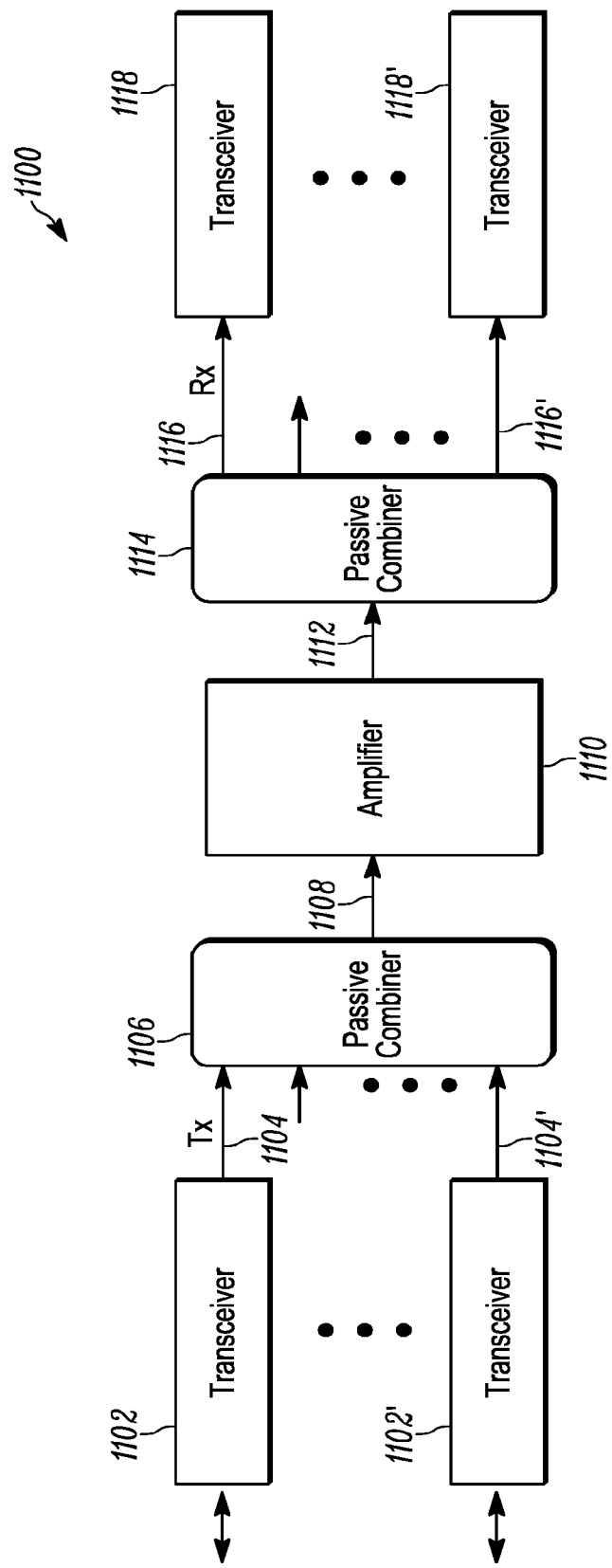
FIG. 11 illustrates an embodiment of a low-cost combiner-splitter comprising hardware-configured elements according to the present teaching.

One aspect of the present teaching is the ability to provide a low-cost multi-transceiver combiner-splitter. FIG. 11 illustrates an embodiment of a low-cost combiner-splitter 1100 comprising hardware-configured elements according to the present teaching. Multiple transceivers 1102, 1102' are connected to a passive combiner 1106 using a plurality of optical fibers 1104, 1104'. The passive combiner 1106 can include any number of ports. For example, the passive combiner 1106 can be a sixteen-port (16:1) passive combiner. By passive combiner, we mean a combiner that has no filtering capability to filter individual wavelength channels, although in some embodiments some other kinds of wavelength filtering may take place in the passive combiner elements.

The output of the passive combiner 1106 is optically coupled to an optical amplifier 1110 with an optical fiber 1108. The optical amplifier 1110 is used to overcome the loss of the combiner 1106, which is approximately 13 dB for a 16:1 combiner. The optical amplifier 1110 can be a low-cost erbium-doped fiber amplifier, which is widely available. For example, in one embodiment, the optical amplifier 1110 has a launch power of 0 dBm for each transceiver 1102, 1102', and sufficient amplifier gain to overcome the combiner loss, such that the output power from the amplifier 1110 is 12 dBm. The output of the optical amplifier 1110 is optically coupled to an optical splitter-combiner 1114 with an optical fiber 1112. The optical splitter-combiner 1114 includes a plurality of optical outputs 1116, 1116' that are optically coupled to a plurality of transceivers 1118, 1118'.

In various embodiments, the transceivers 1102, 1102' and transceivers 1118, 1118' operate in either a transmit or a receive mode. For example, in one method of operation, the transceivers 1102, 1102' operate in the transmit mode and the transceivers 1118, 1118' operate in the receive mode. In another method of operation, the transceivers 1102, 1102' operate in the receive mode and the transceivers 1118, 1118' operate in the transmit mode.

Some or all of the transceivers 1102, 1102', transceivers 1118, 1118', and amplifier 1110 are configured using the low-frequency modulation described herein. One feature of the hardware-configured network of the present teaching is that there is no need to keep track of fiber order or mark specific transceiver connections, because all the configuration information can be provided by the low-frequency control signals. The configuration information allows the automatic provisioning of tunable channels and establishes all data connections between transceivers.

One aspect of the present teaching is that the hardware-configured network described herein can provide digital diagnostics for optical network elements. Known transceivers sometimes include a microprocessor and diagnostics interface that provides performance information on the data link. This allows users to remotely monitor, in real-time, numerous performance parameters, such as received optical power, transmitted optical power, laser bias current, transceiver input voltage, and transceiver temperature of any transceiver in the network. Digital diagnostic functions provide users, clients, and external network management systems with a tool for implementing performance monitoring.

Some known optical transceivers provide digital diagnostics via a digital diagnostic monitoring interface (DDMI). The digital diagnostic monitoring interface specifies the control information that is passed to the client or external management systems and includes such information as element identifying information, element operating parameters, network and element configuration information, alarms and warning parameters, as well as vendor information. The digital diagnostic monitoring interface for small form factor (SFP) optical transceivers is detailed in Finisar Corporation Application Note AN-2030 "Digital Diagnostic Monitoring Interface for Optical Transceivers".

Known digital diagnostic monitoring interfaces comprise an interface device, or optical transceiver, that allows real-time access to device operating parameters, as well as alarms and warning flags that alert users when operating parameters are out of normal range. Known digital diagnostic monitoring interface devices generate the diagnostic data by digitization of internally monitored analog signals. Calibration and alarm threshold data is typically written during interface device manufacture. In addition to generating digital readings of internal analog values, known digital diagnostic monitoring interface devices generate various status bits based on comparison with current values and factory preset values. Also, known digital diagnostic monitoring interface devices generate identifier information.

Another aspect of the hardware-configured networks of the present teaching is to provide enhanced digital diagnostic monitoring. Some embodiments of the hardware-configured networks of the present teaching provide digital diagnostic monitoring interface control information as part of the low frequency control signal described herein. In particular, the low frequency control information can include data fields that are part of the low frequency control signal described herein, and that provide specific information on the transmitter component of a transceiver element. For example, the low frequency information signal can include one or more transmitter serial numbers for a transceiver element comprising a transmitter and/or transmitter channel identification numbers particular transceiver elements. The transmitter channel identification numbers provides the wavelength and/or channel number to which the laser transmitter is tuned. The low frequency information signal described herein can also include information on the receiver component of a transceiver element. For example, the low frequency information signal can include one or more receiver serial number for transceiver elements comprising a receiver and/or the receiver channel identification numbers for particular transceiver elements.

Another aspect of the hardware-configured networks of the present teaching is that it can provide enhanced digital diagnostics by exchanging configuration information with elements such as transceivers, amplifiers, wavelength filters, optical channel monitors, wavelength selective switches, wavelength multiplexers, wavelength demultiplexers, cross connects, and optical switches. The enhanced digital diagnostic information is used as the control information encoded on the optical control signals of the present teaching. Using the optical control signals of the present teaching provides additional flexibility in the ability to reach various optical elements in a hardware-configured network as compared to prior art configuration systems by selecting the appropriate optical carriers. In some embodiments of the hardware configure network of the present teaching, the hardware configurable elements comprise photodiodes that decode the low frequency control signals described herein.

One skilled in the art will appreciate that hardware configurable elements according to the present teaches can be used for various purposes. For example, in some embodiments, hardware configurable optical amplifiers can be used for network turn-up configuration before transceiver transmitters are active. Also, in some embodiments, hardware configurable amplifiers are configurable to have optical gains that depend on optical path noise calculation. Also, in some embodiments, hardware configurable amplifier gain profiles are adjusted based on channel turn-up from remote transceiver. Also, in some embodiments, hardware configurable amplifiers can transmit information regarding optical gain to transceiver.

Also, in some embodiments, hardware configurable wavelength selective switch ports are configured and reconfigured with flexible channel plans as needed depending up on data traffic. Also, in some embodiments, hardware configurable wavelength selective switches are used to provide network protection from faults by reconfiguring optical paths in the network after failure. Also, in some embodiments, hardware configurable optical programmable filters automatically adjust path dispersion without user or external network management intervention, based on performance information provided by hardware configurable transceiver elements.

Also, in some embodiments, hardware configurable optical channel monitors are calibrated using the low frequency control signals described herein. Referring to FIG. 8, by adding a precision channel monitor 830, 832 and using the enhanced digital diagnostics control information in the hardware-configured networks of the present teaching, transceivers used in the network can be tuned and spaced more tightly for higher total optical transfer rates and spectral efficiency.

One feature of the present teaching is that a hardware-configured network element according to the present teaching can be configured without the use of an amplitude modulated control signal on the optical carrier. Specifically, it is possible to utilize the changes to the optical carrier that are produced simply by the actions taken during a configuration protocol. These changes in the optical signal based on protocol-driven actions in the control processor are recognized at the appropriate downstream device or element that is part of the network configuration, and information derived from these recognized changes in the optical signal are used to close the configuration loop for a particular predetermined configuration. For example, the fact of a transmitter turn-on and/or the power level and/or duration of the on-time of the transmitter can be monitored and determined at an element, for example, a downstream receiver. The monitored optical signal and determined state of the transmitter as derived by the downstream receiver is then used as part of the information to manage and control the network. For example, the network may include a transmitter, a receiver and one or more elements connecting the transmitter and receiver. Anyone of the downstream elements from the transmitter may monitor the changes to the optical carrier produced by configuration changes.

A benefit of building a configuration protocol from signals that arise only from the configurations changes of the elements themselves is that there is no requirement for framing, additional traffic bandwidth, or complex control signaling or encoding of the optical signals used for configuration. The change in the optical signals that arise from the normal functions of a particular element, e.g. turning on or off or changing wavelengths, is independent of any framing, traffic or other modulated control information. In the case of turning a transmitter on or off, only the presence or absence of light may be required to control the channel switching and configuration. In embodiments in which the transmitter is a tunable transmitter, the speed of these signal changes can be as fast as the speed of tuning of the transmitter. As such, the hardware-configured network can change and/or determine its operational state and close into a final configuration very quickly.

Figure 12A:
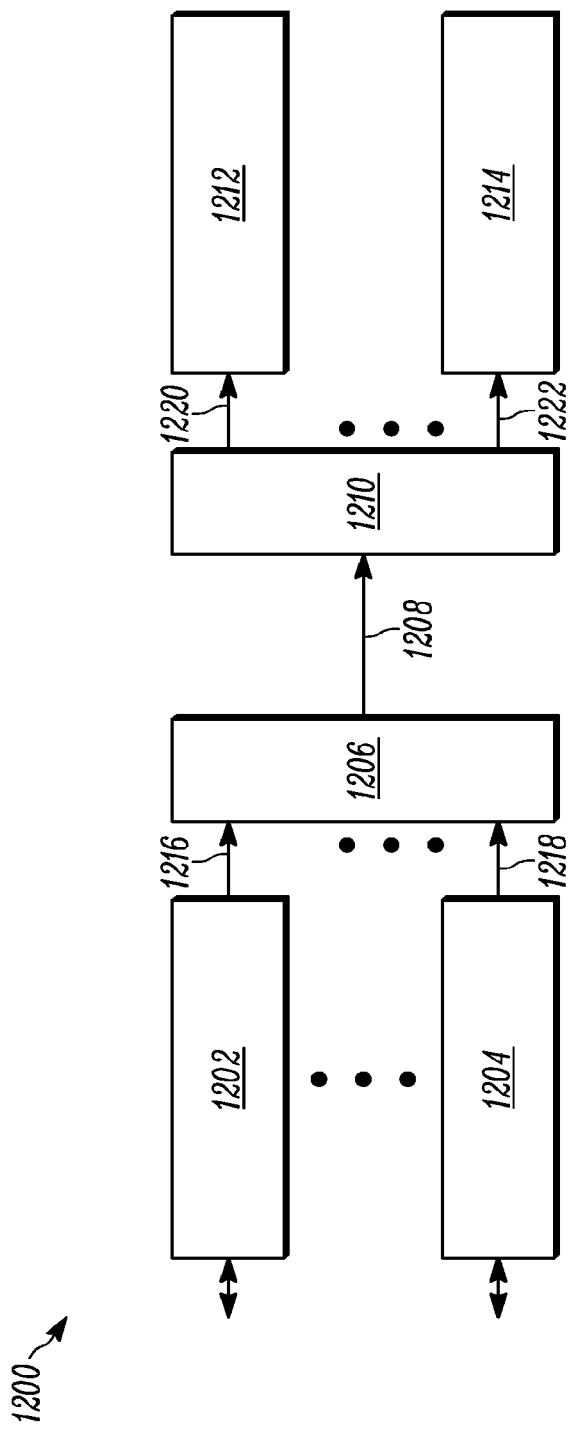
FIG. 12A illustrates a block diagram of an embodiment of a hardware-configurable link comprising hardware-configured tunable transceivers of the present teaching.

FIG. 12A illustrates a block diagram of an embodiment of a hardware-configurable link 1200 comprising hardware-configured tunable transceivers according to the present teaching. The link 1200 can operate bi-directionally, although only a single direction is illustrated. Two transceivers 1202, 1204 are shown transmitting at a near end of the link 1200. Each transceiver 1202, 1204 produces an optical signal on an optical carrier at a particular wavelength channel. The outputs of the transceivers 1202, 1204 are input to a WDM combiner 1206 and sent on a transport fiber 1208 to a far end of the link. The fiber connections between the transceivers 1202, 1204 and the WDM combiner 1206 may be relatively long, in some embodiments as much as 2 km long. The signal from the transport fiber 1208 is split at a WDM splitter 1210, and the different wavelength channels are sent to particular transceivers 1212, 1214 that are receiving optical signals on particular channels based on the configuration of the WDM. The transceivers 1202, 1204, 1212, 1214 are thus interconnected with low cost WDM splitters 1210 and combiners 1206. One feature is that there is no need to track particular connecting fiber 1216, 1218, 1220, 1222 order in order to configure the link 1200. Tunable channels can be provisioned, and connections and traffic between transceivers 1202, 1204, 1212, 1214 can be established with no additional optical channels used for control. In some embodiments, the transceivers 1202, 1204, 1212, 1214 are tunable coherent transceivers.

Figure 12B:
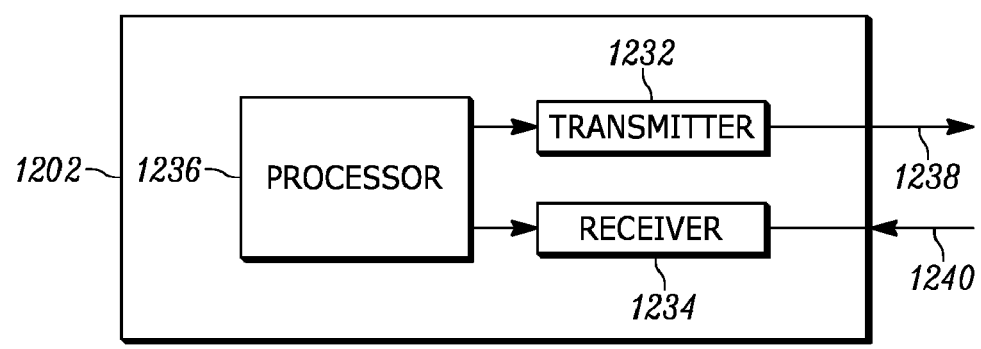
FIG. 12B illustrates a block diagram of an embodiment of a transceiver according to the present teaching that can be used with the hardware-configurable link described in connection with FIG. 12A.

FIG. 12B illustrates a block diagram of an embodiment of a transceiver according to the present teaching that can be used with the hardware-configurable link described in connection with FIG. 12A. A transmitter 1232 and a receiver 1234 are controlled by a processor 1236. The transmitter 1232 connects to a transmit fiber 1238 and the receiver 1234 connects to a receive fiber 1240. In some embodiments, the transmit and receive fibers 1238, 1240 connect to a WDM mux/demux that may be collocated with the transceiver 1202, or located remotely.

An embodiment of a control protocol according to the present teaching that can be used to configure the hardware-configured link of FIG. 12A-B is as follows. At power on, in a near-end transceiver 1202, the transmitter in the transceiver 1202 turns on and begins a slow channel change. In this slow scan, the transmitter generates an optical signal that steps through all the channels in the system sequentially. Each wavelength channel is emitted with a dwell time on a particular wavelength channel. The dwell time is the time for which the transmitter generates the wavelength of a particular channel in a scan of channels. Each complete scan includes emissions from the transmitter with a dwell time on each channel of the wavelengths of the system. The system typically starts the scan at the first wavelength channel, but in some cases, other orders are used and/or the scan may start at a next channel after the last channel sent. This occurs, for example, if a scan is interrupted for some reason. Some embodiments include an interval between dwell times on a particular wavelength channel, and some operate with nominally no interval between dwell times on particular wavelength channels. A receiver at the far-end transceiver 1212 waits for a signal. A signal will be detected, for example, when a portion of the signal generated by transceiver 1202 that comprises a slow scan is detected in transceiver 1212. In various embodiments, the receiver in transceiver 1212 can determine states of the transceiver 1202 on the other side of the link based on the duration of the received signal as described herein.

When the receiver at the far-end transceiver 1212 senses the optical signal from the near-end transmitter because the transmitter at the near-end transceiver 1202 has tuned to the correct channel, a transmitter in the far-end transceiver 1212 goes into a fast scan mode. In a fast scan, the transmitter generates an optical signal that steps through all the channels in the system sequentially. Each wavelength channel is emitted with a dwell time on a particular wavelength channel. For a fast scan, these emissions may be referred to as short pulses. The duration of a dwell time on a particular wavelength channel is much shorter than the duration of a slow scan dwell time on a particular wavelength channel because the fast scan is timed to be completely through a sweep of wavelength channels in a system in a time that is less than a single channel dwell time of a slow scan wavelength channel. That is, a complete channel scan time of a fast scan is the same duration or a shorter duration than a dwell time on a particular wavelength channel of a slow scan. A fast tune of the transmitter channels in the far-end transceiver 1212 in the fast scan allows connection of the link back to the other end, because a receiver in the near-end transceiver 1202 senses the signal from the far-end fast-tuned transmitter when the wavelength is tuned to an appropriate channel. That is, this transceiver 1202 detects a short duration signal, with a duration nominally equal to the dwell time on a particular channel of a fast scan. The near-end transceiver 1202 stays tuned to the channel it is transmitting at the time of sensing the signal from the far-end fast-tuned transmitter, because this channel is appropriate for connection to the far end receiver. The near-end transceiver 1202 can now transmit traffic over the link using the current operating wavelength channel. The receiver in the far-end transceiver 1212 can be used to initiate any next configurations, including, for example, a set-up of the link in the reverse direction. The link set up protocol can work in either direction. While the block diagram of a transceiver 1202 of FIG. 12A illustrates a transceiver transmitter and receiver each connected to a separate transmit and receive fiber, it is straightforward to persons of skill in the art to apply the protocol to numerous types of bidirectional transceivers and fiber connections.

Some embodiments of the protocols to configure a hardware-configurable link of the present teaching use a finite set of possible transmitter states to help simplify the processing required. These transmitter states include TX_SLOW_TUNE in which the laser is tuned such that channels are changed at a rate of one second per channel, by tuning a tunable laser in the transceiver, thus implementing a slow scan. In various embodiments, various slow rates are used. The state TX_FAST_TUNE is a fast channel change that utilizes a faster wavelength tuning mechanism to realize tuning through a channel plan with a 10 ms dwell time per channel, thus implementing a fast scan. The TX_FAST_TUNE operates+/−5 GHz from ITU channel grid for 10 ms duration. Other scan speeds and wavelength accuracies may be used, depending on the particular application. In some basic embodiments, the transceivers only need to detect and determine a dwell time from a particular wavelength of a slow scan, and detect and determine a dwell time from a particular wavelength of a fast scan in order to be able to complete the link setup and to send client traffic over the link. In some embodiments, additional states that generate optical signals with other timings that can be distinguished by the detectors in the transceivers are used. State TX_BEACON is a state in which the laser is providing a channel power on for dwell time that is shorter than a slow scan dwell time, but longer than a fast scan dwell time, and followed by a power off of nominally the same duration. For example, TX_BEACON may be a laser powered on dwell time of half the duration of a slow scan dwell time on a particular channel. In some embodiment the TX_BEACON state uses channel power one for 0.5 seconds and channel power off for 0.5 seconds at the current operating wavelength channel. TX_BEACON state will toggle between on and off until a state change in the transmitter. State TX_HOLD holds laser power in an on state at the particular wavelength channel currently operating. These states are used by the processor to control the output of the transmitter. In general, a transmitter will hold a particular state until that state is changed by the processor.

Figure 13:
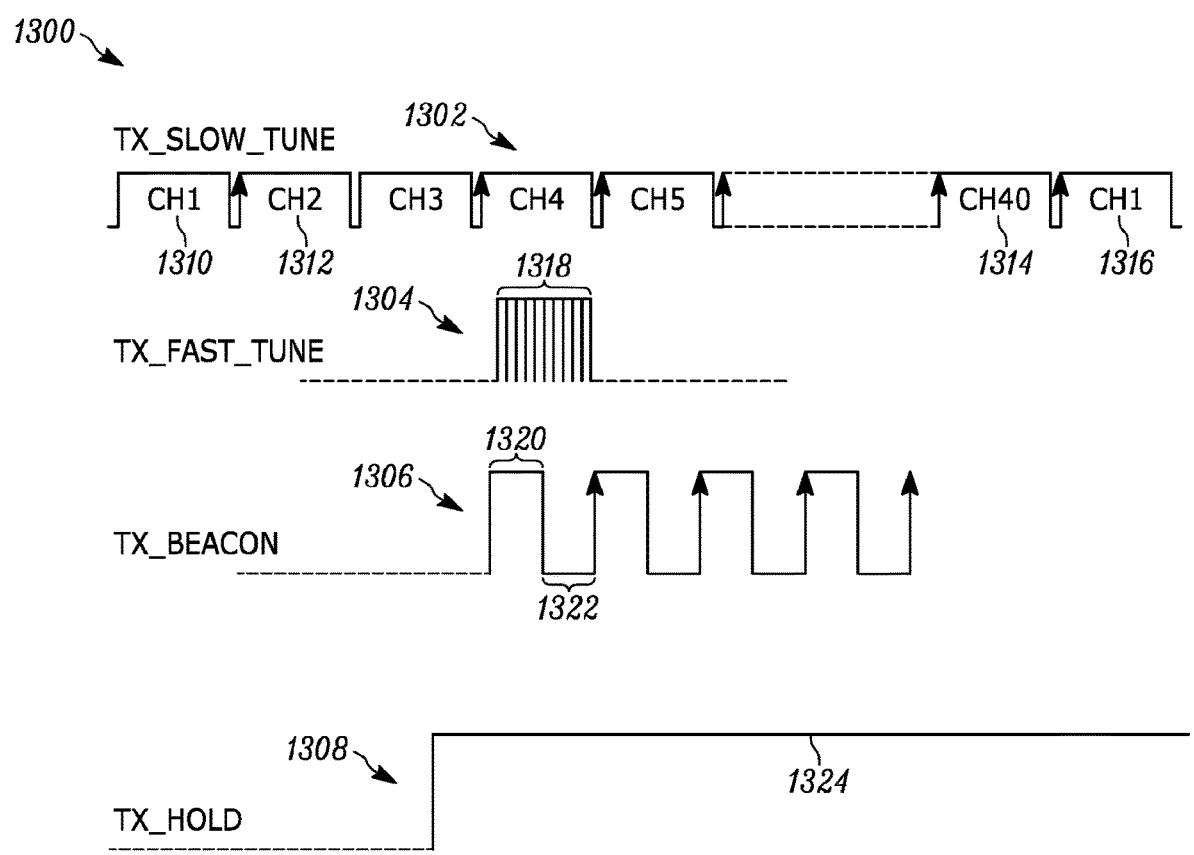
FIG. 13 illustrates graphs showing the optical power as a function of time for an embodiment of a set of transmitter states according to the present teaching.

FIG. 13 illustrates graphs 1300 showing the optical power as a function of time for an embodiment of a set of transmitter states 1302, 1304, 1306, 1308 of the present teaching. TX_SLOW_TUNE 1302 tunes through states where power is emitted in channel 1 1310, then channel 2 1312, and so on through channel 40 1314, and then begins again at channel 1 1316. TX_SLOW_TUNE 1302 is an embodiment of a slow scan of wavelength channels. Each channel produces power for approximately one second. Said another way, a dwell time on a particular channel in the scan has a duration of one second. TX_FAST_TUNE 1304 produces power in all 40 channels over a 400 ms period 1318. Each channel produces power for approximately 10 ms. TX_FAST_TUNE 1304 is an embodiment of a fast scan of wavelength channels in which a dwell time on a particular channel in the fast scan has a duration of 10 ms. TX_BEACON 1306 produces power in the currently tuned channel for approximately 50 ms on duration 1320, and 50 ms off duration 1322. The state TX_HOLD produces optical power in the current channel continuously 1324.

Some embodiments of the protocols to configure a hardware-configurable link of the present teaching use a finite set of possible receiver states. These include RX_ON in which the receiver measured power is determined to be greater than a particular threshold for more than eight milliseconds. In some embodiments, this threshold is a power threshold and is the same as the receiver's power threshold for a protection event. In some embodiments, the threshold includes a duration threshold, and the power-on duration is determined to exceed the threshold when the duration is determined to be greater than a particular duration. In some embodiments, the power-on duration is determined to exceed the threshold when the duration is determined to be less than a particular duration. The state RX_10MS is a state in which the receiver determines it has received light for a period of greater than 8 ms. A RX_1SEC is a state in which the receiver determines it has received light for a period of greater than 1 s. A RX_BEACON is a state in which the receiver determines it has received light on for a duration of 0.5 s and then light off for duration of 0.5 seconds. The time durations used for the various receiver states may be different in different embodiments. In general, it is important that the receiver be able to distinguish a long-duration light-on state, a short-duration light-on state, and a light on/off state to implement an embodiment of a link configuration protocol.

One feature of the present teaching is that a link configuration protocol can be established that is bidirectional, without the need to implement two uni-directional setup protocols. For example, in order to enable multi point communication to a particular receiver in a bidirectional mode, some embodiments of the present teaching utilize the following algorithm. Note, this algorithm description assumes transceiver A is located at a near end of a link, and includes a transmitter A and a receiver A. The transceiver B is located at a far end of a link and includes transmitter B and receiver B. The algorithm proceeds as: (1) transmitter A turns on, starting at channel 1 of a particular channel plan, after power up; (2) transmitter A stays on channel 1 for one second and progresses through a channel change at a rate of 1 sec/channel (in other words, transmitter A generates a slow scan, where the slow scan has a dwell time on a particular wavelength channel that is greater than a duration of a complete channel scan of a fast scan, which is described in further detail in step 5); (3) transceiver B, the far-end receiver, receives power when transmitter A tunes to a channel that reaches receiver B through the link connection (thus receiver B detects a portion of the first optical signal transmitted over the link, and this detected light has a duration of a dwell time of a particular channel of a slow scan); (4) far-end transmitter B goes to fast tune channels 1-N (N=40, for example); (5) fast tune of transmitter B on far end, through all N channels (in other words, transmitter B generates a fast scan where a complete channel scan is a scan through all N channels of the system); (6) receiver A detects light from transmitter B during the fast channel tune when transmitter B tunes to a channel that reaches receiver A (in other words receiver A detects a pulse of light having a duration that is equal to or less than the dwell time on the particular wavelength channel of the fast scan); (7) transmitter A goes to a hold condition on the channel which is currently being transmitted to receiver B; (8) transmitter A goes to beacon mode; (9) receiver B detects beacon from transmitter A; (10) transmitter B goes to slow tune; (11) receiver A detects slow channel change from light from transmitter B; (12) transmitter A goes to into a hold; (13) receiver B detects state transition, beacon to hold from transmitter A; (14) transmitter B goes to a hold condition; (15) the bidirectional link is complete. Transceiver A and transceiver B can then send client traffic bi-directionally.

This sequence is performed with no particular framing or sequencing predetermined at the far end or near end transceivers. Also, no channels are predetermined. As such, the system is completely self-configuring and the setup is completely independent of the specific fiber connection patterns that are established when the system is wired. The transceivers are able to discover one another and to establish a link with no setup configuration information predetermined.

Figure 14:
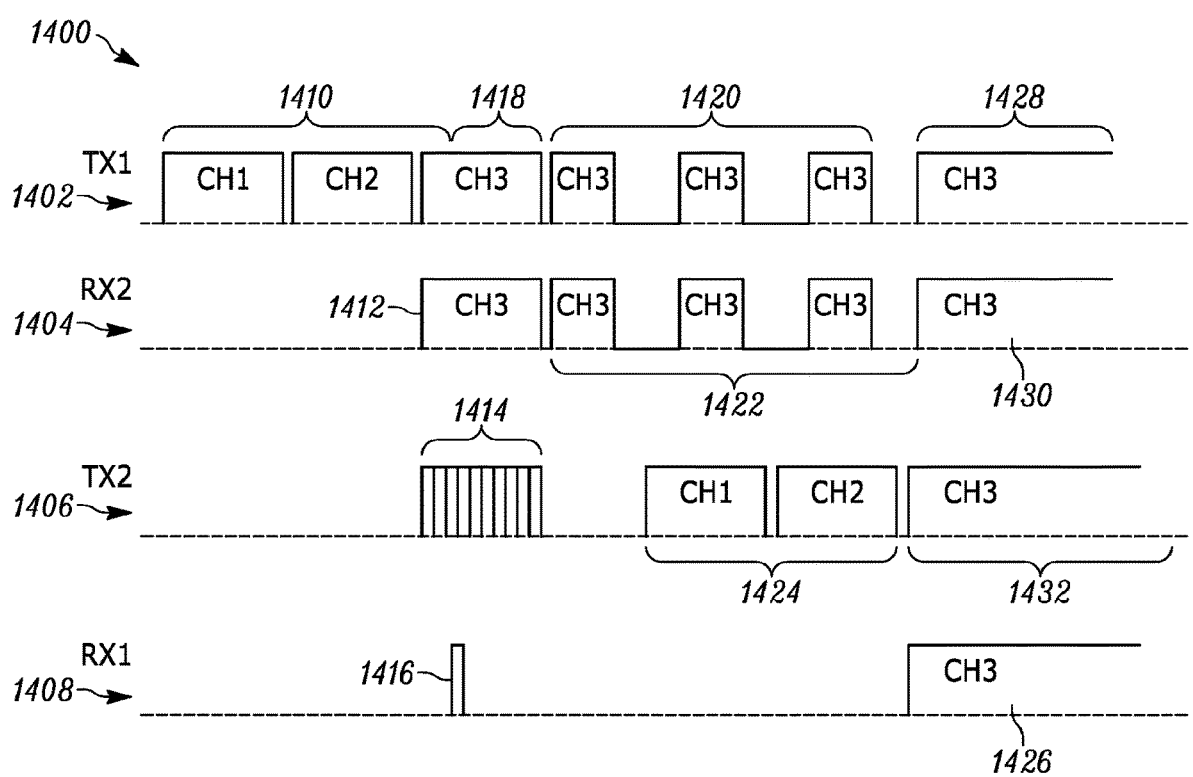
FIG. 14 illustrates graphs showing the optical power as a function of time for a set of transmitter and receiver states present during an embodiment of a method for a connection protocol of the present teaching.

FIG. 14 illustrates graphs 1400 showing the optical power as a function of time for a set of transmitter and receiver states present during an embodiment of a method for a connection protocol according to the present teaching. In this graph, a transceiver at the near end is hardwired through the WDM combiner and splitter to a transceiver at the far end so that channel 3 is the connection channel. The graphs illustrate the transmitted optical signal 1402 produced by the transmitter at the near end, the received optical signal 1404 received at the receiver at the far end, the transmitted optical signal 1406 produced by the transmitter at the far end, the received optical signal 1408 received at the receiver at the near end. The transmitter at the near end turns on and begins a TX_SLOW_TUNE state 1410, tuning at a rate of one second per channel from channel 1 and up. In general, if the state 1424 is entered it is not required to restart at channel 1, as shown. In some embodiments, the slow scan instead continues from the last channel sent over the link. When the transceiver tunes to channel 3, a signal 1412 is detected at the receiver at the far end. This causes the transmitter in the transceiver at the far end to implement a TX_FAST_TUNE 1414, fast scan. When channel three is transmitted to the receiver in the near end transceiver, a received signal 1416 is detected at the receiver at the near end. This causes the transmitter in the near end transceiver to move to a TX_HOLD state 1418 on channel three. The transmitter in the near end transceiver transitions to a TX_BEACON state 1420 on the same channel three. This beacon state is detected 1422 at the receiver in the far end transceiver, and the transition from hold to beacon of the signal received at the far end is determined by the processor in the far end transceiver. This causes the transmitter in the far end transceiver to begin a TX_SLOW_TUNE 1424. The receiver in the near end transceiver detects the optical signal transmitter from the far end transmitter when it tunes to channel three 1426. The processor in the near end transceiver determines a threshold has been crossed from this received signal and moves the transmitter in the near-end transceiver to a hold 1428 on channel three. The transition from beacon to hold 1430 is detected by the receiver in the far end transmitter and the transition is determined by the processor in the far end transceiver, which then directs the far end transmitter to hold 1432 on channel three. The bidirectional link is now established, and traffic can flow in both directions.

Thus, in some embodiments, the reverse direction of the link is autonomously set up using no separate control signaling by the near-end transceiver generating a beacon signal and transmitting the beacon signal to the far-end transceiver over the WDM optical transport interconnect. The far-end transceiver receives a portion of the beacon signal. This causes the far-end transceiver to generate a wavelength channel scan in response to receiving the transmitted beacon signal. In some embodiments, the wavelength channel scan is a slow scan, which may be a rate of one channel per second. The near-end transceiver receives a portion of the optical signal generated by the far end transceiver when the channel is tuned that passes through the WDM interconnect. Upon the processor in the near-end transceiver determining that the received portion of the signal exceeds a threshold it generates a hold signal at the near-end transceiver. That is, the near-end transceiver is made to generate a continuous-time signal at the current operating wavelength, rather than the previous on-and-off beacon signal. This hold signal is detected by the far-end transceiver, and determined to be a hold based on the power and/or duration of the received signal, and the processor in the far end transceiver then sets the operating wavelength of the far-end transceiver to maintain its current operating wavelength. Then, live traffic is transmitted from the far-end transceiver on the current operating wavelength. The operating wavelength of the signal from the near-end transceiver to the far-end transceiver may be the same as the operating wavelength from the far-end transceiver to the near-end transceiver, or it may be different. The wavelength depends on the wavelength channel pass band of the WDM interconnect that connects the near end transceiver to the far end transceiver.

In some embodiments, once the near-end transceiver enters the hold state 1418 the near-end transceiver begins transmitting live traffic to the far-end transceiver, and does not transition to TX_BEACON state 1420.

In some embodiments, transceivers on both sides of the link run the same state machine, and begin a start slow scan after power up. No master side or slave side is needed, only one controller software. In these embodiments, it is dependent on which side hits the filter first. For systems that are implemented in this way, a trap is added for a case in which both sides for low probability case tune to proper filter at the same time. Then the transceiver restarts at a random time that is greater than the slow scan rate.

Figure 15:
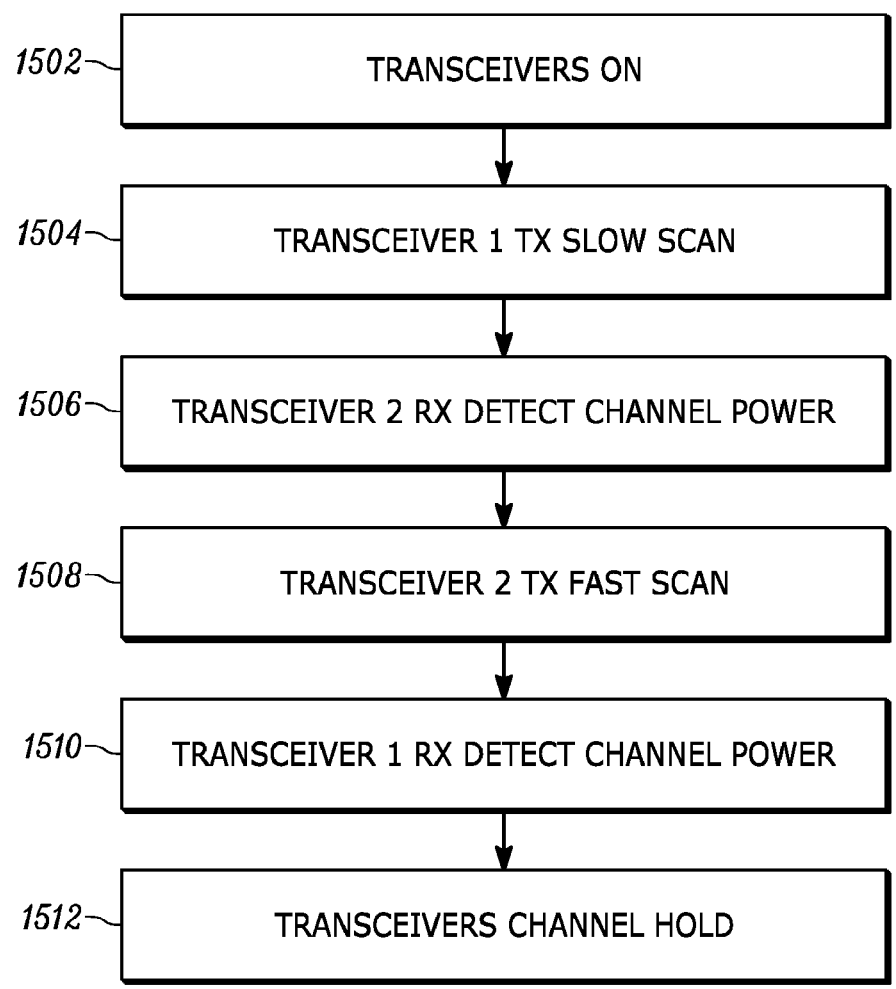
FIG. 15 illustrates a flow diagram of an embodiment of a protocol for establishing a link using the hardware-configured transceiver elements of the present teaching.

FIG. 15 illustrates a flow diagram of an embodiment of a protocol for establishing a link using the hardware-configured transceiver elements of the present teaching. The transceivers may operate with a variety of modulation formats, including coherent modulation format. The transceiver receivers may comprise coherent receivers. The transceivers may comprise SFP, SFP+ and/or CFP2/CFP4 transceivers. In some embodiments, a transceiver at the near end is hardwired through the WDM combiner and a splitter to a transceiver at the far end so that one particular channel is able to pass all the way through the link from a near-end transceiver to a far-end transceiver to establish a connection channel for that unidirectional connection. Likewise, in these embodiments, one particular channel is able to pass all the way through the link from the far-end transceiver to the near-end transceiver to establish the connection channel for that unidirectional connection. Note that these channels may be the same, or they may be different. Before startup, the particular connection channel is not necessarily known. That is, no particular attention must be paid to the hardwired fiber configuration in order to know in advance what channel would connect the near end transceiver with the far-end transceiver and vice versa. In other embodiments, the transceivers may be hardwired through passive splitter combiners, so that multiple channels can pass between transceivers on the link. One advantage of the apparatus and method of the present teaching is that the configuration of the network and/or link are achieved without external human or management system intervention, and rely on configuration protocols based on signals that arise only from the configurations changes of the elements themselves. That is, the configuration protocols in the method and apparatus of the present teaching rely on the low-frequency modulation control signals that are imparted on optical carriers by the optical elements of the hardware configured network.

At step one 1502, the near end and far end transceivers are optically powered on. In general, one or more transceiver pairs may be powered on. At step two 1504 one of the transceivers, transceiver 1, which may be referred to as a near end transceiver without loss of generality, begins a slow wavelength scan as described herein. At step three 1506 a transceiver 2, which may be referred to as a far end transceiver without loss of generality, detects power. The transceiver 2 is able to distinguish that the detected power arises from a near end transceiver by appropriate processing of the received signal and therefore initiates a step four 1508 which is a transmitter fast scan from transceiver 2. Light from the signal generated in step four 1508 transceiver 2 fast scan reaches transceiver 1 which causes step five 1510 transceiver 1 receiver detecting channel power. In various embodiments, the receiver in transceiver 1 is able to distinguish that the detected channel power arises from the light generated in step four 1508 transceiver 2 fast scan. The system then moves to a state six 1512 in which the transceivers hold on the current channel. Client data traffic can flow across the link.

It should be understood that the steps of the protocol for connecting the near-end transmitter to a far-end receiver according to the present teaching can operate in either direction, from near end to far end and from far end to near end. Furthermore, various steps can operate simultaneously or separately in time, as long as the teaching remains operable.

One feature of the present teaching is the ability to deploy a multi-wavelength optical transport system using multiple tunable transceivers that all have the same part number. For example, many prior art systems require that transceivers with different wavelengths and/or transceiver pairs that are intended to be used together in a link be tracked separately. By using a hardware-configured network transceiver according to the present teaching, all the operational benefits of a single part number are realized by the service provider, including ease of deployment with no tracking of individual parts, less inventory on hand, and remote configuration of wavelengths without previous knowledge of how the devices are hard wired. For example, technicians do not manually set the wavelengths of the wavelength-tunable transceivers, nor do the technicians need to select appropriate fixed-wavelength transceivers. The technicians can put the hardware configurable transceivers into any host port, and connect duplex jumpers to any fiber port on a WDM MUX/DEMUX. This eliminates the need to track fibers from WDM MUX/DEMUX to the transceiver. The client can then poll the channel of the transceiver and create a connection map based on the channel which was set up in the link. In some embodiments, remote transceivers can be located up to 2 km from a fiber enclosure.

Figure 16:
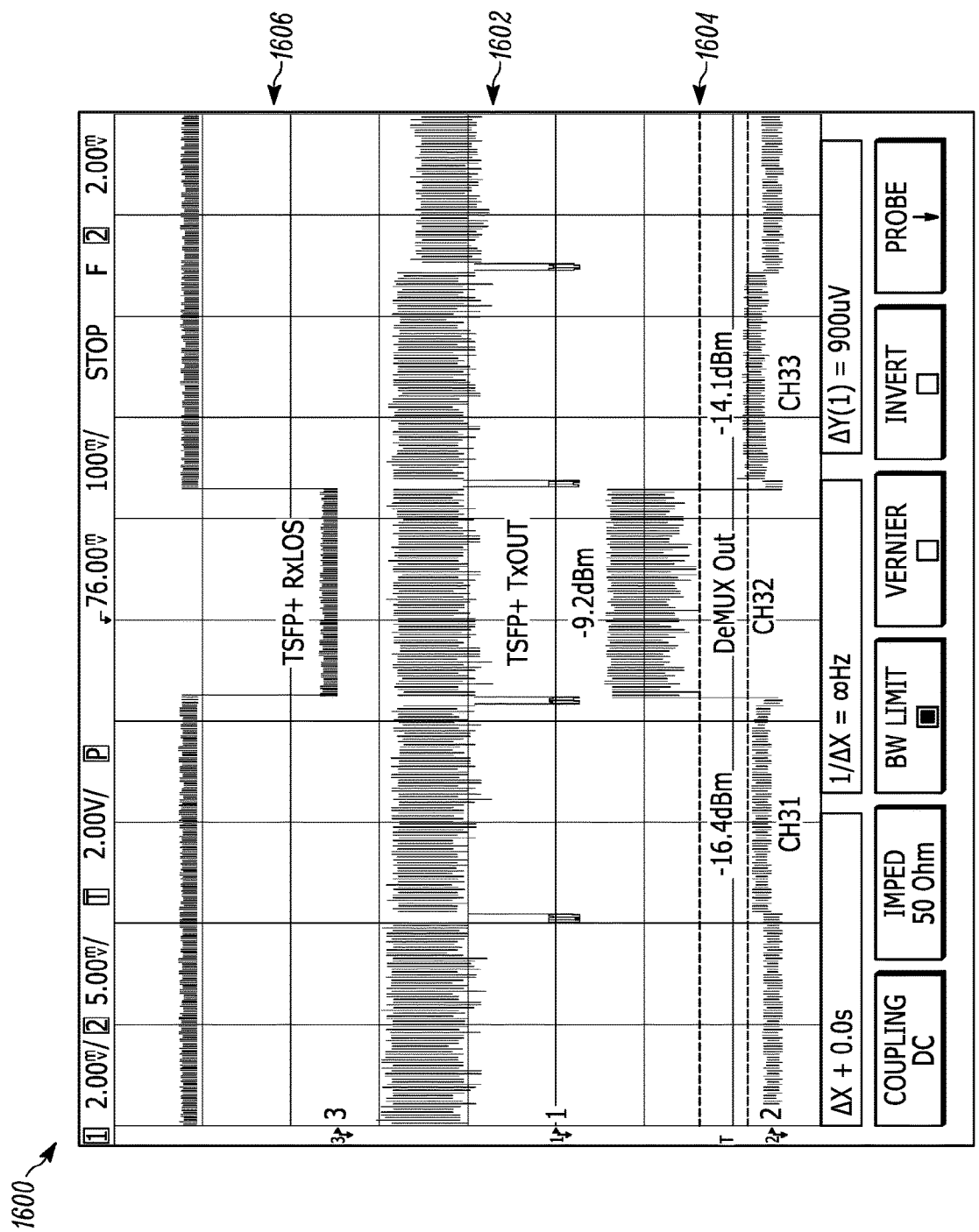
FIG. 16 illustrates graphs of the measured optical signals of an embodiment of a method for configuring an optical link using a hardware-configured transceiver according to the present teaching.

FIG. 16 illustrates graphs 1600 of the measured optical signals of an embodiment of a method for configuring an optical link using a hardware-configured transceiver according to the present teaching. The graphs 1600 include an oscilloscope trace 1602 as a function of time for the optical output of the coherent transceiver, which is tuning through channels 30, 31, 32 33 and 34. The graphs 1600 include an oscilloscope trace 1604 of the output of the optical demultiplexer that passes channel 32, showing the light appears when the coherent transceiver tunes to channel 32. The graphs 1600 include an oscilloscope trace 1606 of the loss-of signal (LOS) indicator, showing that the LOS goes low (LOS=0) when the signal appears at the receiver, having successfully passed through the demultiplexer because the transmitter has tuned to channel 32.

Figure 17A:
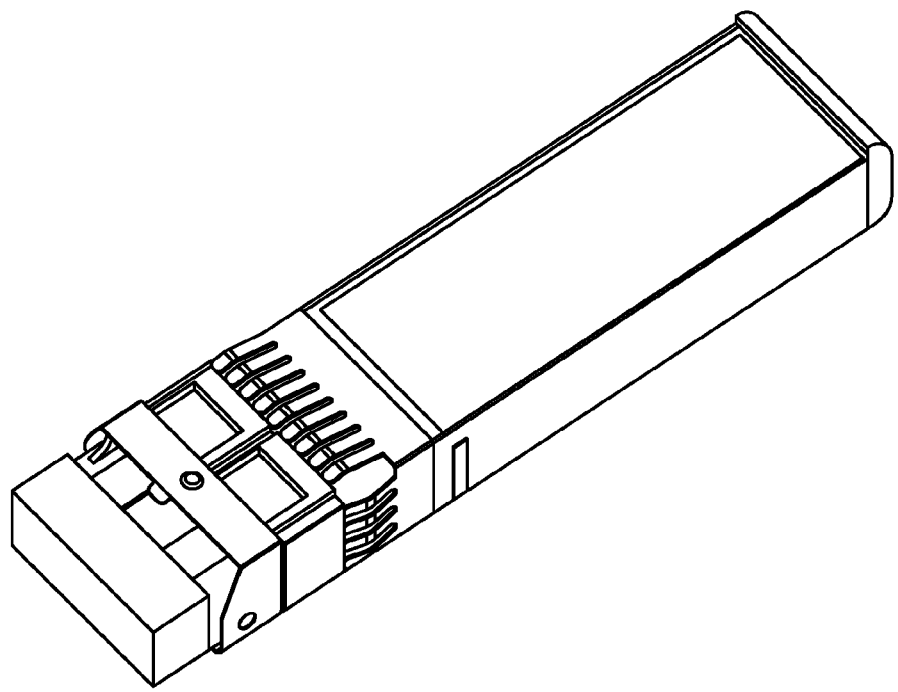
FIG. 17A illustrates a top-view of an embodiment of a hardware-configured transceiver according to the present teaching.
Figure 17B:
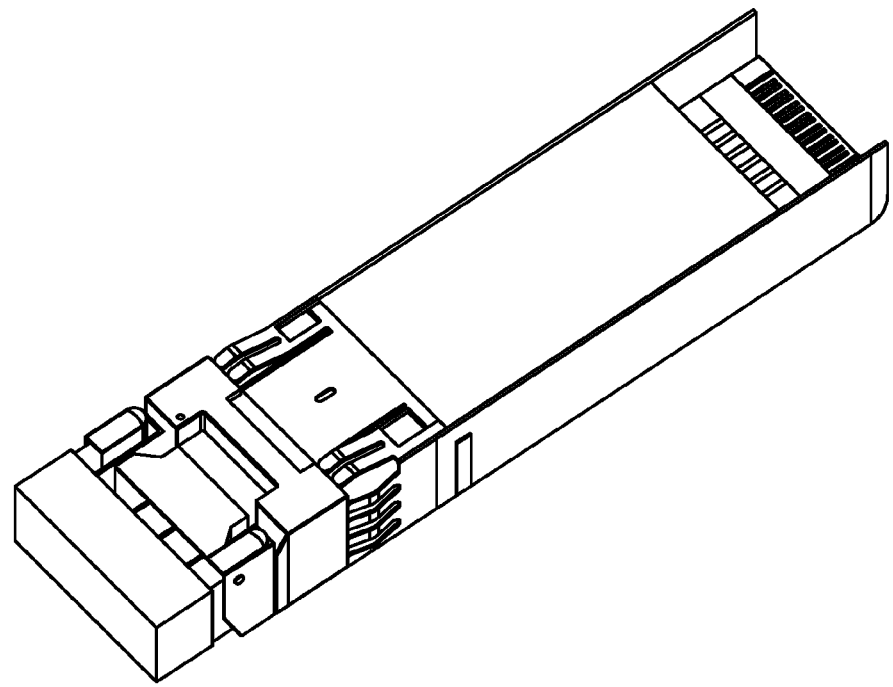
FIG. 17B illustrates a bottom-view of the hardware-configured transceiver described in connection with FIG. 17A.
Figure 17C:
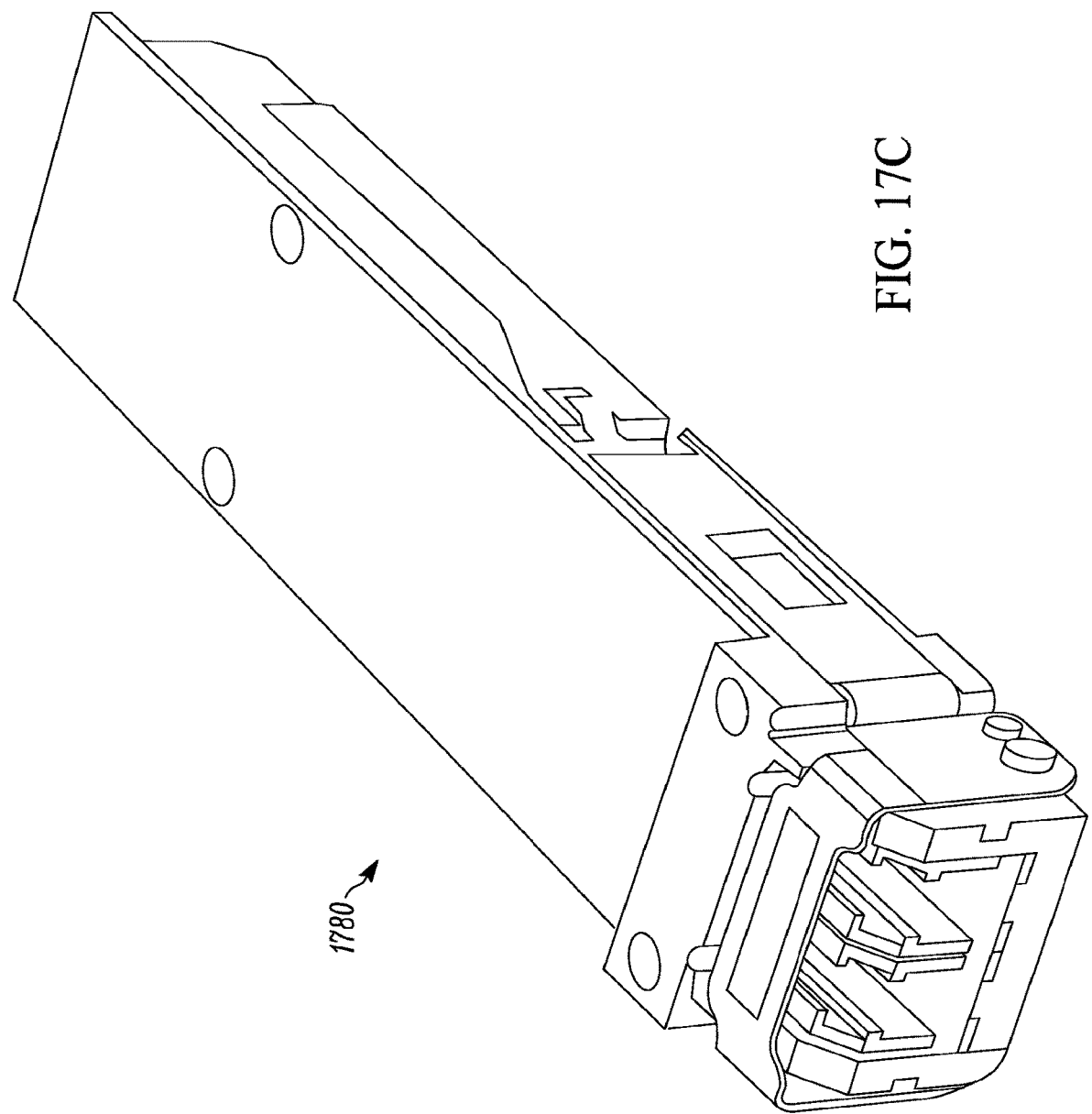
FIG. 17C illustrates a top-view of another embodiment of a hardware-configured transceiver according to the present teaching.

FIG. 17A illustrates a top-view 1700 of a hardware-configured transceiver of the present teaching. FIG. 17B illustrates a bottom-view 1750 of the hardware-configured transceiver of FIG. 17B. The hardware-configured transceivers of the present teaching can be made in a variety of packages including a SFP, SFP+ or XFP form factor. Alternatively or in addition, the hardware-configured transceivers of the present teaching may be CFP2/CFP4, coherent transceivers. FIG. 17C illustrates a top-view of another embodiment of a hardware-configured transceiver according to the present teaching. Specifically, FIG. 17C illustrates a top-view of a CFP4 form-factor hardware-configured transceiver 1780. In some embodiments, the hardware-configured transceiver electronically tunes to 1 of 88 different wavelengths. In various embodiments, various numbers of channels are included in the system, including 88 channels, 96 channels, sixteen channels, four channels and a variety of other channel counts. These channel wavelengths may represent specific channels on the ITU-grid. In some embodiments, the link distance that can be achieved with the hardware-configured transceivers of the present teaching is up to 80 km. Also, in some embodiments, the operating temperature range is −5 C to 85 C. In some embodiments, the operating temperature range includes a lower range of −40 C or lower.

Figure 18:
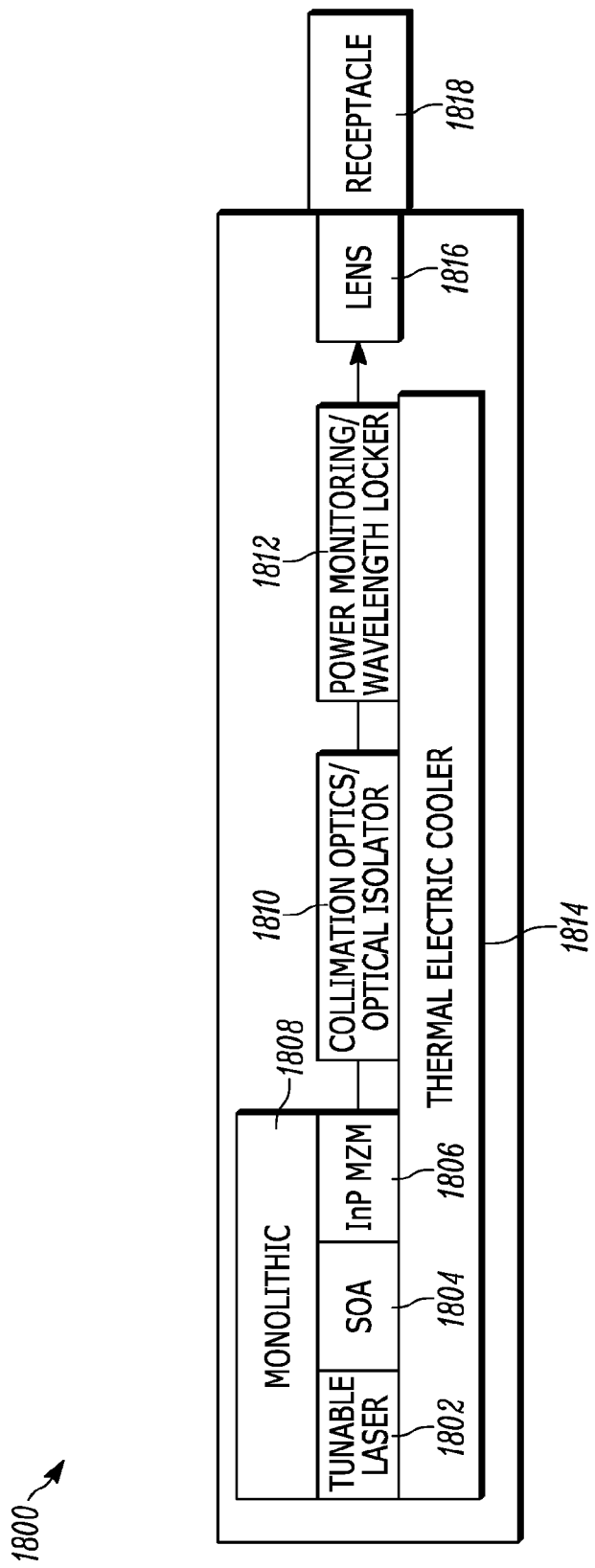
FIG. 18 illustrates a schematic of an embodiment of opto-electronic components in a hardware-configured transceiver of the present teaching.

FIG. 18 illustrates a schematic 1800 of an embodiment of opto-electronic components in a hardware-configured transceiver of the present teaching. A tunable laser 1802, semiconductor optical amplifier 1804, and Mach-Zehnder modulator 1806 are positioned on a monolithic substrate 1808. The tunable laser 1802 may comprise a narrow-linewidth laser suitable for coherent transmission using coherent modulation formats. The Mach-Zehnder modulator 1806 may be an InP Mach-Zehnder modulator. The Mach-Zehnder modulator may be a silicon photonics modulator, also known as an SiP modulator. The Mach-Zehnder modulator 1806 may comprise a low-power, compact integrated InP IQ-modulator for coherent transmission. The output of the Mach-Zehnder modulator 1806 is coupled to an optical element 1810 comprising collimation optics and an optical isolator. The optical element is coupled to a power monitor and wavelength locker element 1812. These elements are all placed on a thermal electric cooler 1814. The power monitor and wavelength locker element 1812 may be configured to support tunable coherent transmission operation from the hardware-configured transceiver. The power monitor and wavelength locker element 1812 is coupled to a lens 1816 attached to a receptacle 1818.

One feature of the hardware-configured optical elements of the present teaching is that large networks can be rapidly self-configured, without any intervention from host equipment or network management systems. The hardware-configured elements can act autonomously, and are able to configure themselves based on predetermined information stored in a memory device that resides within the hardware-configured element. The firmware routine for configuration is self-contained in the network elements. In various embodiments, the routines enable configuration of either duplex, using two fiber, or bi-directional single fiber connections, or both. In some embodiments, the firmware routines are initiated when the device is powered on.

Figure 19A:
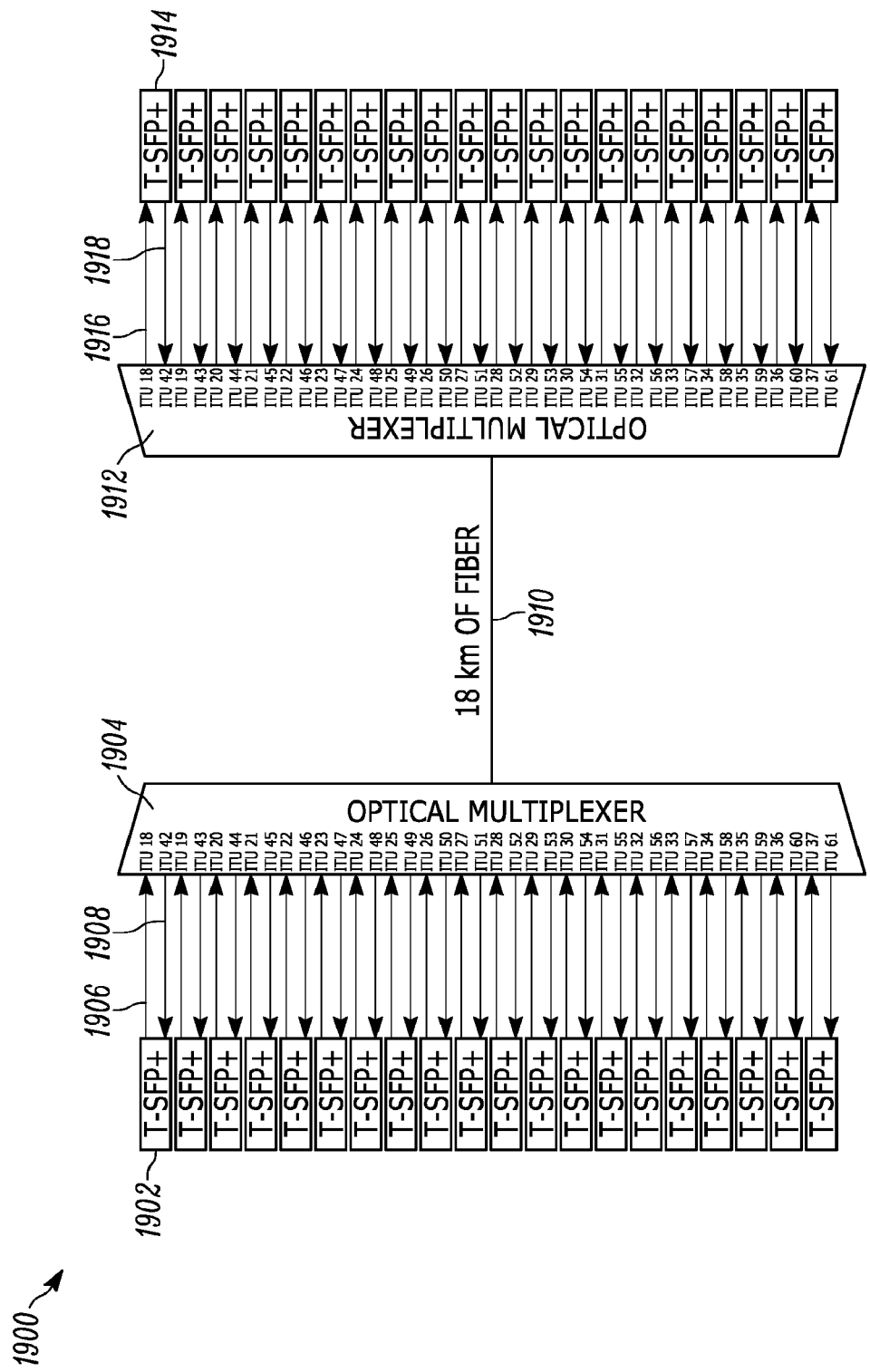
FIG. 19A illustrates a schematic of an embodiment of a WDM transport system comprising hardware-configured transceivers of the present teaching.

FIG. 19A illustrates a schematic of an embodiment of a WDM transport system 1900 comprising hardware-configured transceivers of the present teaching. Twenty hardware-configured transceivers 1902 at a near end are each connected to a WDM multiplexer/demultiplexer 1904 using two optical fibers 1906, 1908, one for each direction. The output of the multiplexer 1904 is connected to one end of an optical fiber 1910. The length of the optical fiber 1910 may be many lengths. In some embodiments, the optical fiber 1910 is 80 km long and can be longer. In some embodiments, the optical fiber 1910 is on order of 18 km long and can be longer. In some embodiments, the optical fiber 1910 is less than 18 km long. The other end of the optical fiber 1910 is connected to an input of a WDM multiplexer/demultiplexer 1912 at a far end. The outputs of the WDM multiplexer/ demultiplexer 1912 are connected to twenty hardware-configured transceivers 1914 at a far end using two optical fibers 1916, 1918, one for each direction. The term WDM transport optical interconnect as used herein refers to the connection between a transceiver at the near end and a transceiver at the far end of the hardware configured optical link according to the present teaching. The WDM transport optical interconnect extends from the input of the WDM multiplexer/demultiplexer 1904 at the near end to the output of the WDM multiplexer/demultiplexer 1912 at a far end. A WDM transport optical interconnect may comprise various optical components, including optical amplifiers and performance monitoring devices. Various embodiments of WDM transport system 1900 use various types of optical transceivers 1902, 1914. Some embodiments use coherent transceivers in a CFP2 form factor. Some embodiments use T-SFP+ transceivers. Some embodiments use a mix of transceiver types.

In some embodiments, at least some of the fibers 1906, 1908, 1916, 1918 are on order of 2 km long, a configuration also known as a "Remote PHY" configuration. Remote PHY is an emerging industry specification that applies to cable headend applications, but also to wireless and wired communication applications including Wi-Fi, LTE, various types of passive optical network (PON), and other telecommunications fiber optic network applications. Remote PHY refers to architectures that remove the physical layer transceiver element, also referred to as a PHY, out of the traditional access point to place it closer to the end-user or network endpoint. For example, one or more optical transceivers multiplexed in an optical WDM network may be located remotely from a cable access point that contains the multiplexing, line conditioning, and other network element devices. For example, the optical transceivers may be located at an enterprise. While examples presented herein relate to the application of the present teaching in a Remote PHY architecture, it is understood by those with skill in the art that a variety of known network architectures and industry specifications can be implemented using embodiments of the hardware-configured network apparatus and method described herein. Furthermore, the hardware-configured transceivers and/or other hardware-configured network elements of the present teaching may be located together or remotely from the optical multiplexing and/or optical line conditioning and/or performance monitoring devices that are part of the network.

Figure 19B:
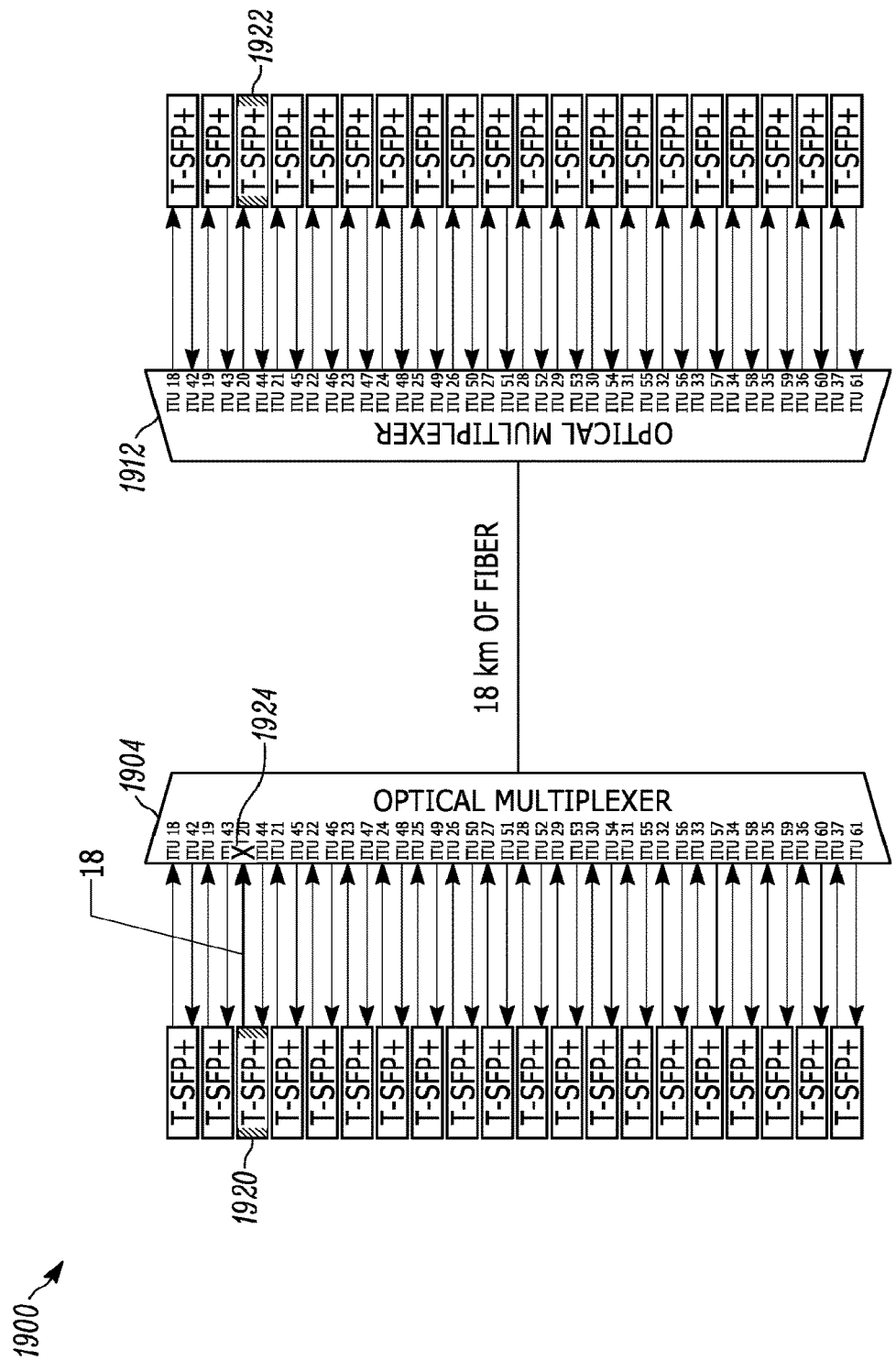
FIG. 19B illustrates a schematic of the WDM transport system of FIG. 19A in a state of an embodiment of the hardware-configured setup protocol of the present teaching.

FIG. 19B illustrates a schematic of a WDM transport system 1900 of FIG. 19A in a state of an embodiment of the hardware-configured setup protocol according to the present teaching. A transmitter of a near end transceiver 1920 slowly scans through wavelengths that may be ITU wavelength channels. The slow scan duration may be approximately one second per channel. The slow scan duration is set to provide enough time for a receiver at a far-end transceiver 1922 to detect the light and determine that its incoming link is on. The receiver at the far-end transceiver 1922 will receive only light with a wavelength of an appropriate channel to pass through the WDM mux/demux 1904 1912. For example, if the transceiver 1920 is connected to a WDM mux/demux 1904 port for ITU 20, and the transceiver is transmitting channel ITU 18, the light is blocked 1924 at the WDM mux/demux 1904. The far-end transceiver 1924 that would be expected to receive light from near-end transmitter 1920 is connected to the ITU 20 port of the WDM mux/demux 1812.

Figure 19C:
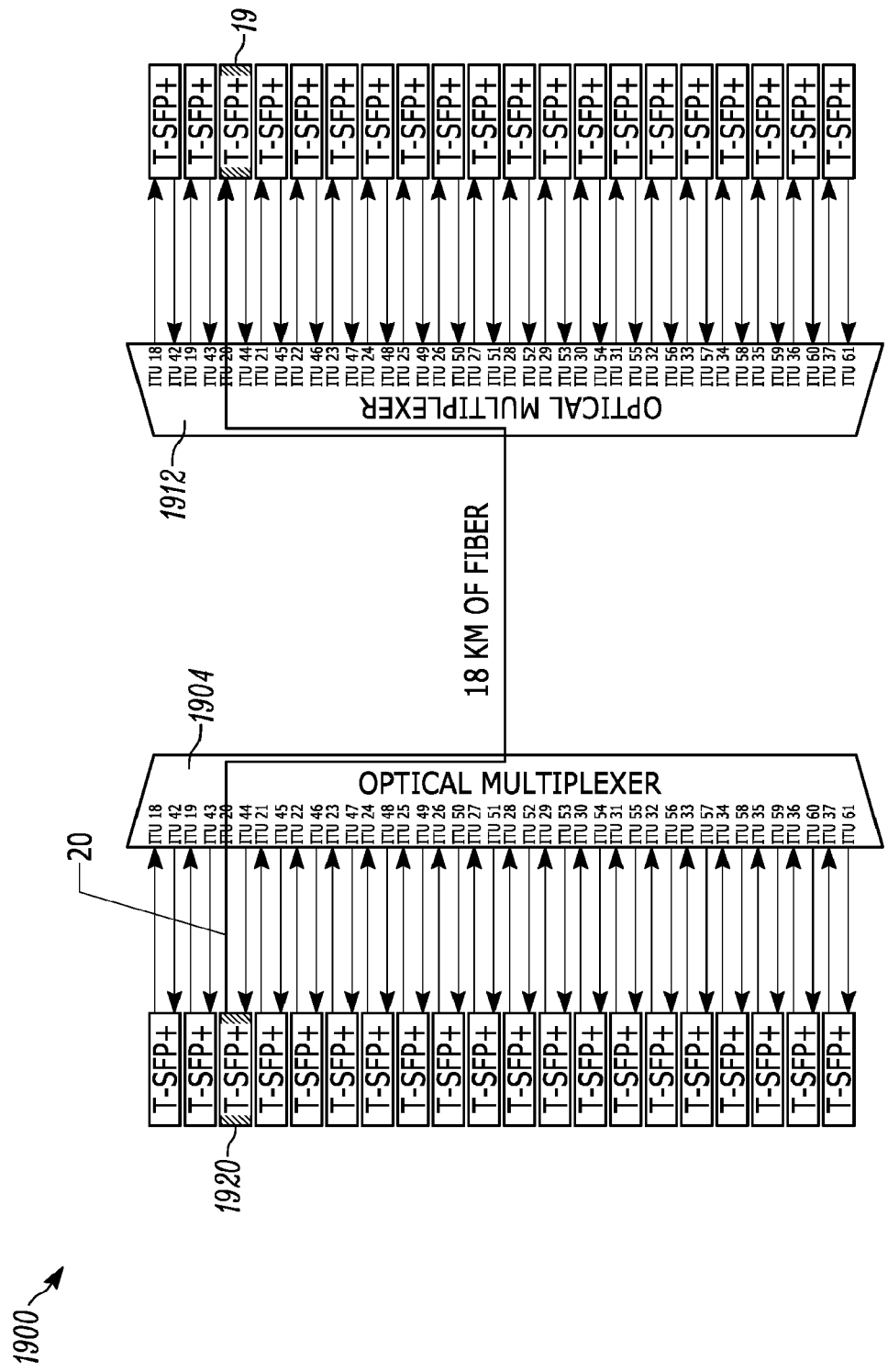
FIG. 19C illustrates a schematic of a WDM transport system of FIG. 19A in another state of an embodiment of the hardware-configured setup protocol of the present teaching.

FIG. 19C illustrates a schematic of a WDM transport system 1900 of FIG. 18A in another state of an embodiment of the hardware-configured setup protocol according to the present teaching. FIG. 19C illustrates the slowly tuning near end transceiver 1920 is tuned to channel ITU 20. This means the light from the near end transceiver 1920 passes through the WDM mux/demux 1904, 1912 and passes through to far-end transceiver 1924. Thus, when the near end transceiver 1920 wavelength matches WDM mux/demux 1904 port, the wavelength travels all the way through the network to the far-end transceiver 1924. Thus, far end transceiver 1924 detects a portion of the first optical signal transmitted over the link by transceiver 1920, and this detected light has a duration of a dwell time of a particular channel of a slow scan. Once the far-end transceiver determines that it is receiving light above a certain threshold of power, it initiates a fast tuning optical power sequence from the transmitter at the far-end transceiver 1924. The threshold of power in some embodiments is a loss-of-signal received power value. The fast tuning optical power sequence in some embodiments is a step-wise increment of each wavelength channel with a 10 ms dwell time on each channel.

Figure 19D:
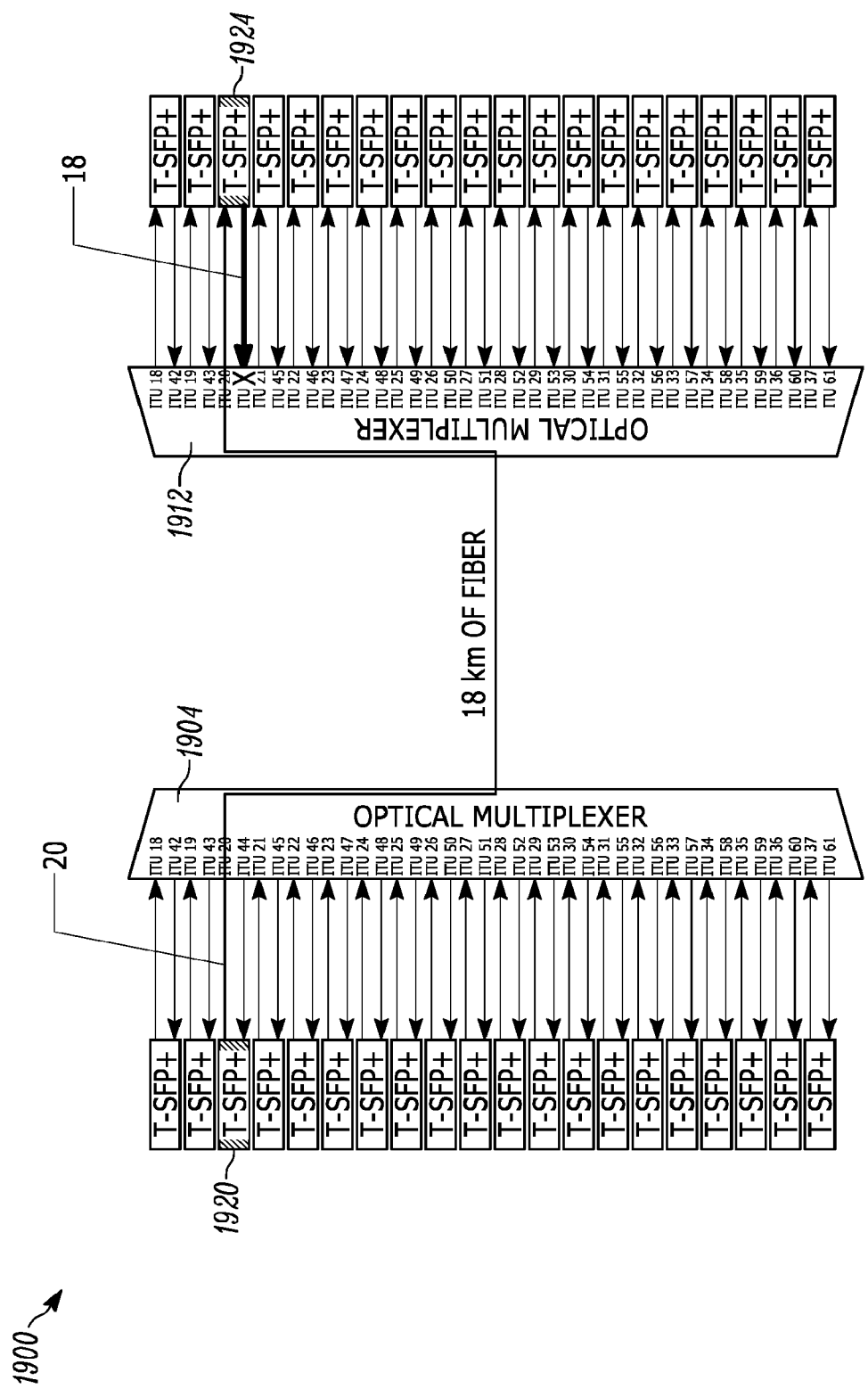
FIG. 19D illustrates a schematic of a WDM transport system of FIG. 19A in another state of an embodiment of the hardware-configured setup protocol of the present teaching.

FIG. 19D illustrates a schematic of a WDM transport system 1900 of FIG. 19A in another state of an embodiment of the hardware-configured setup protocol according to the present teaching. The transmitter of the far-end transceiver 1924 can generate a fast scan of wavelengths. The transmitter of the far-end transceiver 1924 quickly scans through a wavelength sequence that can be wavelengths of ITU wavelength channels. The dwell time on any one channel in the scan is referred to as a fast-scan duration. In some embodiments, the fast-scan duration is approximately ten milliseconds per channel. The snapshot of FIG. 19D illustrates that the transmitter is producing illumination at channel ITU 18, which will not pass through the port that passes channel ITU 44.

Figure 19E:
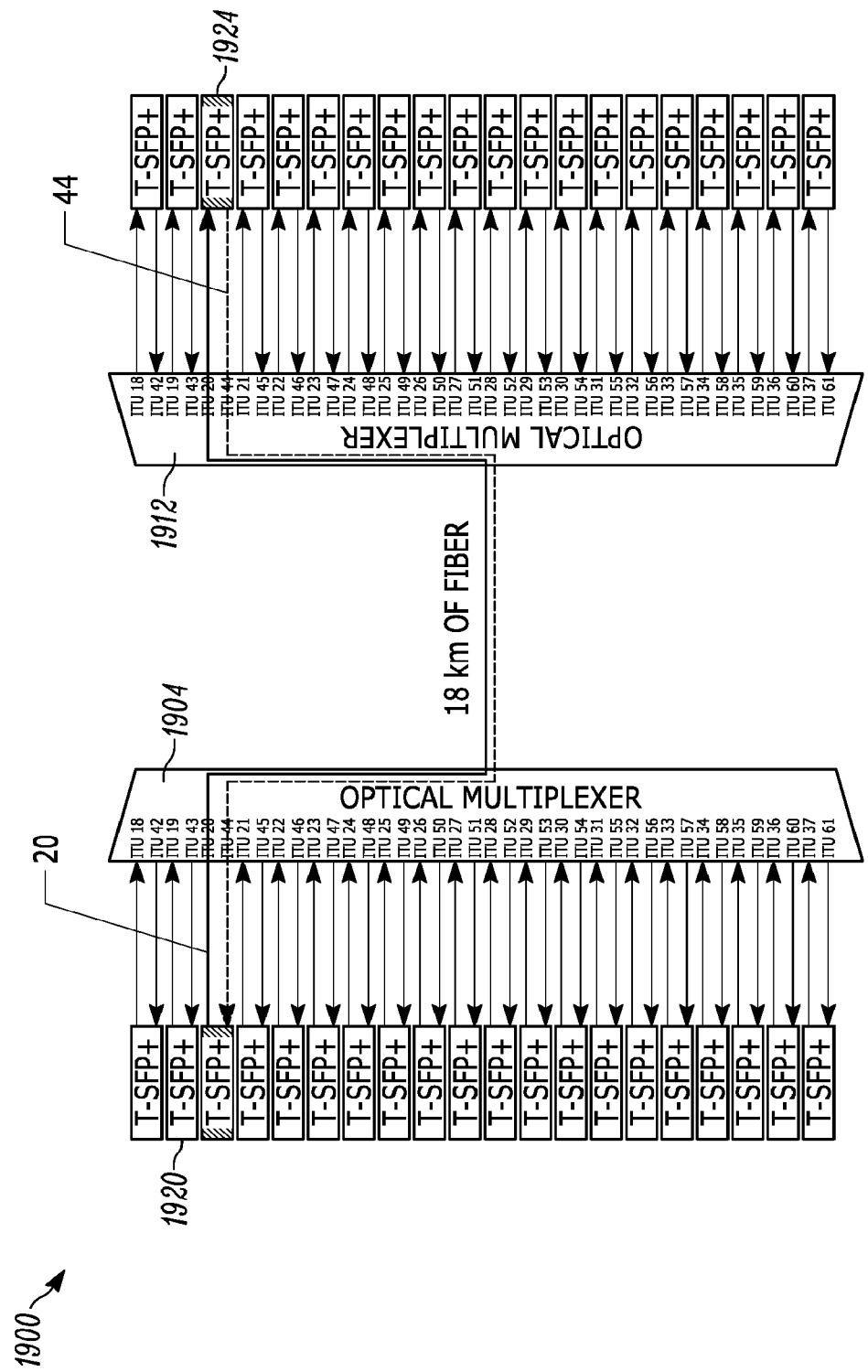
FIG. 19E illustrates a schematic of a WDM transport system of FIG. 19A in another state of an embodiment of the hardware-configured setup protocol of the present teaching.

FIG. 19E illustrates a schematic of a WDM transport system of FIG. 19A in another state of an embodiment of the hardware-configured setup protocol of the present teaching. The fast tuning transmitter in the far-end transceiver 1924 hits the channel ITU 44, which passes through the port of the WDM 1912 and the port of WDM 1904 to be received at the receiver of the near end transceiver 1920. Thus, the wavelength of the far-end transmitter matches wavelengths for both ports and the light travels all the way through the network to the near end transceiver 1920. Thus, near end transceiver 1920 detects a pulse of light having a duration that is equal to or less than the dwell time on the particular wavelength channel of the fast scan. At this point, both transceivers 1920, 1924 can lock their transmitting wavelengths and start normal operation, including passing live client traffic. In other words, the transceivers hold the respective transmitters at the current operating wavelength completing a bidirectional link and initiate communication.

Each of the twenty hardware-configured transceivers 1902 at a near end connected to the twenty hardware-configured transceivers 1914 by the WDM interconnect that includes optical multiplexers 1904, 1912 and fiber 1910 may be configured using various embodiments of the method of the present teaching. For example, a transceiver pair may be configured by using two uni-directional protocols described in connection with FIGS. 12A-B, or a transceiver pair may be configured using the single bi-directional protocol described in connection with FIG. 14. In addition, some transceivers may be configured by using a look-up table that contains data about which wavelength channel the WDM interconnect will pass in each direction between a particular transceiver pair. In embodiments that use a look-up table, the wavelength is tuned directly to the predetermined channel, and the connection is established immediately between the transceivers at the near and far ends of the link. This use of a look up table to establish the operating wavelength on which to transmit live traffic between the transceivers will speed the connection time for configuring a link. The use of a look up table can be performed on any or all of the unidirectional and/or bidirectional link setups in a multiple-transceiver WDM system. For example, in some embodiments, a look up table may be available with data about some, but not all, of the wavelength channels that pass through connections of the WDM interconnect between particular near-end/far-end transceiver pairs.

Figure 20:
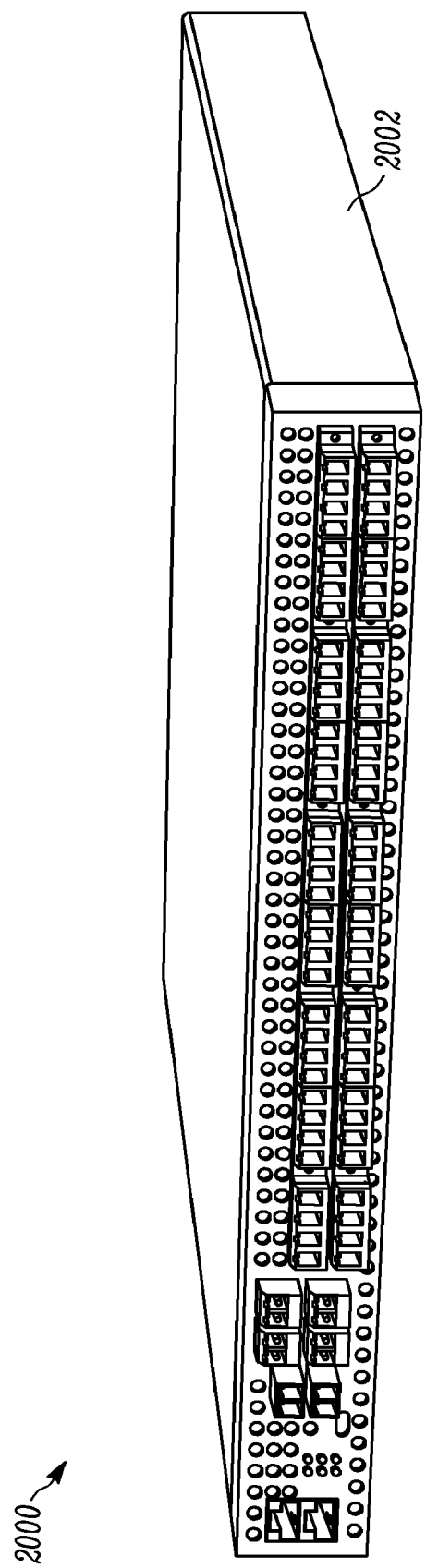
FIG. 20 illustrates an embodiment of a Remote PHY subsystem with gain of the present teaching.

One feature of the present teaching is that the links for the hardware-configured optical elements can be amplified links. In some embodiments with high-loss and/or long-distance optical fiber links, optical gain and/or compensation for fiber dispersion, including chromatic dispersion, is needed. In addition, control, monitoring and troubleshooting of the WDM network may be desired for one or all channels. FIG. 20 illustrates an embodiment of a Remote PHY subsystem 2000 with gain of the present teaching. The package 2002 supports two Remote PHY links in 1RU. The package 2002 supports optical gain, a compact high-resolution optical channel monitor (OCM), and can provide performance monitoring on each wavelength. In some embodiments, the Remote PHY subsystem 2000 can support optical fiber transport links up to 60 km long.

Figure 21:
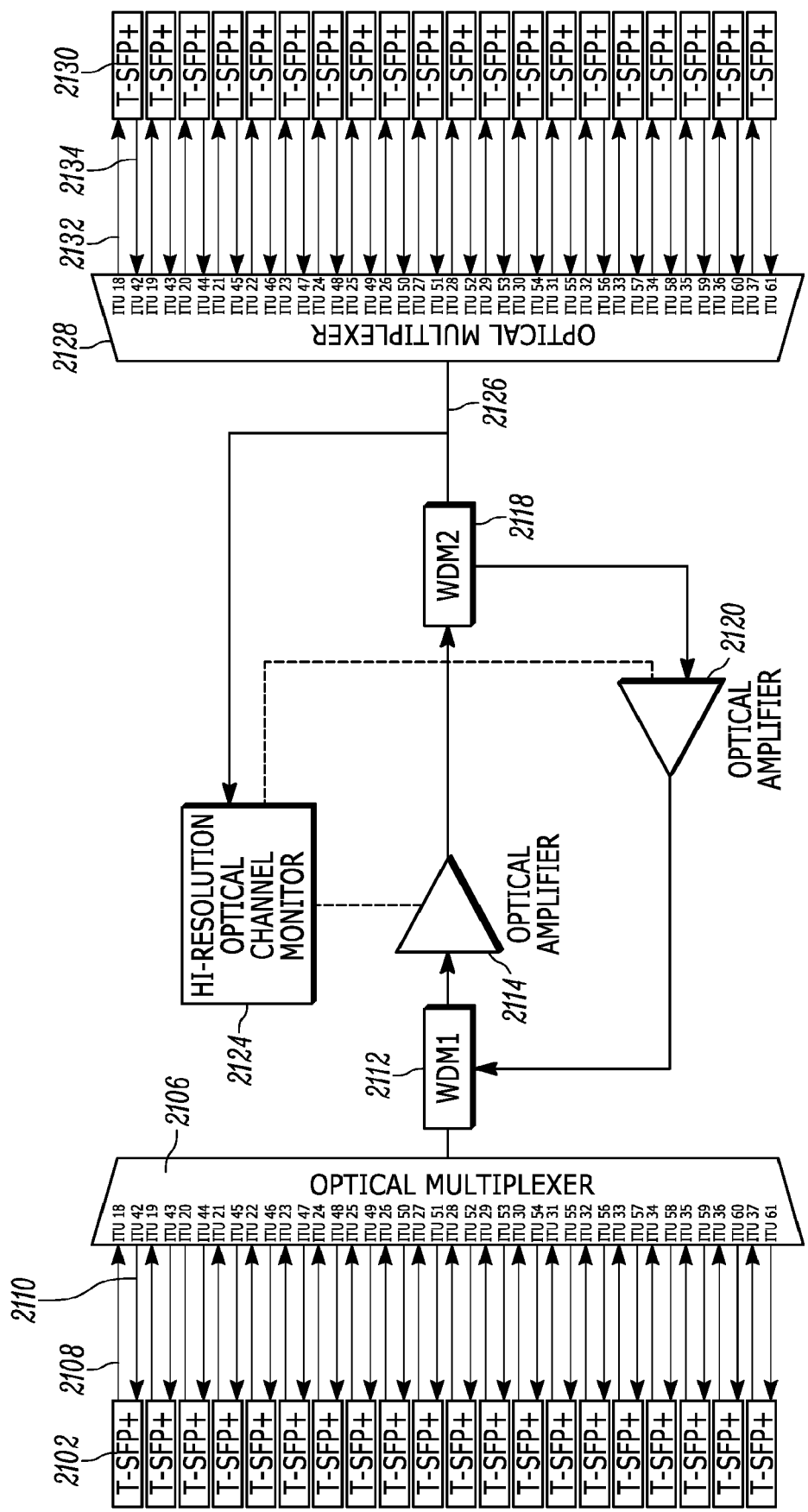
FIG. 21 illustrates schematic of an embodiment of a WDM transport system with gain that utilizes hardware-configured transceivers according to the present teaching.

FIG. 21 illustrates a schematic of a WDM transport system with gain that utilizes hardware-configured elements of the present teaching. The hardware-configured elements may be configured in a Remote PHY configuration. Remote PHY systems generally separate the transceiver devices from the multiplexing and link technology by a fiber link that is relatively long, as opposed to having them in the same box. This allows transceivers to be deployed at a location that is remote from the multiplexing and link technology. Twenty hardware-configured transceivers 2102 at a near end are connected to a WDM multiplexer/demultiplexer 2106 that is remotely connected to the transceivers 2102 using two optical fibers 2108, 2110 for each transceiver 2102, one fiber for each direction. The fibers 2108, 2110 are typically two kilometers long, but can be longer in some system. The output of the WDM mux/demux 2106 is connected to a first WDM 2112. The output of the first WDM 2112 is connected to an optical amplifier 2114. The output of the optical amplifier 2114 is connected to a second WDM 2118. One output of the second WDM 2118 connects to a second optical amplifier 2120, which connects back to the first WDM 2112. Another output of the second WDM 2118 connects to a splitter that sends some light to a high-resolution optical channel monitor 2124. The high-resolution optical channel monitor controls the two optical amplifiers 2114, 2120 so as to maintain high quality optical signals on each wavelength channel. A second output of the splitter is connected to a transport optical fiber 2126. In some embodiments, the transport optical fiber 2126 is on order of 58 km long, but can be longer in other embodiments. The other end of the transport optical fiber 2126 is connected to an input of a WDM multiplexer/demultiplexer 2128 at a far end. The outputs of the WDM multiplexer/demultiplexer 2128 are connected to twenty hardware-configured transceivers 2130 at a far end using two optical fibers 2132, 2134 one for each direction. In some embodiments, at least some of the fibers 2132, 2134 are on order of 2 km long, but can be longer in other embodiments.

Another feature of the present teaching is that it may be configured for different network applications. For example, the hardware-configured network elements of the present teaching may be configured for a typical telecommunications service provider network configuration. Alternatively, the hardware-configured network elements of the present teaching may be configured for a typical data communications service provider network configuration.

Figure 22A:
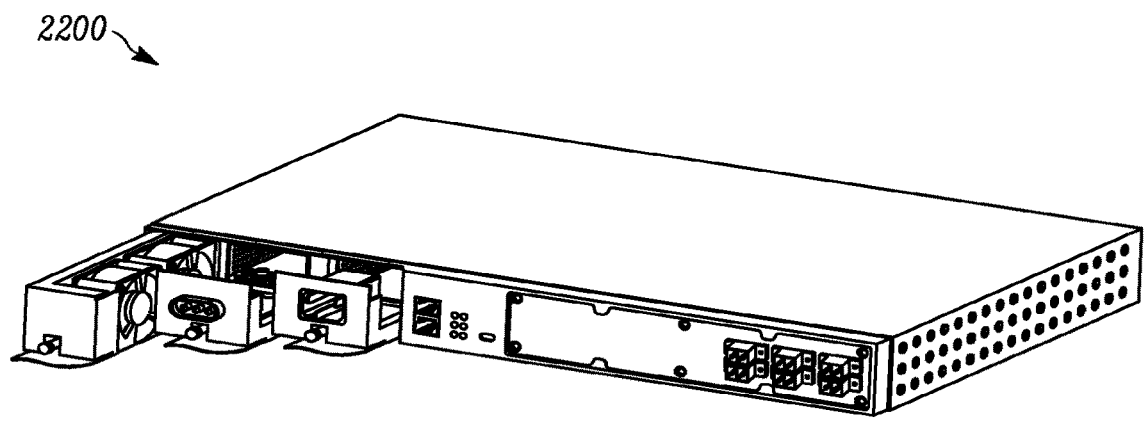
FIG. 22A illustrates an embodiment of a Remote PHY system using hardware-configured network elements of the present teaching configured for a telecommunication application.
Figure 22B:
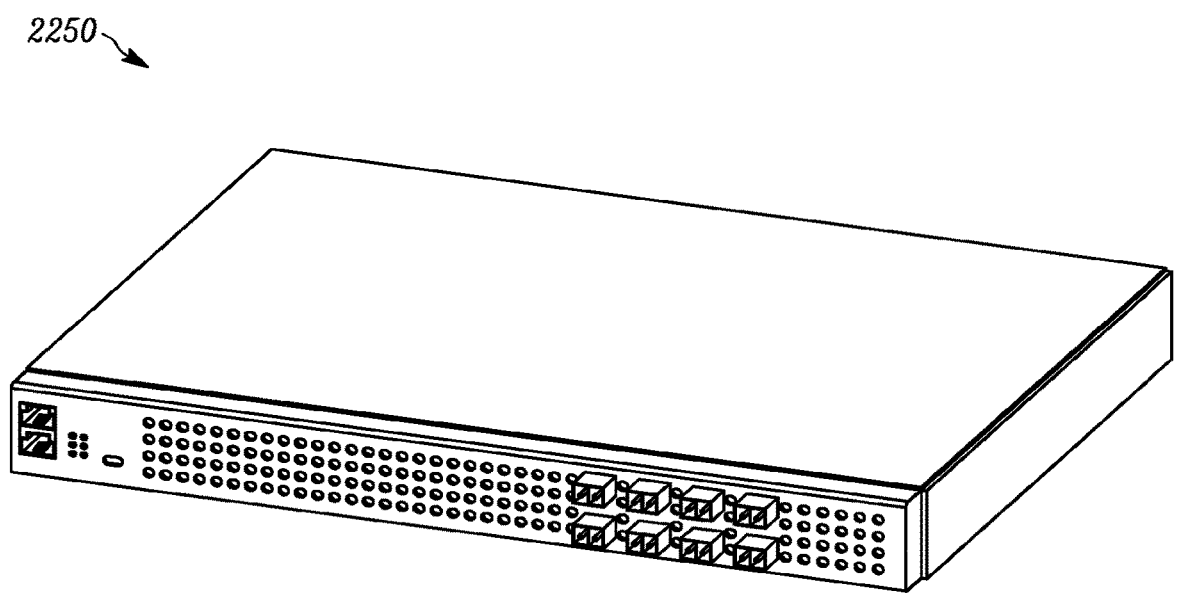
FIG. 22B illustrates an embodiment of a Remote PHY system using hardware-configured network elements of the present teaching configured for a data communication application.

FIG. 22A illustrates an embodiment of a Remote PHY system 2200 using hardware-configured network elements of the present teaching configured for a telecommunication application. FIG. 22B illustrates an embodiment of a Remote PHY system 2250 using hardware-configured network elements of the present teaching configured for a data communication application. In some embodiments, the Remote PHY systems 2200, 2250 include front-to-back cooling. In some embodiments, the Remote PHY systems 2200, 2250 have dual-redundant hot-swappable power supplies accessible from a back panel. The power supplies can be either AC or DC. In some embodiments the Remote PHY systems 2200, 2250 include dual-redundant hot-swappable fan units accessible from the back panel. In some embodiments, the Remote PHY systems 2200, 2250 have a 1U form factor with 450 mm depth. In some embodiments, the Remote PHY systems 2200, 2250 include a front panel that is free of optical connectors, and that is capable of supporting approximately one hundred LC type connectors.

Figure 23A:
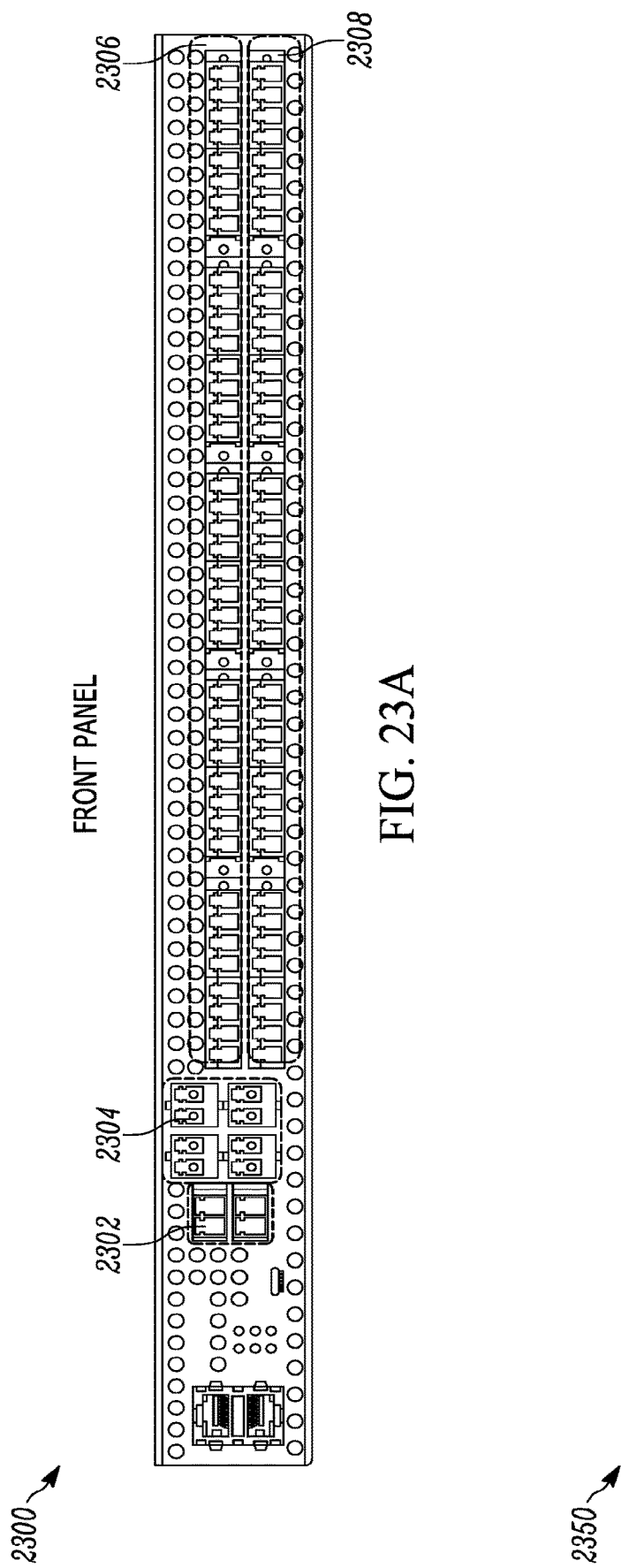
FIG. 23A illustrates an embodiment of a front panel of a Remote PHY system using hardware-configured network elements of the present teaching.

FIG. 23A illustrates an embodiment of a front panel 2300 of a Remote PHY system using hardware-configured network elements of the present teaching. The Remote PHY system can support two Remote PHYs. The front panel 2300 includes primary and secondary line ports 2302. Secondary line ports are optional. Monitor ports 2304 are included. The first Remote PHY includes forty MUX/DEMUX ports 2306. Also, there are forty MUX/DEMUX ports 2308 for the second Remote PHY.

Figure 23B:
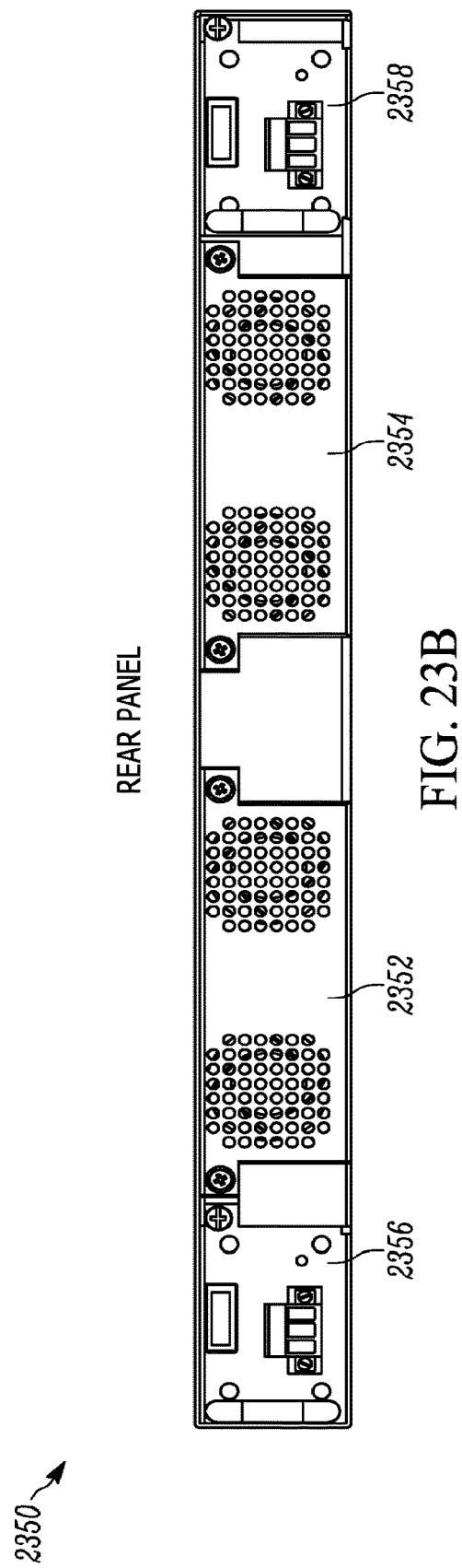
FIG. 23B illustrates an embodiment of a rear panel of a Remote PHY system using hardware-configured network elements of the present teaching.

FIG. 23B illustrates an embodiment of a rear panel 2350 of a Remote PHY system using hardware-configured network elements of the present teaching. There are dual-redundant hot-swappable fan units 2352, 2354. Each fan unit comprises two fans. There are dual-redundant hot-swappable power supplies 2356, 2358.

Figure 24:
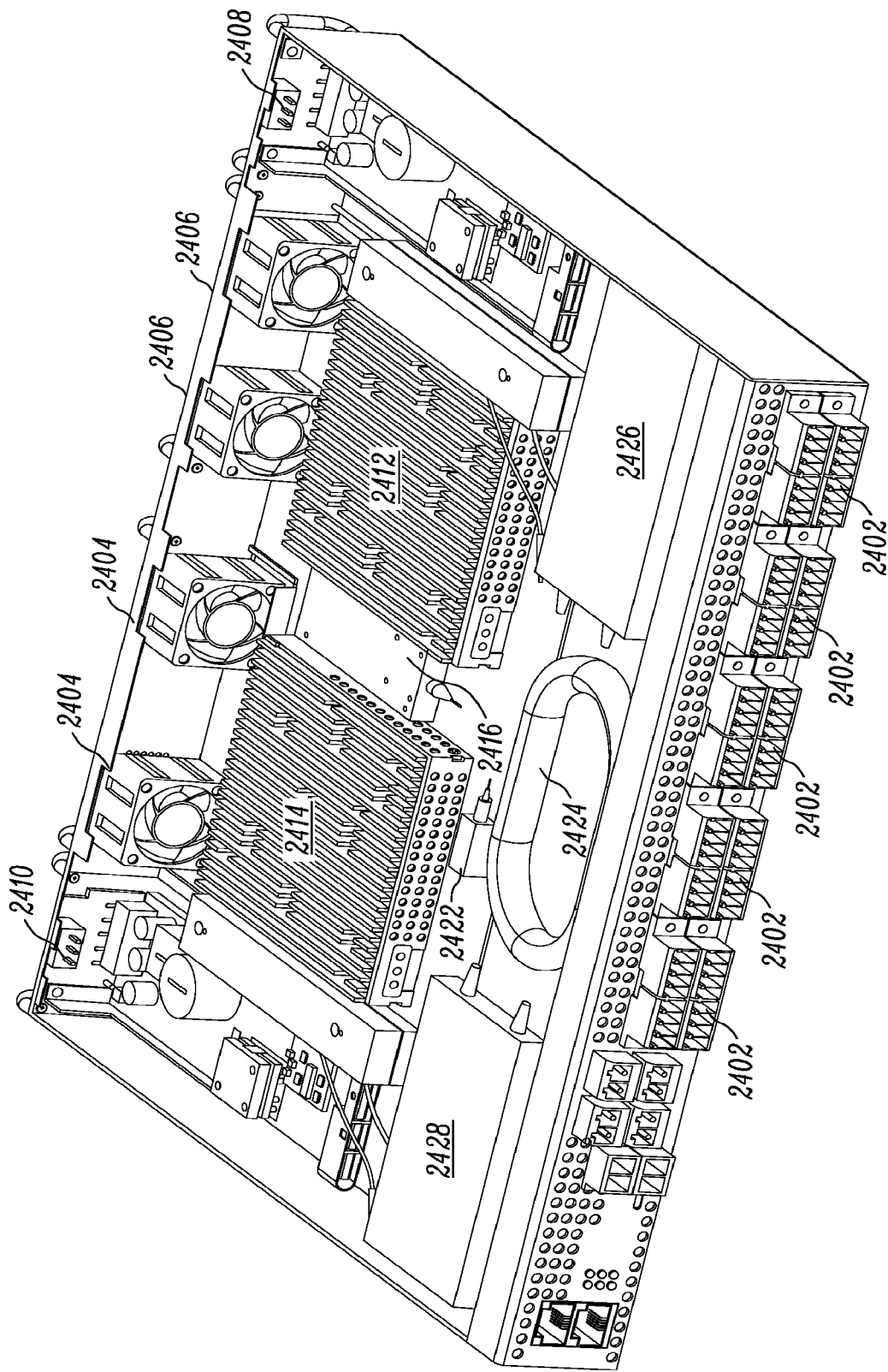
FIG. 24 illustrates a schematic of the functional blocks and layout of an embodiment of a Remote PHY system supporting two Remote PHYs using hardware-configured network elements of the present teaching.

FIG. 24 illustrates a schematic of the functional blocks and layout of an embodiment of a Remote PHY system supporting two Remote PHYs using hardware-configured network elements of the present teaching. The MUX/DEMUX ports 2402 on the front panel support a first and second Remote PHY connection. The Remote PHY system includes fan units 2404, 2406 and two power supplies 2408, 2410. There are two dual-optical amplifiers 2412, 2414 that may be erbium doped fiber amplifiers (EDFA). There is also an optical performance monitor 2416. There are also two sets 2318, 2320 of two dispersion compensating units each. There is an optical switch 2422 and a fiber management system 2424. There are also two WDM MUX/DEMUX 2426, 2428. Therefore, this embodiment of a Remote PHY system is capable of supporting some of the hardware-configured elements for two WDM transport systems that can be configured as a Remote PHY system that were described in connection with FIG. 21.

The optical channel monitors measure the number of wavelengths, the optical power levels of each channel and the OSNR of each channel. An automatic setup and configuration of the optical channel line monitor for primary and secondary links is supported. The optical output power is optimized to each receiver's best bit error rate (BER). The power can be set +/−2 dB for each receiver. This is critical for links with low OSNR. A dynamic system optimization can be performed in which the optical performance monitor provides real time feedback to adjust the optical amplifier and also variable optical attenuator settings for balancing power in the individual channels.

One feature of the method and apparatus of present teaching is that there is no required manual entry of parameters, which reduces setup time and minimizes errors. There is also no need for operations to pre-measure parameters on the fiber links, such as distance, link loss or other. The link loss versus distance can vary greatly depending on fiber quality, connection losses, and passive optic element variations. Previous systems required measurement of each link, and also suffered because errors in manual entry of connections may not be discovered until a fiber cut or other in-service disruption. This means that service is disrupted. The optical performance monitor of the present teaching provides early warning of OSNR or power degradation per wavelength channel which means that scheduled maintenance can be done before the link goes down. This improves service quality and reduces downtime for customers. The optical performance monitor of the present teaching also assists in locating the source of link issues, whether they are in the multiplexer/demultiplexer or in the Remote PHY transceivers. The improved operational properties of the hardware-configured networks of the present teaching reduce service truck rolls, as well as the time and cost of running a network.

One feature of the hardware-configurable transceivers of the present teaching is they simplify deployment of systems that utilize wavelength-tunable optical transceivers. For example, a variety of Dense Wavelength Division Multiplexing (DWDM) transceivers used in Remote PHY access networks constructed by multiple system Operators (MSOs). These systems may include products such as Finisar Corporation Flextune as well as UltraSpan® Optical Amplifiers for Remote PHY access networks and 200G coherent optical transceivers that support business services.

Some embodiments of WDM transport systems that utilize hardware-configured transceivers of the present teaching allow up to ninety-six wavelength-tunable optical transceivers in a Remote PHY network to self-configure their wavelengths to operate over the DWDM infrastructure without input from the host equipment nor intervention from technicians. Technicians insert the hardware-configured transceivers into any host port in the headend equipment and remote PHY nodes, and connect the hardware-configured transceivers to any of the optical multiplexer ports with fiber optic patch cables. Firmware and controllers contained in the transceivers determine the proper wavelengths to link the headend equipment to each Remote PHY node.

Operators only need to stock one universal hardware-configured wavelength-tunable transceivers of the present teaching as compared to the need for stocking many different fixed-wavelength modules. The configuration time of the transceivers for a fixed-wavelength-module link can take hours. The configuration time of a link using the hardware-configured transceivers can take minutes or less. In addition, technicians do not have to trace fibers from the optical multiplexer to the Remote PHY nodes. These fibers could be a distance of 2 km or longer.

Some embodiments of the hardware-configured transceivers of the present teaching utilize Finisar's 10 Gb/s wavelength-tunable duplex and dual-band bidirectional (BiDi) transceivers. In these embodiments a dual-band BiDi SFP+ transceiver fits a pair of wavelengths into each port of standard 100 GHz DWDM multiplexers and de-multiplexers. This allows up to eighty wavelengths to be deployed over existing forty wavelength DWDM networks. This results in a data capacity increase from 200 Gb/s to 400 Gb/s in each direction over a single fiber without replacing the entire infrastructure. Because it only has one optical connection for the pair of wavelengths, the BiDi transceiver also reduces the number of fiber optic patch cables by a factor of two, simplifying installation and saving space.

One feature of the present teaching is a method that supports automatic turn-up or configuration of a link that comprises hardware configured optical elements. This automatic turn-up function is also referred to in the art as establishing a link, establishing a connection, connecting a link, starting up a connection, and similar terminology. The automatic turn-up can proceed without any intervention from a human operator, and/or without the use of an external network management system once the elements are wired into the link. Various steps of a turn-up method according to the present teaching can be referred to as a connection protocol, connection algorithm, and/or a turn-up protocol or algorithm. Embodiments of the method according to the present teaching generally relate to one or more of steps for preconfiguring modules, powering up modules, and tuning module operating wavelengths. The method can be used, for example, to turn on and off radio frequency (RF) modulation that may, for example, contain client data traffic in a transceiver module, as well as to complete other steps involved in establishing an optical link.

It should be understood that while an objective of various embodiments of the method according to the present teaching are to establish a communication link between two hardware configured elements, various steps of the method can be practiced in whole or in part to achieve other objectives, such as testing, network reconfiguration, and various other operations. The communication links may be unidirectional and/or bidirectional. The hardware modules involved in the hardware-configured link turn-up method can, for example, be optical transceiver modules. Some embodiments of the hardware modules can include other elements in the link, such as amplifiers, wavelength selective switches, and numerous other devices. The method applies effectively to both turn-up of new links, as well as for adding devices to existing links that include operating connections that were not establish by embodiments of the method of the present teaching.

One feature of the method of the present teaching is that it allows deployment on existing systems because it uses a transparent connection of an optical control plane that operates independently from the client data traffic control plane. That is, there is no need to demodulate the client data to configure an element. The optical control plane refers to the connections and protocols used by the hardware configured elements to achieve a management objective, such as link turn-up. The optical control plane operates in some embodiments only between the optical transceivers and/or other hardware-configured optical elements in the link and does not necessarily need to connect to a host management system, or to connect to other elements in the optical system, for configuration. The hardware-configured elements do not need to be connected to or integrated into existing physical layer control plane or data-plane control systems to become operational.

The optical control plane of the present teaching is used, for example, to automatically turn-up the links after powering on the transceivers with no interaction of any operating control systems for existing traffic. This is because the hardware-configured transceivers can be configured to sense other operating traffic during the turn-up procedure without interrupting that traffic. As such, fiber optic cable facilities that are carrying live traffic can be upgraded, for example, from direct detection links operating at rates of 100 Gb/s or lower to coherent links operating at rates of 400 Gb/s or higher. One feature of the optical control plane of the present teaching is that there will be no service disruptions during upgrades, since operating traffic does not need to be taken off line.

One feature of the method and apparatus of the present teaching is the ability to automatically turn-up an optical link that uses coherent optical signaling format with a hardware configured SFP+ transceiver. The control information is modulated at a rate that is lower than the data rate of the traffic. Another feature of the method and apparatus of the present teaching is that it can be used to automatically turn-up optical links that do not have flexible or tunable optical multiplexers, such as WSS, to combine signals onto the transport fiber. The links can be uni-directional or bi-directional. Also, the links can use transceivers configured for direct detection or coherent signaling formats, or a combination of these formats. The transceivers can also be either tunable transceivers or fixed transceivers.

Another feature of the method and apparatus of the present teaching of the present teaching is that it can be used to automatically configure optical links with a variety of multiplexing and demultiplexing capabilities. The multiplexer and demultiplexer devices are often referred to a combiners and/or splitters. The terms splitter and combiner may be used interchangeably when referring to these devices. Splitter and combiner devices combine and split optical signals from one or more inputs to one or more outputs, and are capable of operating in both directions as is well known by those of skill in the art.

As examples of various mux/demux capabilities, some embodiments of the present teaching that are coherent links use passive splitters/combiners without any wavelength filtering. Some link embodiments use fixed-filter splitters, such as arrayed waveguide grating (AWG) devices. Other embodiments use flexible, tunable filter splitters, such as a wavelength selective switch (WSS). Embodiments that use filtering splitters and combiners can use direct detection, coherent detection, or a combination of the two transceiver types. Some link embodiments use a bidirectional, single fiber link. Other link embodiments use two unidirectional fibers to form a bidirectional link.

Some embodiments use a coherent architecture with a single laser within the transceiver, in which the receive operation wavelength is the same as the transmit operating wavelength. This is because transmit and receive operations share the same local oscillator (LO) laser device. In these embodiments, a bi-directional link operates on the same wavelength for both directions. This architecture, therefore, does not allow receiving on one wavelength and transmitting on another wavelength since both transmit and receive paths share the same laser.

In some embodiments of systems according to the present teaching, the AWG and/or WDM demultiplexer are not present, and the result is an optical link with both ends operating on the same ITU channel. Also, in some embodiments of systems according to the present teaching, transmission is done a separate wavelength. In these embodiments, the receive path operates in a listening mode to determine the required broadcast ITU channel. In these embodiments, there is no down link, only an up link. In other words, a uni-directional link is established.

In embodiments of systems according to the present teaching in which at least some of the transceivers use direct detection, the receivers are free running. For direct detection systems, the transceivers do not use coherent signal formats. This means that these receivers do not require a local oscillator laser to function. Therefore, it is possible to receive one wavelength through a WDM demultiplexer or WSS and transmit on a different laser wavelength.

One feature of the present teaching is that coherent transceivers can be used for some channels of a WDM system while channels are provided by transceivers that utilize direct detection. This is, coherent transceivers can be added to an existing system that is using direct detection for some channels.

Figure 25:
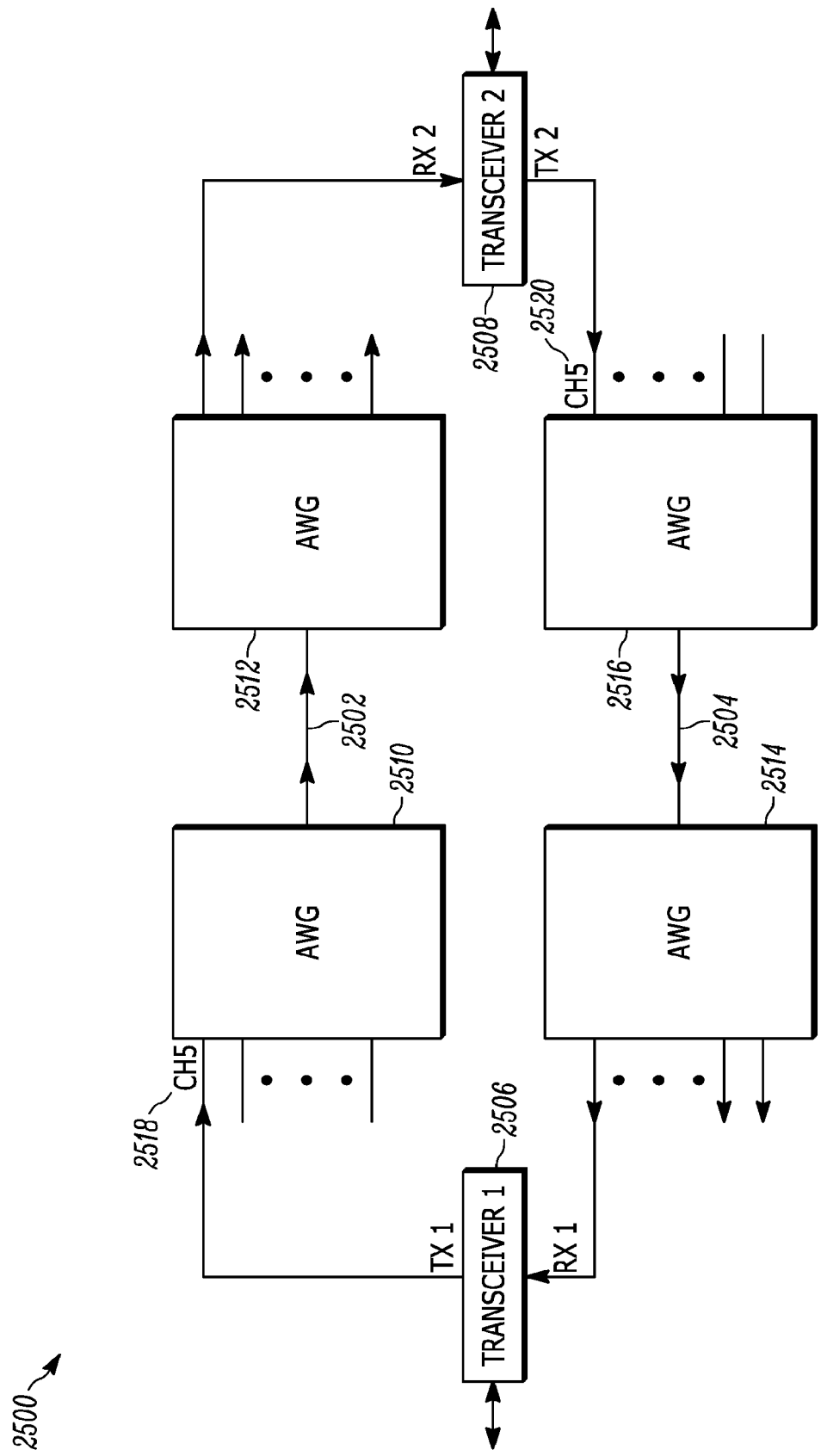
FIG. 25 illustrates a schematic of an embodiment of a WDM transport link that utilizes two unidirectional fibers to connect hardware-configured tunable transceivers using fixed AWG filters according to the present teaching.

Some embodiments of the present teaching use fixed, wavelength filtered combiner/splitters. FIG. 25 illustrates a schematic of an embodiment of a WDM transport link 2500 that utilizes two unidirectional fibers 2502, 2504 to connect hardware-configured tunable transceivers, transceiver1 2506 and transceiver2 2508 using fixed, non-tunable, AWG filters 2510, 2512, 2514, 2516 according to the present teaching. A transmitter of transceiver1 2506 is connected to an input port of AWG 2510 to send an optical signal over fiber 2502 to AWG 2512. The signal from the transmitter of transceiver1 2506 passes to an output port of AWG 2512 that is connected to a receiver of transceiver2 2508. A transmitter of transceiver2 2508 is connected to an input port of AWG 2516 to send an optical signal over fiber 2504 to AWG 2514. The signal from the transmitter of transceiver2 2508 passes to an output port of AWG 2514 that is connected to a receiver of transceiver1 2506.

The turn-up method that automatically establishes a link according to the present teaching eliminates upper layer software and connects links after power-up of the transceivers 2506, 2508 on both sides of the link 2500. For purposes of the following description of the method of the present teaching associated with FIGS. 25-27C, channel 5 2518 is chosen for transmit side of transceiver1 2506, and channel 5 2520 is chosen for the receive side of transceiver1 2506. These are the channels that pass through the AWG connecting a path from the transmitter at one end of the link to the receiver at the other end of the link. The two ends of the link may be referred to as a near end and a far end to distinguish the two ends without loss of generality. The embodiment of the method that automatically establishes a link between the two ends is further described below in connection with FIGS. 26A-27C.

Figure 26A:
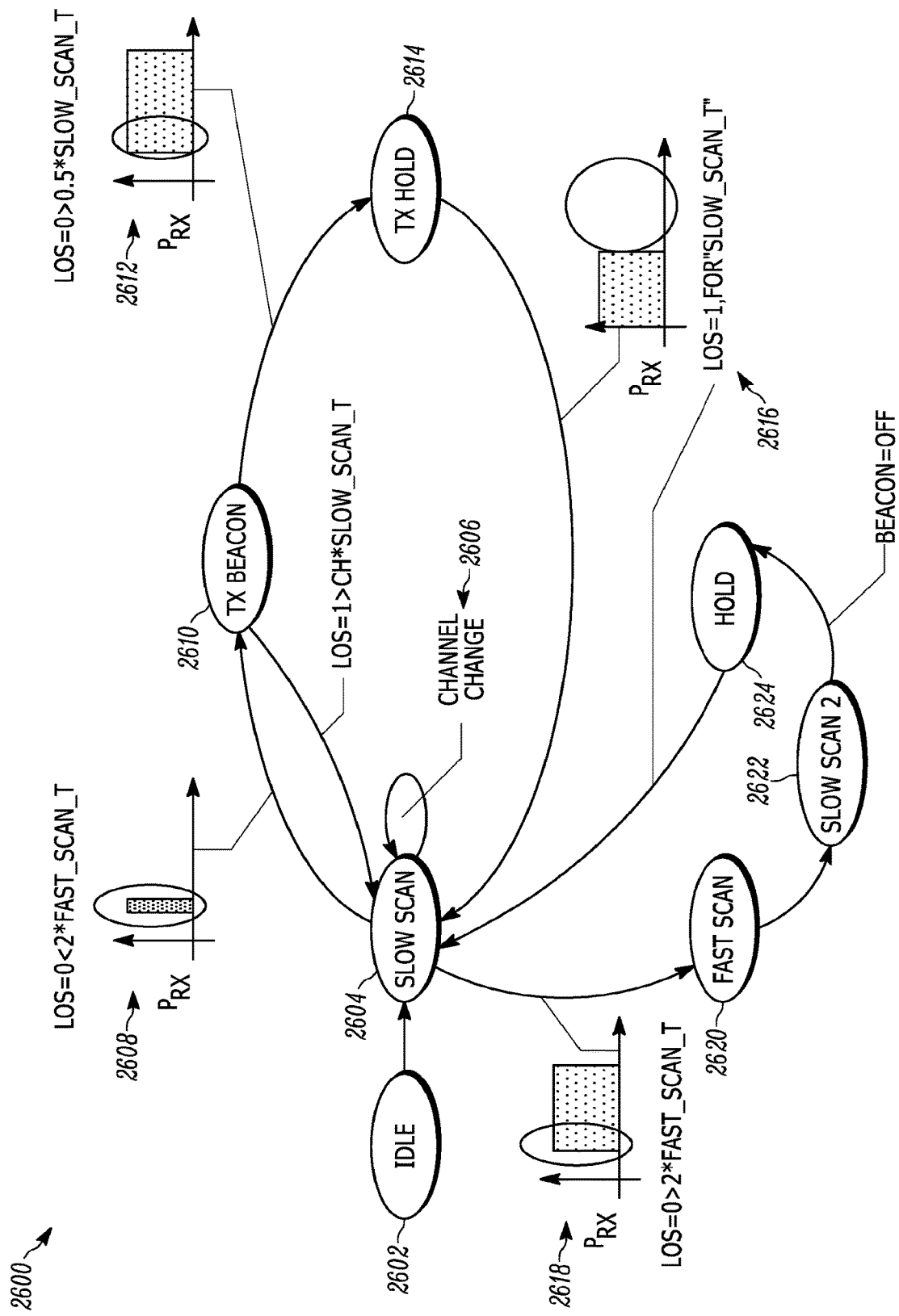
FIG. 26A illustrates a state diagram of an embodiment of a method of automatic channel turn up of the hardware configured optical link of FIG. 25.

FIG. 26A illustrates a state diagram of an embodiment of a method of automatic channel turn up of the hardware configured optical link of FIG. 25. Referring both to FIGS. 25 and 26, the transceivers 2506, 2508 have a loss of signal (LOS) indicator wherein LOS=1 means that no light is detected and LOS=0 means that light is detected in the receiver. The link system typically begins at idle state 2602. This idle state 2602 occurs, for example, when both transceivers 2506, 2508 are powered up. One rule of the state machine shown in the state diagram 2600 is if the LOS is producing a "BEACON" signal in which the signal is turned on and off, as described, for example, in connection with FIGS. 13-14 above, then the transmitter transitions to a slow-scan state 2604, referred to as SLOW_SCAN_T, tuning its wavelength through a sweep of channels at a slow rate of speed. Each channel change in the sweep is shown in the state diagram 2600 as a channel-change transition 2606. The slow scan and fast scan wavelength tuning parameters are the same as, or similar to, those described in connection with FIGS. 13-14 above. From slow-scan state 2604, when the receiver in transceiver 2506, 2508 detects LOS=0 with a power value that is positive, but lasts for less than a duration of two consecutive fast scan pulses, as shown in received power diagram 2608, the associated transmitter transitions to the TX BEACON state 2610 where the transmitter produces a beacon signal. This LOS=0 case represents a single pulse from a fast wavelength scan being sensed by the receiver.

From state SLOW SCAN 2604, on a received LOS=0 with a power that lasts for more than a duration of two consecutive fast scan pulses, as shown in the received power diagram 2618, the transmitter transitions to FAST SCAN 2620 where the transmitter provides a fast channel wavelength scan. The LOS=0 case represents light on the detector that lasts for a duration that is longer than a single fast scan pulse, and therefore represents that the light from the other end transmitter has made it to the receiver. The system transitions from fast scan state 2620 to a second slow scan state 2622. On a BEACON=OFF detection, there is a transition to HOLD state 2624.

From TX BEACON state 2610 on a received LOS=0 in which the pulse lasts for longer than at least half of the duration of a slow scan dwell time, as shown in the received power diagram 2612, the transmitter transitions to TX HOLD state 2614. In the TX HOLD state 2614, the transmitter continues to hold the current wavelength channel to which it is tuned. From the TX HOLD state 2614 on a received LOS=1 as shown as the received power diagram 2616, the transmitter transitions to TX SLOW SCAN state 2604. From TX BEACON, the transmitter transitions to SLOW SCAN state 2604 in the case of a received LOS=1 for a duration that is greater than a slow scan time period. A received LOS=1 as shown in received power diagram 2616 initiates a transition from HOLD STATE 2624 to SLOW SCAN state 2604.

Figure 26B:
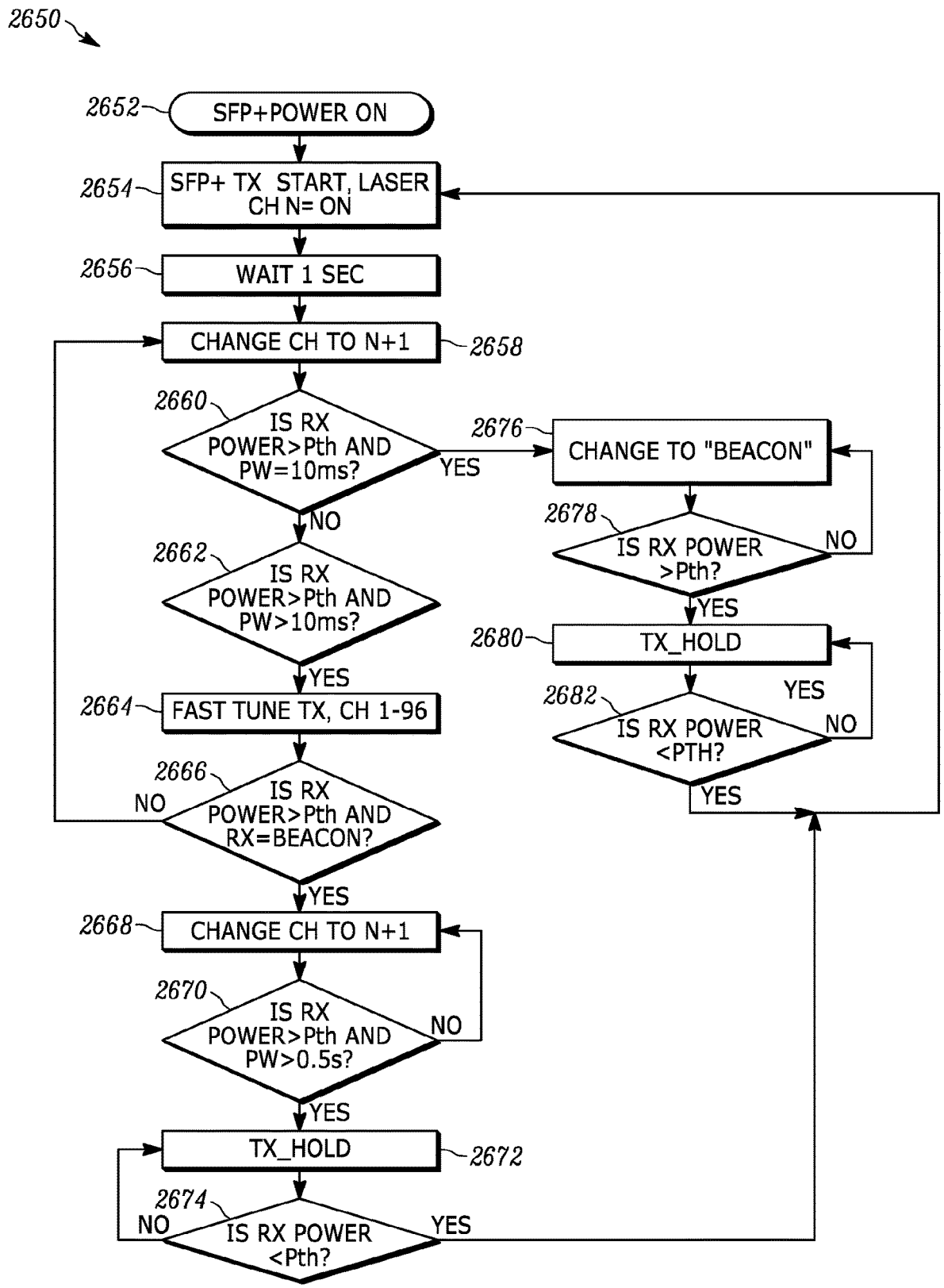
FIG. 26B illustrates a process flow diagram of an embodiment of a method of automatic channel turn up of the hardware configured optical link of FIG. 25.

FIG. 26B illustrates a process flow diagram of an embodiment of a method 2650 of automatic channel turn up of the hardware configured optical link of FIG. 25. The flow chart is intended to illustrate the steps in transitions of states in embodiments of the method 2650 of the present teaching. It should be understood that the numbering of the steps in the process flow diagram does not imply a particular order and/or particular timing of the execution of steps of the method 2650. In various embodiments, all or part of the steps, are utilized as desirable to be consistent with present teaching. FIG. 26B describes a SFP+ type transceiver, but other embodiments may use other transceiver types. FIG. 26B is described herein using the transceiver configuration illustrated in FIG. 25. However, as will be understood by those skilled in the art, a variety of different transceiver configurations can follow the steps of the method 2650 of FIG. 26B to bring up links. It should also be understood that multiple transceivers can be operating using the steps of the method 2650 in parallel and/or in series to bring up multiple optical links between transceivers without human and/or management system intervention. Unidirectional and bidirectional links may also be established. Also, while the description includes reference to a predetermined threshold value, $P_{th}$, and various durations and times, these represent only particular embodiments. In various embodiments, various power threshold values may be used, and also various decision steps may use the same or different threshold values. Various durations and pulse widths may also be used as described herein.

Step one 2652 of the method is power on of transceivers, such as the transceivers 2506, 2508 of FIG. 25. The description of the method proceeds referring to only one transceiver with the understanding that any number of transceivers may be executing various steps of the method in various embodiments of a method of establishing a link using the methods of the present teaching.

In step two 2654, the transmitter laser in a transceiver starts transmitting power on a channel, N. In step three 2656, the transmitter laser waits one second dwelling on the channel and then changes to channel N+1 in step four 2658. In a decision step five 2660, the receiver in a transceiver monitors for power and determines whether a received power is greater than a predetermined threshold value, $P_{th}$. In some embodiments, the threshold value is the established loss-of-signal received power value. For example, a loss-of-signal received power level may be in range of −35 dBm to 0 dBm, depending on the application.

The receiver also determines if the detected power has a duration equal to a particular predetermined value. This duration is chosen to be a duration of a fast scan dwell time on a particular channel. In some embodiments, the particular value of the pulse duration is 10 ms. The duration may also be referred to as a pulse width (PW) as in described in connection with FIG. 26B. If the receiver does not sense power greater than the predetermined threshold value and duration or pulse width equal to 10 ms or other predetermined value, the method continues to another decision in the sixth step 2662. In step six 2662, the receiver continues to monitor to determine the duration of the received power and if the duration, or pulse width PW, exceeds 10 ms. If so, the method moves to step seven 2664 in which the transmitter initiates a fast scan wavelength scanning sequence as described herein.

In a decision step eight 2666, the receiver in a transceiver monitors for power and detects optical power. The receiver determines if the detected optical power is greater than a predetermined threshold value, $P_{th}$, and whether the detected optical power has a timing pattern with durations consistent with a BEACON signal as described herein. If a BEACON signal is detected, the method proceeds to a step nine 2668 and the wavelength channel is incremented by one channel in the transmitter of the transceiver detecting the BEACON. In a decision step ten 2670, the receiver in the transceiver continues to monitor the optical power and determines if the detected optical power is greater than a predetermined threshold value, $P_{th}$, and whether the detected optical power has a duration greater than a particular duration of a BEACON signal ON state (in this example 0.5 seconds). If so, the method proceeds to step eleven 2672 in which the transmitter in the transceiver moves to a HOLD state as described herein. In decision step twelve 2674, the receiver in the transceiver monitors for power and detects optical power and, if the power is not less than a predetermined threshold value, $P_{th}$, the system goes to step eleven 2672. That is, the system remains in a HOLD state. However, if the power drops below the predetermined threshold value, $P_{th}$, the method moves back to step two 2654 to begin another slow scan as described herein.

If in the decision associated with step five 2660, the receiver in the transceiver monitors for power and determines that the received power is greater than a predetermined threshold value, $P_{th}$ and that the duration is greater than a dwell time on a particular channel of a fast scan, for some embodiments this is a PW=10 ms, then the method proceeds to step thirteen 2676, and the transmitter in the transceiver moves to a BEACON state as described herein. In a decision step fourteen 2678, the receiver monitors for optical detected power and determines if the detected power is greater than the predetermined threshold value, $P_{th}$. If not, the method proceeds back to step thirteen 2676. If so, the method proceeds to step fifteen 2680, and the transmitter moves to HOLD state as described herein. In decision step sixteen 2682, the receiver monitors for optical detected power and determines if the detected power is less than the predetermined threshold value, $P_{th}$. If not, the method proceeds back to step fifteen 2680. That is, the transceiver remains in HOLD. If so, the method proceeds back to step two 2654 to begin another slow scan as described herein. In some embodiments, the predetermined threshold value, $P_{th}$, is a power that results in a LOS=0 condition at a transceiver connected to the link. That is a power detected at this transceiver from an optical signal being present on the link.

Figure 27A:
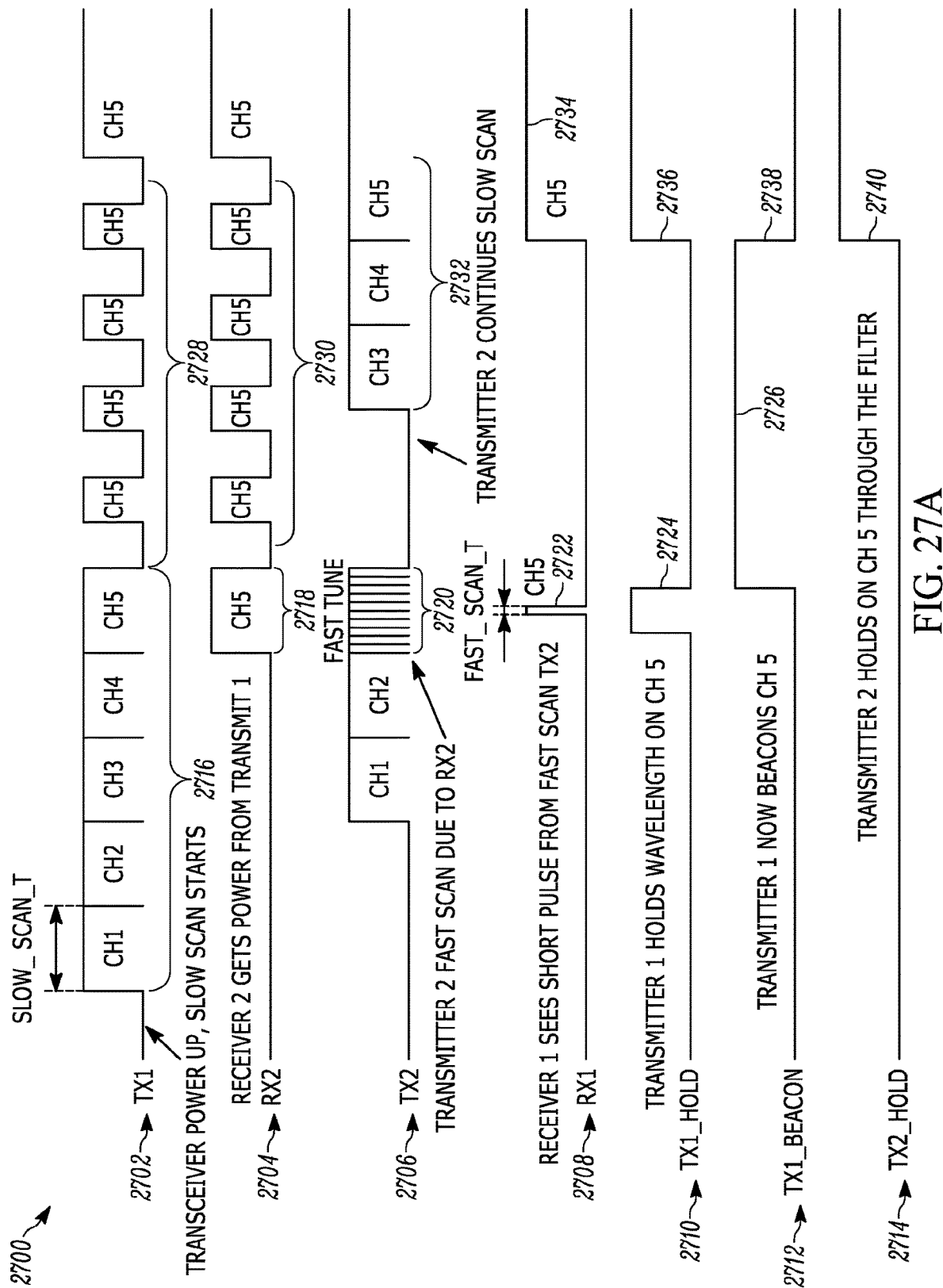
FIG. 27A illustrates graphs showing the optical power as a function of time for a set of transmitter and receiver states and associated state timing diagrams for an embodiment of a method for link connection associated with the hardware-configured optical link of FIG. 25.

FIG. 27A illustrates graphs 2700 showing the optical power as a function of time for a set of transmitter and receiver states and associated state timing diagrams for an embodiment of a method for link connection associated with the hardware-configured optical link of FIG. 25. Referring to FIGS. 25-27A, the graphs 2700 illustrate the transmitted optical signal 2702 produced by the transmitter at the near end transciever1 2506 in SLOW SCAN state 2604, the received optical signal 2704 received at the receiver at the far end transceiver2 2508, the transmitted optical signal 2706 produced by the transmitter at the far end transceiver2 2508, and the received optical signal 2708 received at the receiver at the near end transciever1 2506. Also illustrated are graphs of the HOLD state 2614 timing diagram 2710 for the transmitter at the near end transciever1 2506, the BEACON state 2610 timing diagram 2712 for the transmitter at the near end transciever1 2506, and the HOLD state 2614 timing diagram 2714 for the transmitter at the near end transciever2 2508. In the timing diagrams, the high state represents being in the state, and the low state represents being out of the state.

In the illustrative example presented in FIG. 27A, transciever1 2506 turns on and begins in a TX_SLOW_TUNE state 2716, tuning through wavelengths at a rate of, for example, one second per channel starting at channel 1. When the transceiver1 2506 tunes to channel 5, a signal 2718 is detected at the transceiver2 2508. In some embodiments, the receiver specifically detects that this signal lasts for a duration that is longer than the time taken to tune through two channels of a fast scan duration, which is a duration of twice the fast scan duration. This may be evidenced by the transceiver monitor producing a LOS=0 for this duration. The reason for monitoring the duration in addition to the presence or absence of light on the detector is to ensure the detection is a slow scan and not a fast scan, which would last for only one fast scan pulse duration. The monitoring is optional. The signal 2718 being detected at the transceiver2 2508 causes the transmitter in transceiver2 2508 to implement a TX_FAST_TUNE 2720 fast optical wavelength scan. During this fast scan 2720, when channel five is transmitted from transceiver2 2508, the light passes to the transciever1 2506 and a received signal 2722 is detected at the transceiver1 2506 as shown at 2722. This causes transciever1 2506 to transition to a TX_HOLD state 2614 on channel five as shown in timing diagram 2710 at position 2724. Transceiver1 2506 transitions to a TX_BEACON state 2726 on the same channel five as shown in the transmitted signal turning on and off channel 5 as shown in transmitted signal 2730 2728 and received signal at transceiver2 2508. Detection of this beacon signal causes the transmitter in transceiver2 2508 to begin a TX_SLOW_TUNE state 2604 as shown at time 2732. The receiver in transciever1 2506 detects the optical signal transmitted from transceiver2 2508 when it tunes to channel five and so produces a detected signal 2734. This detection of a signal in transciever1 2505 causes transciever1 2505 to move from BEACON to HOLD as shown in timing diagrams at positions 2736, 2738. Detecting the transition from BEACON to HOLD then causes transceiver2 2508 to HOLD on channel five 2740, the current wavelength channel in this example. The bidirectional link is now established, and traffic can flow in both directions.

Figure 27B:
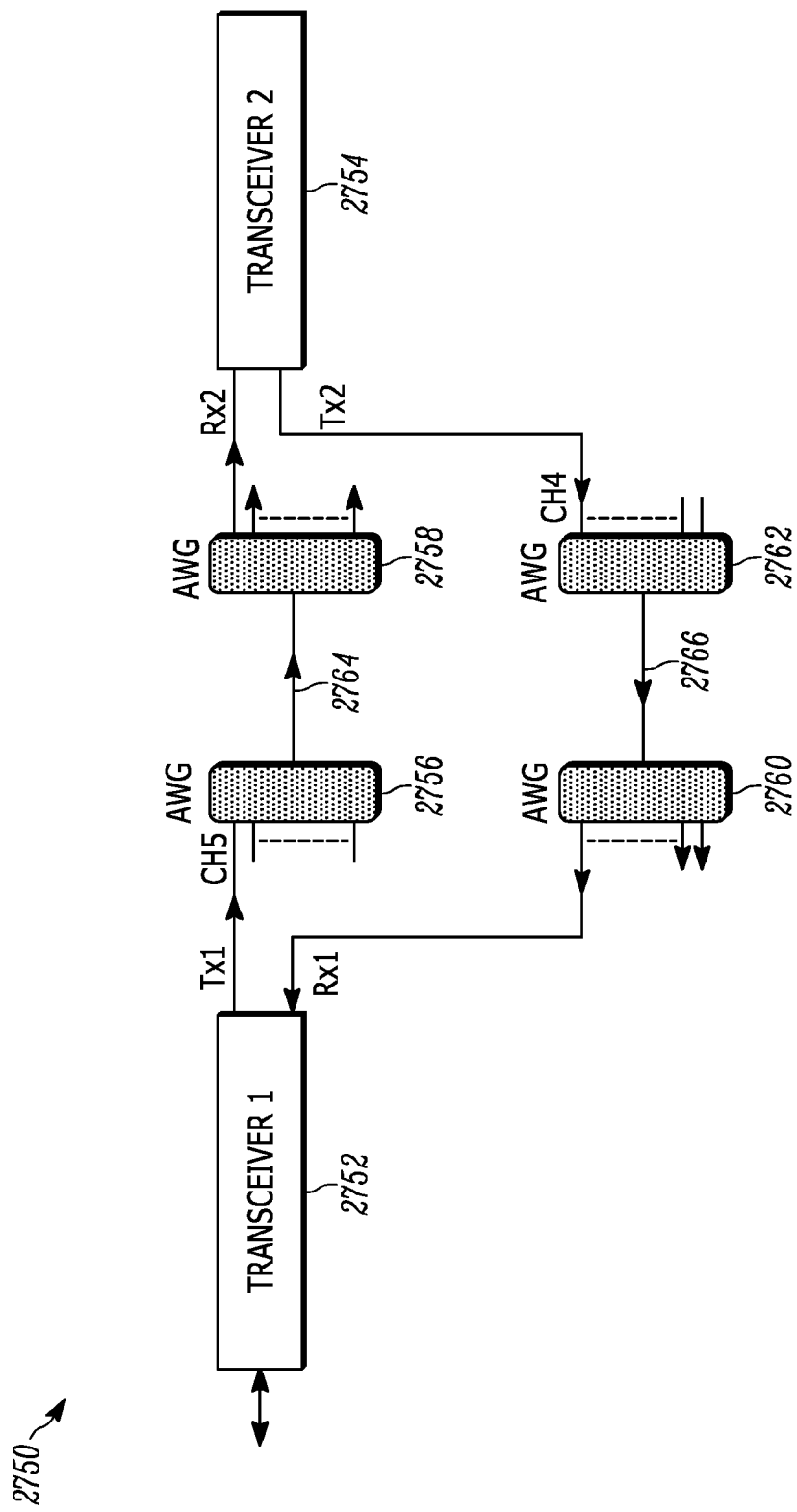
FIG. 27B illustrates an experimental setup to measure the optical power as a function of time for an embodiment of a method for link connection associated with a hardware-configured optical link of the present teaching.

FIG. 27B illustrates an experimental setup 2750 to measure the optical power as a function of time for an embodiment of a method for link connection associated with a hardware-configured optical link of the present teaching. Two transceivers 2752, 2754 are connected via AWGs 2756, 2758, 2760, 2762 via two optical fiber links 2764, 2766 in a unidirectional fashion.

Figure 27C:
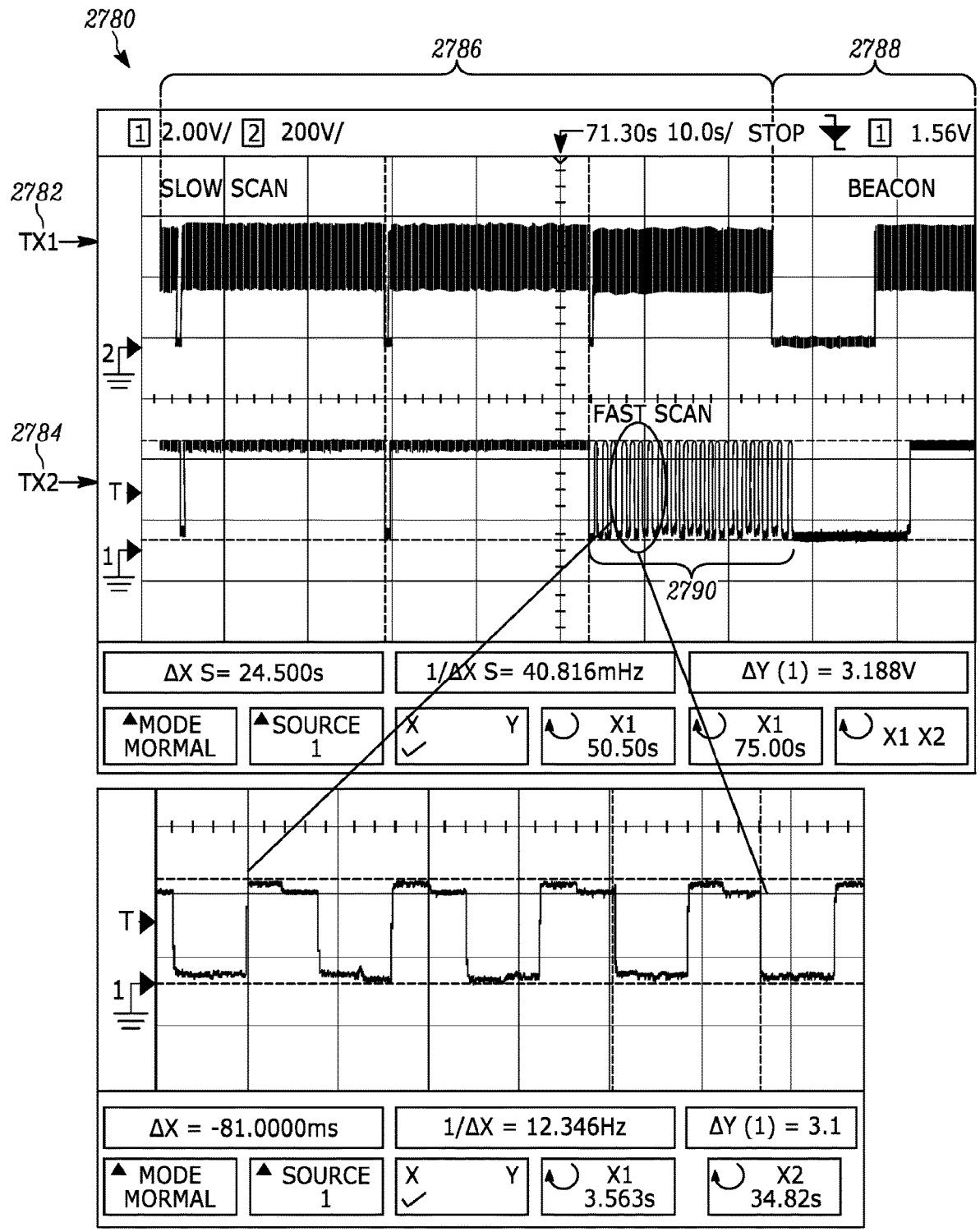
FIG. 27C illustrates oscilloscope traces showing the optical power as a function of time for the embodiment of the method for the connection protocol associated with the hardware-configured optical link of FIG. 27B.

FIG. 27C illustrates oscilloscope traces 2780 showing the optical power as a function of time for the embodiment of the method for the connection protocol associated with the hardware-configured optical link of FIG. 27B. Referring to both FIGS. 27B-C, there is a trace 2782 associated with the first transceiver 2752, and a trace 2784 associated with the second transceiver 2754. The first transceiver 2752 is shown running a slow scan 2786 and a BEACON 2788. The second transceiver 2754 is shown running a FAST SCAN 2790. For the forty-wavelength channel system, the slow scan requires 40 seconds to scan all the channels. However, a variety of other scan times are possible in various embodiments of the slow wavelength scan of the present teaching, as will be understood by those skilled in the art.

One feature of the present teaching is that the connection protocol method can be applied to transceivers that use a coherent signaling format. Coherent transceivers contain a tunable transmitter and tunable receiver. The wavelength is based on a laser channel setpoint. One of the photodiodes in the receiver allows the total power to be monitored, which is equivalent to a non-coherent SFP+ tunable transceiver. This allows for simple connections with no labeling or fiber numbers required.

Figure 28A:
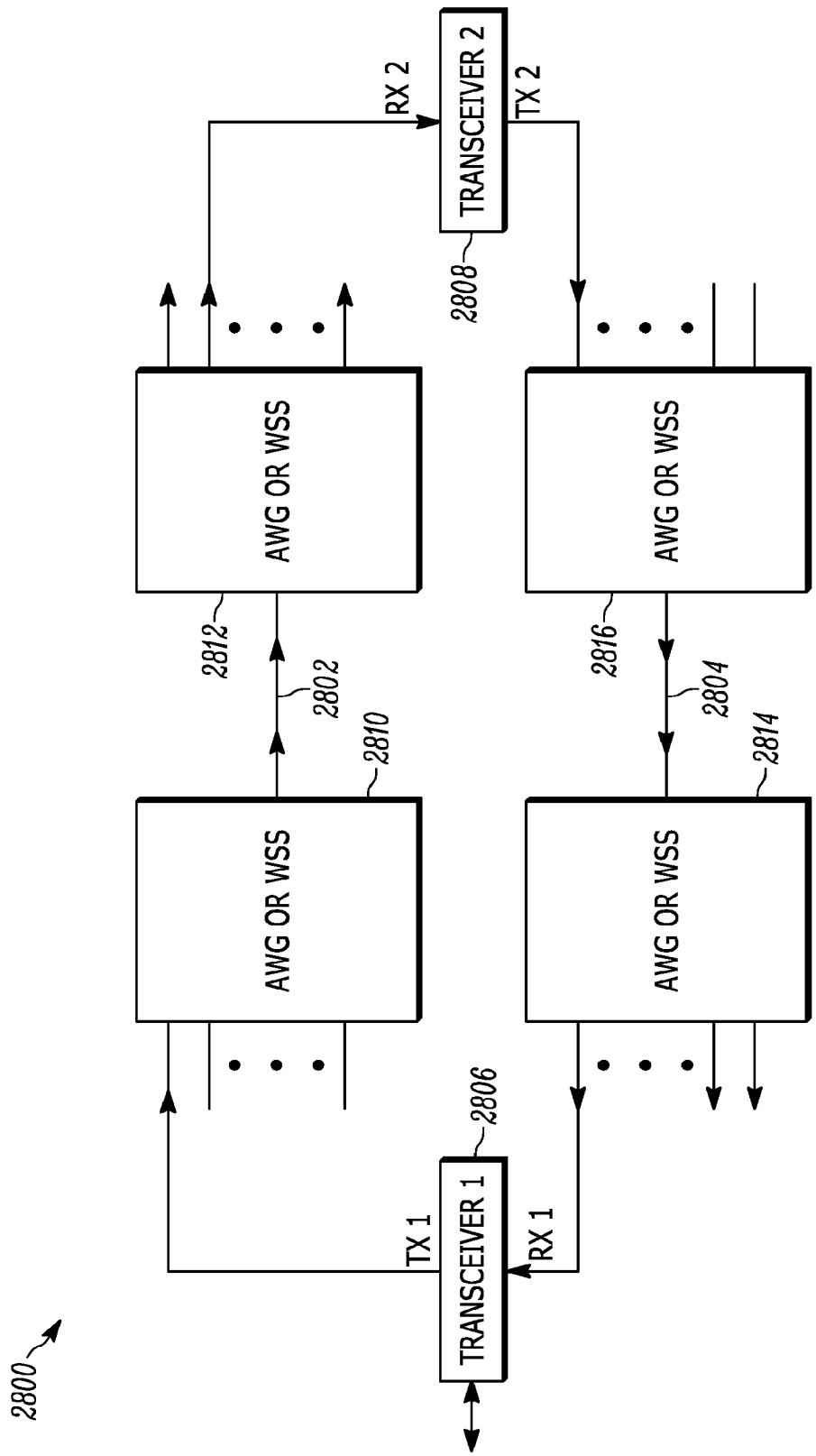
FIG. 28A illustrates a schematic of an embodiment of a WDM transport link that utilizes two unidirectional fibers to connect hardware-configured tunable coherent transceivers using filter-based combiners/splitters according to the present teaching.

FIG. 28A illustrates a schematic of an embodiment of a WDM transport link 2800 that utilizes two unidirectional fibers 2802, 2804 to connect hardware-configured tunable coherent transceivers, transceiver1 2806 and transceiver2 2808 using filter-based combiners/splitters 2810, 2812, 2814, 2816 according to the present teaching. In some embodiments, the combiners/splitters 2810, 2812, 2814, 2816 are AWG filters. In some embodiments the combiners/splitters 2810, 2812, 2814, 2816 are WSS devices. A transmitter of transceiver1 2806 is connected to an input port of combiner/splitter 2810 to send an optical signal over fiber 2802 to combiner 2812. The signal from the transmitter of transceiver1 2806 passes to an output port of combiner/splitter 2812 that is connected to a receiver of transceiver2 2808. A transmitter of transceiver2 2808 is connected to an input port of combiner/splitter 2816 to send an optical signal over fiber 2804 to combiner/splitter 2814. The signal from the transmitter of transceiver2 2808 passes to an output port of combiner/splitter 2814 that is connected to a receiver of transceiver1 2806. The connection protocol method for the link 2800 can be the same as the connection protocol method described in connection with link 2500 of FIG. 25, and also described in connection with FIGS. 26-27C.

Figure 28B:
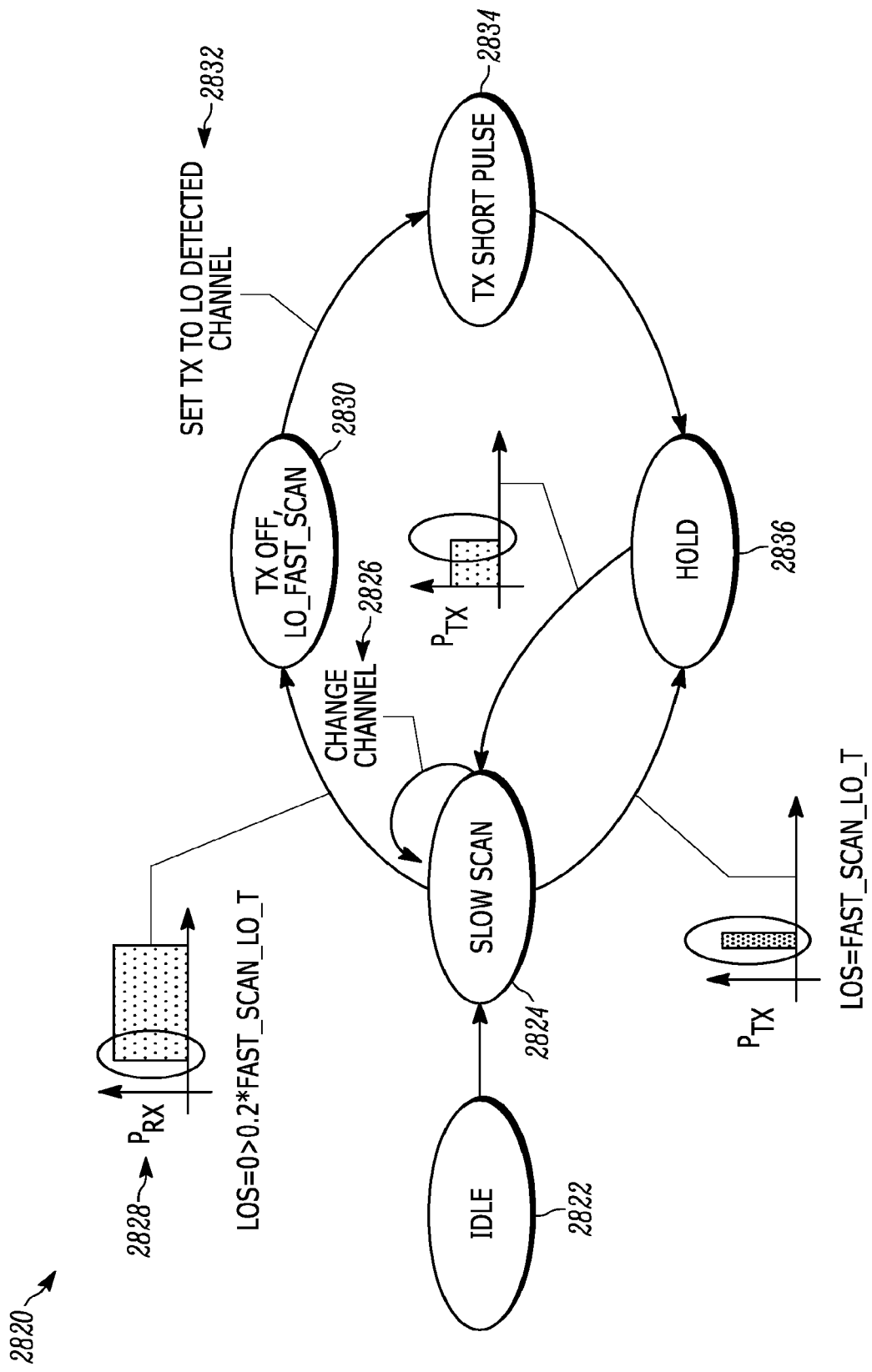
FIG. 28B illustrates a state diagram of an embodiment of a method of automatic channel turn up of the hardware configured optical link of FIG. 28A.

FIG. 28B illustrates a state diagram 2820 of an embodiment of a method of automatic channel turn up of the hardware configured optical link of FIG. 28A. In general, for coherent systems that use a filtered combiner splitter such as an AWG, the embodiment of the method utilizes similar states as in the SFP+ case described in connection with FIGS. 25-27C. It is necessary that wavelength from the transmitter is both able to pass through the filters that connect the transceiver pairs, as well as be compatible with the receiver on the other side. The tuned wavelength is generated by a tunable local oscillator laser in the transceiver. As previously described, the transceivers have a loss of signal (LOS) indicator where LOS=1 means that no light is detected and LOS=0 means that light is detected in the receiver.

The optical link may be in an idle state 2822. This idle state 2822 may be present, for example, at system start up and/or power on of the transceivers. The system has an allowed transition from idle state 2822 to a slow-scan state 2824. The slow-scan state 2824 is also referred to as SLOW_SCAN_T, in which the transmitter tunes its wavelength through a sweep of channels at a slow rate of speed. This transition may, for example, be automatically triggered at some time after start up. Each channel change in the sweep associated with slow-scan state 2824 is shown in the state diagram 2820 as a channel-change transition 2826. The slow scan and fast scan wavelength tuning parameters are the same as, or similar to, those described in connection with FIGS. 13-14 above. From slow-scan state 2824, when the receiver in a transceiver detects LOS=0 with a power value that is positive, and lasts for more than a duration of two consecutive fast scan pulses, as shown in received power diagram 2828, the associated transmitter transitions to a TX OFF, LO_FAST_SCAN state 2830. In TX OFF, LO_FAST_SCAN state 2830 the transmitter is first turned off, for example by using a VOA of SOA being set to off, preventing an optical signal from leaving the transmitter. Also, the transceiver receive local oscillator produces a fast scan of wavelength channels with transmitter modulation off, producing a short pulse of light of a predetermined duration for each of a sequence of wavelength channels as described herein. The receiver therefore gets a signal when the particular channel being transmitted is matched by the receive LO channel. In this way, the transceiver determines the channel number of the received light. Thus, there is no need to track the particular channel associated with the wiring of the filtered AWG as it is discovered autonomously by the transceiver elements.

The transition out of the slow scan state 2824 is also triggered by a receiver detection of LOS=FAST_SCAN_LO_T. That is, the LOS=0, or power is detected, for a short duration of a fast scan pulse time. On this condition, the transceiver state transitions to a HOLD state 2836. The HOLD state 2836 is left on a LOS=1, or no power detected, for more than two fast scan pulse durations and passes to slow scan state 2824.

From the TX OFF, LO_FAST_SCAN state 2830 on a receive direct-detect detected channel, the transmitter is set to the detected channel and a state 2834 is entered that produces a TX short pulse. This state effectively produces an "ACK" for the far side indicating that light was detected, a channel was determined, and the transceiver is ready for a HOLD state from the other transceiver. The TX short pulse state 2834 then transitions to HOLD state 2836.

Figure 28C:
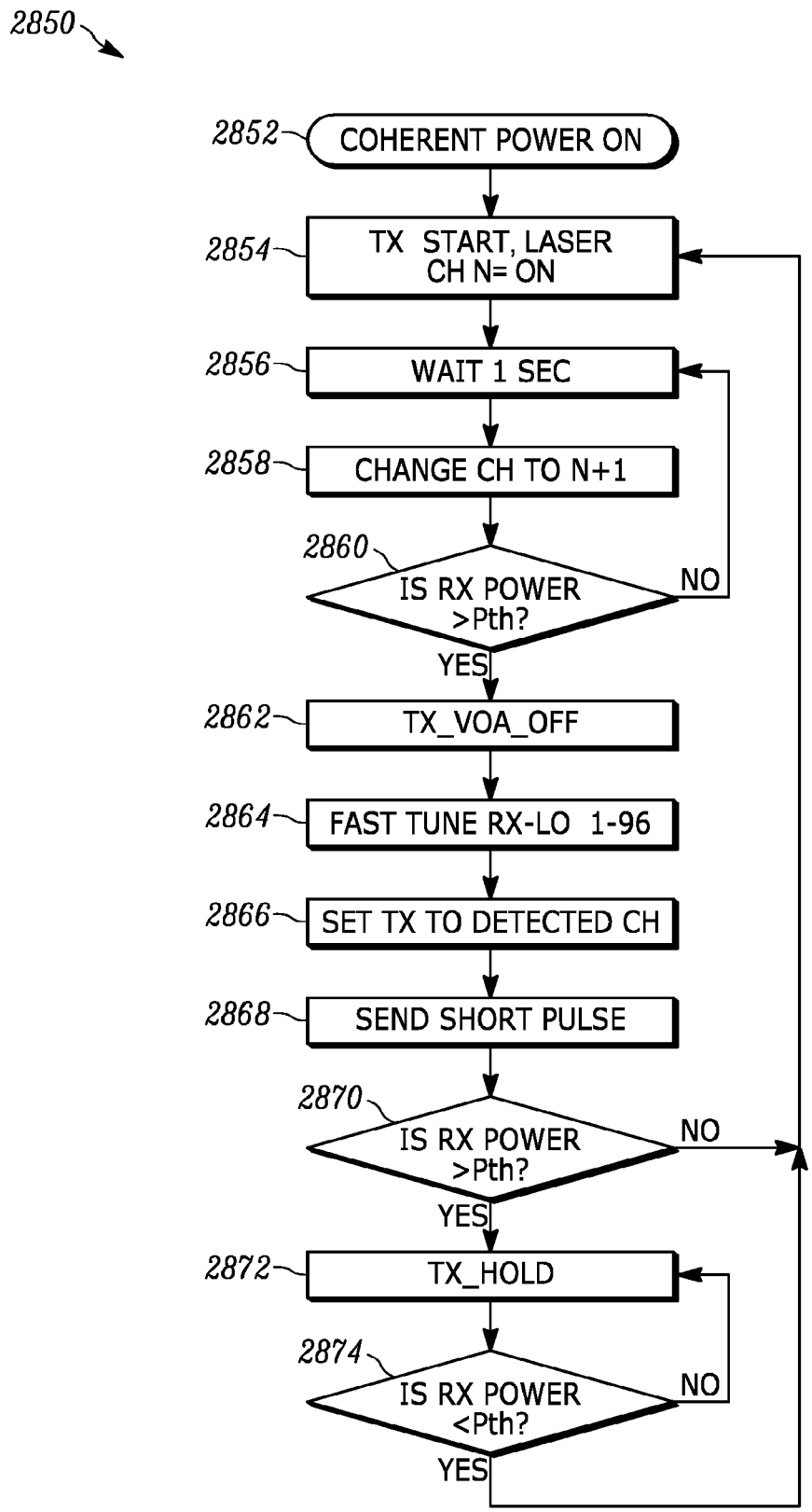
FIG. 28C illustrates a process flow diagram of an embodiment of a method of automatic channel turn up of the hardware configured optical link of FIG. 28A.

FIG. 28C illustrates a process flow diagram of an embodiment of a method 2850 of automatic channel turn up of the hardware configured optical link of FIG. 28A. For an optical link set up, transceivers on both sides will power up. The first step 2852 is a transceiver power on. At step two 2854, a transceiver begins a slow tune of wavelengths beginning at wavelength channel N. In step three 2856, the laser remains on the wavelength channel from step two 2854 for one second. As described herein, in some embodiments other predetermined long-scan channel duration times are used instead of one-second duration. Then in step four 2858, the channel is changed to N+1. In step five 2860, a decision is made if a received power in the transmitter has exceeded a threshold, $P_{th}$. If not, the method moves back to step two 2854, and the slow tuned channel is incremented. If a received power in the transmitter has exceeded a threshold, $P_{th}$, the method moves to step six 2862 and the transmitter is turned off. In some embodiments, the transmitter power off is achieved via a VOA, but other known power off methods can be used, such as a SOA. In step seven 2864, the transceiver executes a fast tune of the receiver LO to discover the value of the wavelength channel being transmitted. In step eight 2866, the transmitter in the transceiver is set to the channel discovered by the LO receiver fast tune, and in step nine 2868, a short pulse is transmitted as an "ACK" to acknowledge receipt of a signal and initiate HOLD in the other transceiver. Decision step ten 2870 determines if a received power exceeds the threshold, and if so in step eleven, a transmitter HOLD state 2872 is initiated. The decision step twelve 2874 effectively holds the state until a power is lost. If a received power falls below $P_{th}$, the method proceeds to step two 2854. Otherwise, it proceeds to HOLD state of step eleven 2872. In decision step ten 2870, if a received power is not greater than a predetermined threshold, the method moves to step two 2854 for the slow tune of wavelengths.

One feature of the present teaching is that embodiments that use coherent transceivers do not need to transmit a fast scan signal across the link. A fast scan optical signal is generated in a transceiver and then the generated fast scan optical signal is mixed with an incoming signal to the transceiver. A short pulse of light with a dwell time nominally equal to a dwell time of a particular channel in a fast scan is detected at the output of the mixer in the transceiver when an incoming signal has a wavelength channel that is the same as the wavelength channel of the fast scan. This detecting of a pulse of light having a duration that is equal to or less than the dwell time on the particular wavelength channel of the fast scan provides the information to proceed to a link establishment as described herein.

Figure 28D:
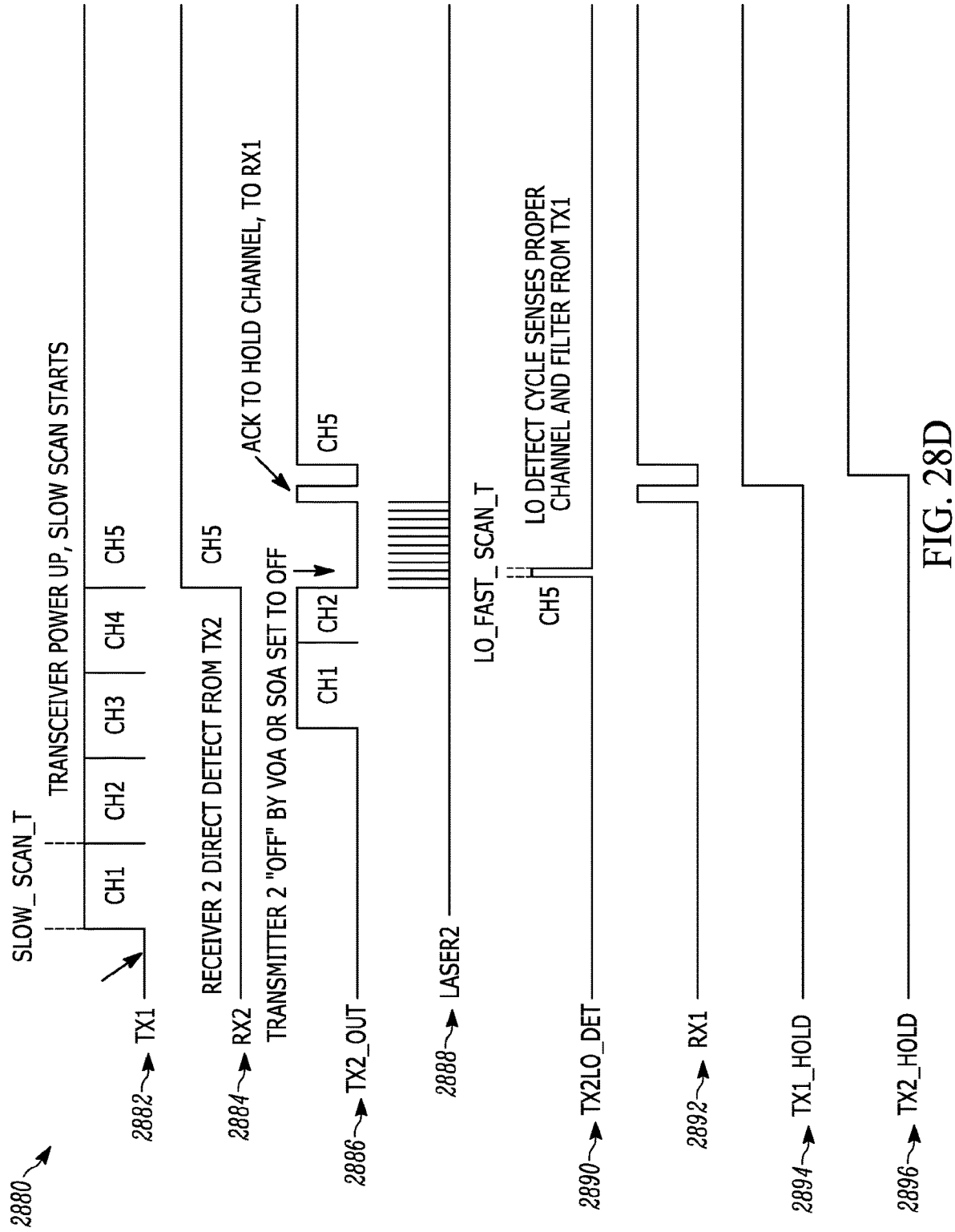
FIG. 28D illustrates graphs showing the optical power as a function of time for a set of transmitter and receiver states present during an embodiment of a method of automatic channel turn up of the hardware configured optical link of FIG. 28A.

FIG. 28D illustrates graphs 2880 showing the optical power as a function of time for a set of transmitter and receiver states present during an embodiment of a method of automatic channel turn up of the hardware configured optical link of FIG. 28A. Transmitter in transceiver1 2806 trace 2882 illustrates the transceiver power up and slow scan start. Receiver direct-detect in transceiver2 2808 trace 2884 illustrates the power detected from transcevier1 2806 by direct detection, with no mixing with the local oscillator in transceiver2 2808. This illustrates that it is channel 5 that passes the combiners/splitters 2810, 2812, 2814, 2816. The trace 2886 of the transmitter output in transceiver2 2808 and the trace 2888 of the receive LO laser in transceiver2 2808 shows initiation of a slow scan that is interrupted by a state transition to TX OFF, LO_FAST_SCAN state 2830 of FIG. 28B. The mixing of the incoming signal with the scan of the local oscillator produces the determination that the received signal is channel 5 as illustrated in the trace 2890 of the detected mixed signal in transceiver2 2808, channel five. At this point, the transceiver2 2808 produces a short pulse "ACK" (see trace 2886). The receipt of "ACK" is illustrated in trace 2893 of the receiver signal in transceiver1 2806. Both transceiver transmitters initiate HOLD on channel 5, illustrated in traces 2894, 2896. The optical link is established and client data traffic can be sent over the link.

Link configurations of the present teaching are used for a variety of different use cases, including, for example, data centers, cable television distribution and/or telecommunications applications. For example, there are currently mass deployments in data centers for 1.6 Terabit switches that are built with separate 100-Gb/s transceivers. These data center deployments are moving toward 400-Gb/s datacom optical pluggable transceivers that use coherent optical signaling. With 100-Gb/s coherent signaling, there is, in some configurations, 30 dB of dynamic range. For 400-Gb/s in some configurations there is, in some configurations, 22 dB of dynamic range. In configurations with longer links an EDFA is used. This large dynamic range allows the use of up to 1×16 passive, non-filtered, splitters on both ends of a link. In amplified links, larger passive splitters, e.g. 1×64, can be used. This passive, non-filtered splitter configuration can support bidirectional traffic with no amplifiers. The fact that there are no filters in the link means that it is possible to use an unlabeled connector to the splitters as well as the transmitter and the receiver on the coherent transceiver. This results in significant operational savings.

Figure 29:
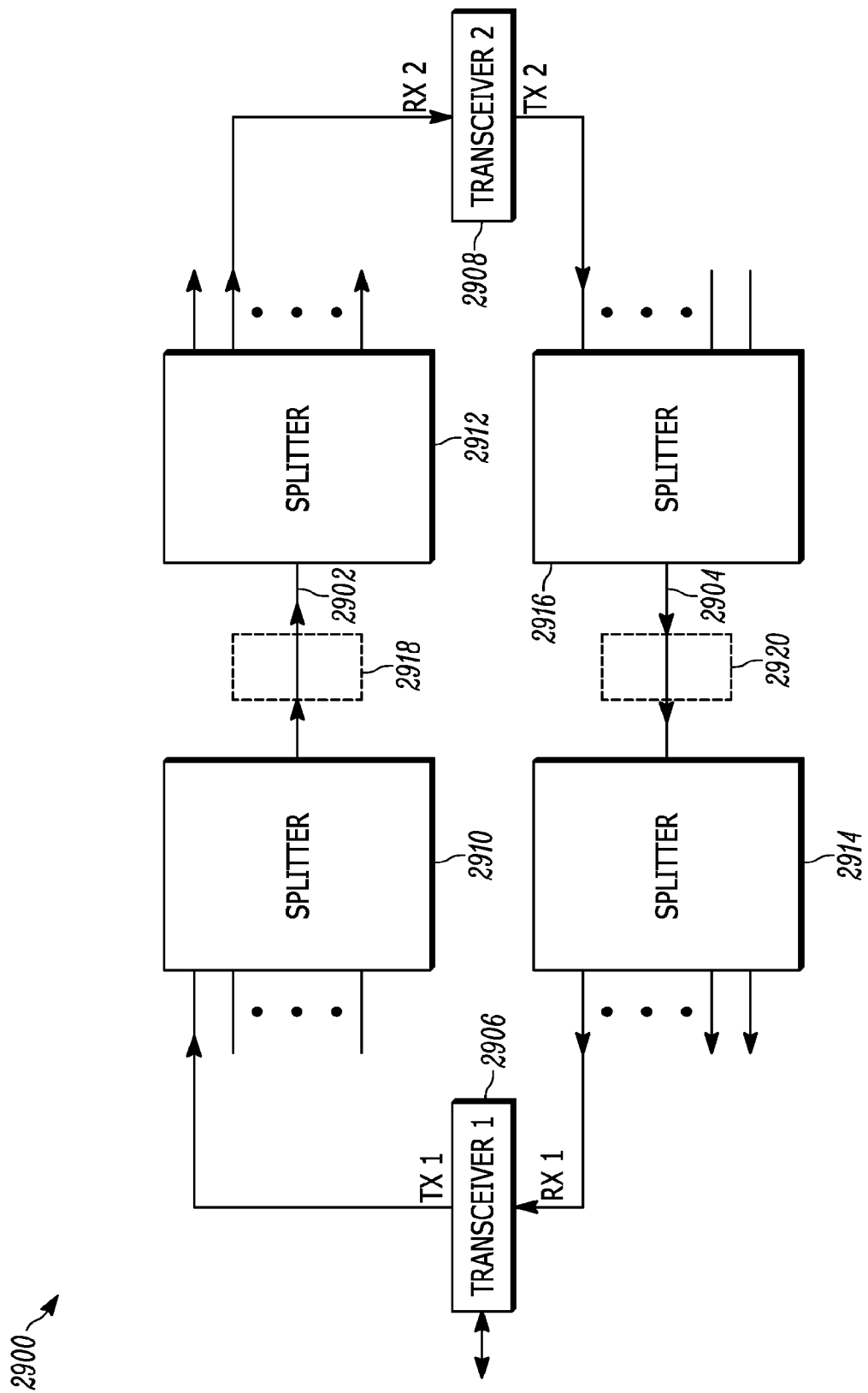
FIG. 29 illustrates a schematic of an embodiment of a WDM transport link that utilizes two unidirectional fibers to connect hardware-configured tunable coherent transceivers using non-filter-based combiners/splitters according to the present teaching.

FIG. 29 illustrates a schematic of a WDM transport link 2900 that utilizes two unidirectional fibers 2902, 2904 to connect hardware-configured tunable coherent transceivers, transceiver1 2906 and transceiver2 2908 using non-filter-based combiners/splitters 2910, 2912, 2914, 2916 of the present teaching. A transmitter of transceiver1 2906 is connected to an input port of combiner/splitter 2910 to send an optical signal over fiber 2902 to combiner 2912. The signal from the transmitter of transceiver1 2906 passes to an output port of combiner/splitter 2912 that is connected to a receiver of transceiver2 2908. A transmitter of transceiver2 2908 is connected to an input port of combiner/splitter 2916 to send an optical signal over fiber 2904 to combiner/splitter 2914. The signal from the transmitter of transceiver2 2908 passes to an output port of combiner/splitter 2914 that is connected to a receiver of transceiver1 2906. Optional optical amplifiers 2918, 2920 may be added to the link to address losses from the passive combiners/splitters 2910, 2912, 2914, 2916. The amplifiers may be placed anywhere between the transceiver 1 2906 and transceiver 2 2908 to address losses in the link as understood by those skilled in the art.

The high dynamic range of coherent technology in transceivers 2906, 2908 allows for passive combiner and splitter architectures using combiner/splitters 2910, 2912, 2914, 2916 with no filters. The embodiment of the link 2900 of FIG. 29 eliminates AWG and WSS costs and allows for simple connections with no labeling or fiber numbers required.

The connection protocol method associated the embodiment of the link 2900 of FIG. 29 can be similar to the system utilizing AWG's or WSS's of link 2800 of FIG. 28A, but there are some differences as described below. Basically, the establishment of the link is still based on detection of an optical signal comprising a slow scan, and determination that the duration of the detected signal is at least as long as a dwell time on a particular wavelength channel of the slow scan, and detection of an optical signal comprising a duration that is less than or equal to a duration of a dwell time on a particular wavelength channel of a fast scan. However, the protocol must account for the fact that the light from all wavelength channels can reach all the transceivers, as no filtering selection is provided by the splitter/combiner. The connection protocol for a non-filtered splitter/combiner link utilizes the coherent receiver and local LO laser as a spectral detection of far-side transmit carrier. At startup, the number of channels tuned is based on splitter port count, set in database or set by the customer. This set of channels is scanned at a fast scan rate. Thus, this channel count is used to represent a channel count for a complete scan for a fast scan. A complete fast channel scan time is the time required to scan through each of these channels with a short fast scan dwell time on each channel. RF amplifiers are shut off on the transmitter on startup so that the transmit power produces a continuous wave (CW) signal. This CW signal goes through a slow scan, generating a sequence of CW wavelength channels, each with a particular slow-scan duration. The received power from a CW wavelength signal is only a DC detected power, because there is no modulation on the CW wavelength emitted by the local oscillator.

In operation, the far-side receiver uses RF detection and total power detection to determine when the near-side transmitter is unmodulated and tuned to the CW channel that it can receive because it is the same as the LO in the far-side receiver. The receiver then triggers the same channel to transmit to the far-side. Both sides are now locked on same channel and the RF amplifiers are enabled to begin data transmission. If the CW carrier wavelength channel happens to be the same as a coherent channel already in service, the presence of this CW carrier will not affect the coherent traffic of the coherent channel already in service because only DC detected power is provided to the receiver. In these methods of operation, the near end and far end transceivers have a master/slave definition for link far/near side, as the connection protocol works directionally.

An embodiment of a startup connection protocol method for a coherent link with passive non-filtering combiners as illustrated in FIG. 29 is now described in more detail. For embodiments that use a master/slave approach, the master transceiver is, for example, transceiver 2906, and the slave is transceiver 2908, although this designation is arbitrary. The RF amplifiers are turned off in the transceiver on the near side of the link, producing a CW carrier on power up.

Figure 30A:
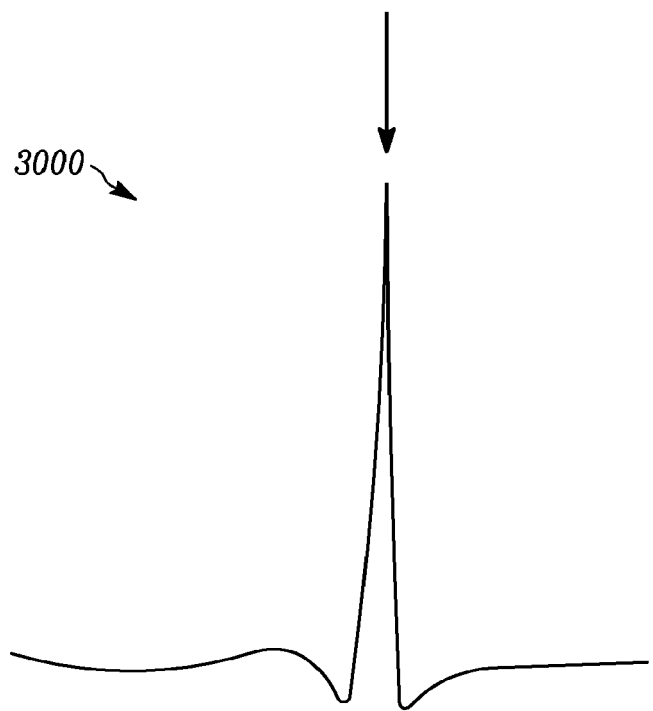
FIG. 30A illustrates an optical spectrum generated by a transceiver in the start-up state according to an embodiment of a method using a connection protocol of the present teaching.
Figure 30B:
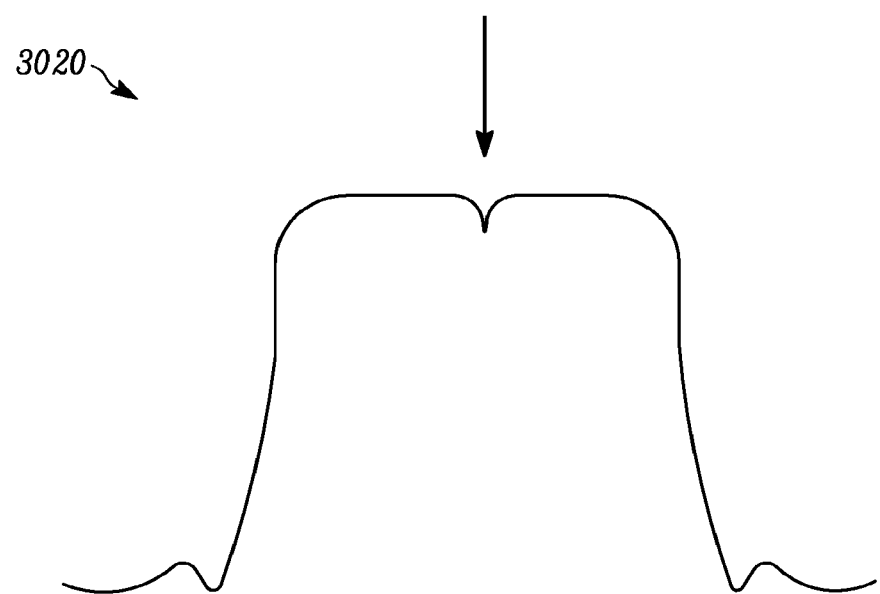
FIG. 30B illustrates a spectrum generated by a transceiver in an established link operation state according to an embodiment of a method using a connection protocol of the present teaching.
Figure 30C:
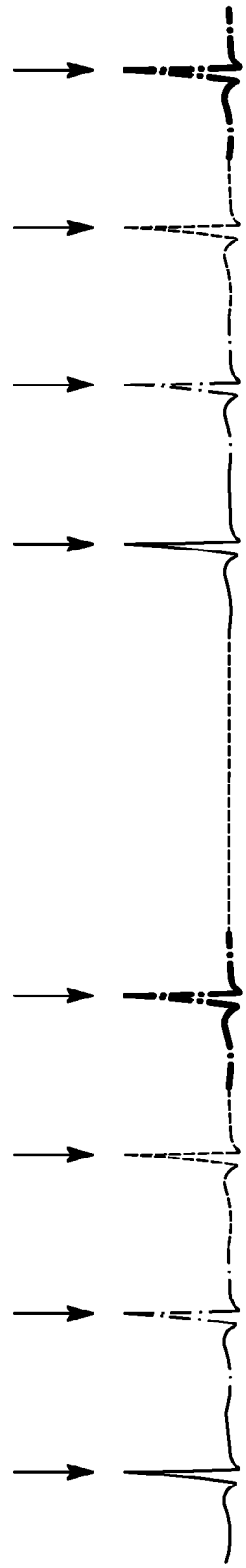
FIG. 30C illustrates a spectral time sequence of a transceiver in the tuning state with no RF modulation according to an embodiment of a method using a connection protocol of the present teaching.
Figure 30D:
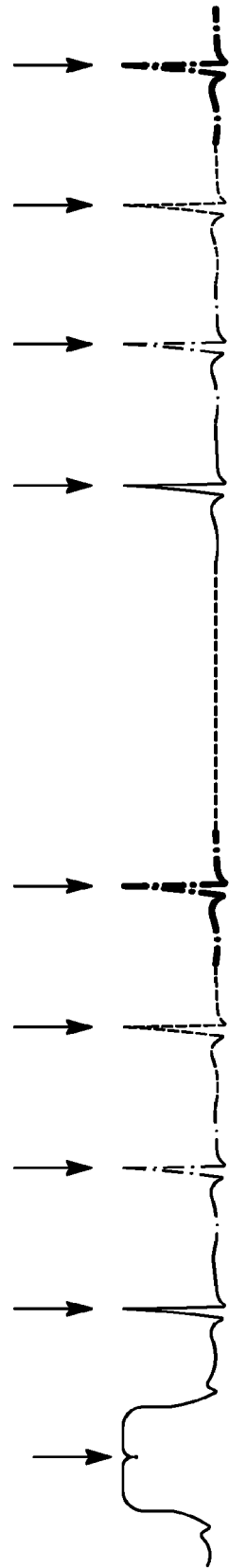
FIG. 30D illustrates a spectral time sequence of a link in the tuning state with RF modulation on channel 1 according to an embodiment of a method using a connection protocol of the present teaching.

FIG. 30A illustrates an optical spectrum 3000 generated by a transceiver in the start-up state according to a method using a connection protocol according to the present teaching. This represents a spectrum of a signal generated by a CW LO at a particular wavelength channel. The transceiver to laser output power is only sent when VOA or SOA are on. FIG. 30B illustrates a spectrum 3020 of a transceiver in an established link operation state of a method of connection protocol according to the present teaching. This represents a spectrum of a signal generated by a transmitter on a particular channel with the RF modulation on. FIG. 30C illustrates a spectral time sequence 3040 of a transceiver in the tuning state with no RF modulation of a method of connection protocol of the present teaching. In these figures, the different line types indicate different wavelength channels. Therefore, FIG. 30C illustrates detected signals from received light comprising a slow scan of an LO. The transceiver is scanning for occupied channels on the fiber to which it is connected. The spectral time sequence 3040 shows unmodulated spectrum for four sequential wavelength channels, and then, after a predetermined period that may also be referred to as interval "T", another slow scan begins. In general, the slow scan will step through all the wavelength channels of the system. As examples, this may be 96 wavelength channels or 80 channels, depending on the particular WDM system. In some embodiments, a 16-channel splitter is used, and therefore 16 channels is chosen to represent a complete scan for the protocol. Various embodiments use various channel numbers. FIG. 30D illustrates a spectral time sequence 3060 of a link in the tuning state with RF modulation on channel 1 of a method of connection protocol according to the present teaching. FIG. 30D illustrates that the first channel in the sequence has a modulated signal, as the spectral bandwidth is broad. This indicates to the transceiver that the channel is occupied by a data-carrying channel.

Continuing with the description of the startup connection protocol, the near side receiver looks for modulated channels using RF detection from the LO and photodiode in the coherent receiver that is positioned after a polarization splitter. If no modulated channels exist, then the receiver waits on channel 1. The slave transceiver powers up, and starts a tuning from channel 1. This causes the master receiver to detect the far-side LO on channel 1, thus initiating a beacon state for master transmitter. The slave receiver detects the beacon from master and turns the RF amplifier on causing a modulated spectrum to be transmitted. The slave holds channel 1 and the master leaves the beacon state and goes to hold on channel 1. The master then turns RF amplifiers on, and a coherent link is established for channel 1.

With a link established on channel 1, the protocol will proceed for another transceiver master/slave pair that will not affect the traffic on channel 1, as described further below. Scanning of the link will result in a spectral time sequence 3060 as shown in FIG. 30D with modulated signal on channel 1 and tuning across the other channels by the master LO. For this case, the master transmitter powers on and master receiver detects channel 1 RF modulation. The master transmitter then skips channel one and continues tuning from channel 2. The slave side transceiver powers up and detects modulation on channel 1 and skips to channel 2. The slave receiver sees power but no modulation on channel 2 and holds transmitter for channel 2 unmodulated. The master detects the LO from the slave on channel 2, and switches to channel 2 and into beacon state. The slave side senses beacon state on channel 2 and turns on the RF amplifier to produce a modulated signal. The master side senses the RF modulated signal from the slave and turns on the RF modulation for its transmitter, and then a link is established on channel 2. The specific channels described are just examples, other channels can be used as will be understood to those skilled in the art.

In some embodiments, transceiver modules are configured in a master or a slave mode and have, for example, different product numbers to distinguish them prior to shipment via an internal database parameter. A master transceiver module and a slave transceiver module operate in pairs to form a link. However, in some embodiments, a master or slave designation is not required and a transceiver at a near end or at a far end of a link is capable of performing the protocols as described herein without a master or slave designation. The master-configured modules may support the use of a vendor-defined 'Auto Tune Config' register used for starting the connection protocol. The master side transceiver module is connected to, or includes, a host processor that knows the proper transmit channel configuration for the module. The slave configured modules will start in an auto tune mode upon a power cycle/power on reset. Thus, for some embodiments, auto-tune is a step in the method of implementing the connection protocol, and initiates a slow tune of the transmitter through a channel sequence that dwells on each channel for a particular duration before changing to the next channel in a sequence of channels. The duration may be a variety of durations. For example, in some embodiments the duration is 1 second. In other embodiments, the duration is 5 seconds. In some embodiments, the sequence of channels is a sequence beginning at a particular channel number on the ITU grid and stepping up one channel number at a time. For example, the sequence may start at channel 1 of the ITU grid, or the sequence may start at another channel of the ITU grid.

In some embodiments, an auto tune startup, or power on, process proceeds as described below. For the master module, a "transmitter discover" command is asserted at power on. A host processor in the module, or connected to the module, sets an appropriate transmit channel. If a receive LOS is asserted, in other words, the receiver indicates LOS=1, the host processor writes an 'Auto Tune Config' register that starts a slow scan tuning mode. In the slow-scanning mode, the RF power is turned off and the transmitter transmits only a local oscillator signal on the channel to which it is tuned. The processor waits for RX LOS (LOS=0) to clear. When the RX LOS clears the transmitter discover mode is exited, and the modulation is turned on and then the link is established.

For the slave module, a transmitter discover is asserted at power on. A slow channel tune process of five seconds per channel is begun, with the tuning channel set to the last set channel. If RX LOS is cleared, then tuning is halted. Otherwise, if RX LOS is asserted, then the method continues to tune to the next channel. The current transmit channel is stored. Once tuning is halted, the RF modulation is turned on and the link is established.

In some embodiments, an existing link is established by the slave. In these embodiments, with the transmit channel stored in the slave, the first tuned channel will cause the link to establish, and the master will exit the tuning mode immediately and enter normal operation. In this case, the slave asserts a transmit discovery mode, TX_DIS, at power on, and the slow tune channel process is begun, with tuning starting at the last set channel. If RX_LOS is clear, the tuning is stopped. If RX_LOS (LOS=0) is asserted, then the method tunes to the next channel. Then, the current channel is stored and tuning mode is terminated and the modulation is initiated establishing the link.

In an embodiment with an existing link established by the slave, the master side module proceeds as follows. In the master module, TX_DIS is asserted at power on. The host processor sets an appropriate TX channel. If RX_LOS (LOS=0) is off, the processor skips setting the "Auto Tune Config" register. TX_DIS is turned off. The link is established and auto tune mode was not entered or needed. For the slave, auto tune has already completed. The module is in normal operation.

In some embodiments, a new slave side module is installed and the procedure is as follows. For the master, slow tune is complete and the link is established. The master module is in normal operation. If the host processor detects that RX_LOS (LOS=0) is asserted for 'x' time, the host writes the 'Auto Tune Config' register to start auto tune mode. The transmitter discover mode TX_DIS is then asserted. The host waits for RX_LOS (LOS=0) to de-assert or clear. When RX_LOS (LOS=0) de-asserts or clears, then TX_DIS is de-asserted. Auto tune mode is exited and normal operation proceeds. Auto tune then is complete and the link is established.

When a new slave side module is installed, the procedure is as follows. TX_DIS is asserted at power on. The slow channel tune process is started at five seconds per channel, beginning from the last set channel or first channel. If RX_LOS (LOS=0) is de-asserted, then stop auto tune. Otherwise if RX_LOS (LOS=0) is asserted, the method tunes to next channel. The current TX channel is stored after RX_LOS (LOS=0) is de-asserted. The auto tune mode is then exited and normal operation proceeds. Auto tune is complete and the link is established.

Some embodiments of the present teaching utilize a non-filtering splitter to connect transceivers to the devices that combine the optical signals onto the link fiber to provide bi-directional connections with reduced component count. The devices that combine the optical signals onto the link fiber may be filtered or unfiltered. The use of a passive splitter connected to the transceiver transmitter and receiver reduces the number of combiner elements by half for a bidirectional link. In some embodiments, the fiber link includes and optical amplifier. In other embodiments, no amplifier is used.

Some embodiments do not use a master/slave designation as described above. In some of these embodiments, both sides ping-pong the routine until there is an overlap of LO fast scan used to search with TX CW on. That is, the two sides trade sending slow scan LO and performing LO fast scan for searching for incoming wavelength match until a short pulse of duration that is nominally equal to a fast scan dwell time is detected. Then the link is established and client data traffic can flow.

Figure 31:
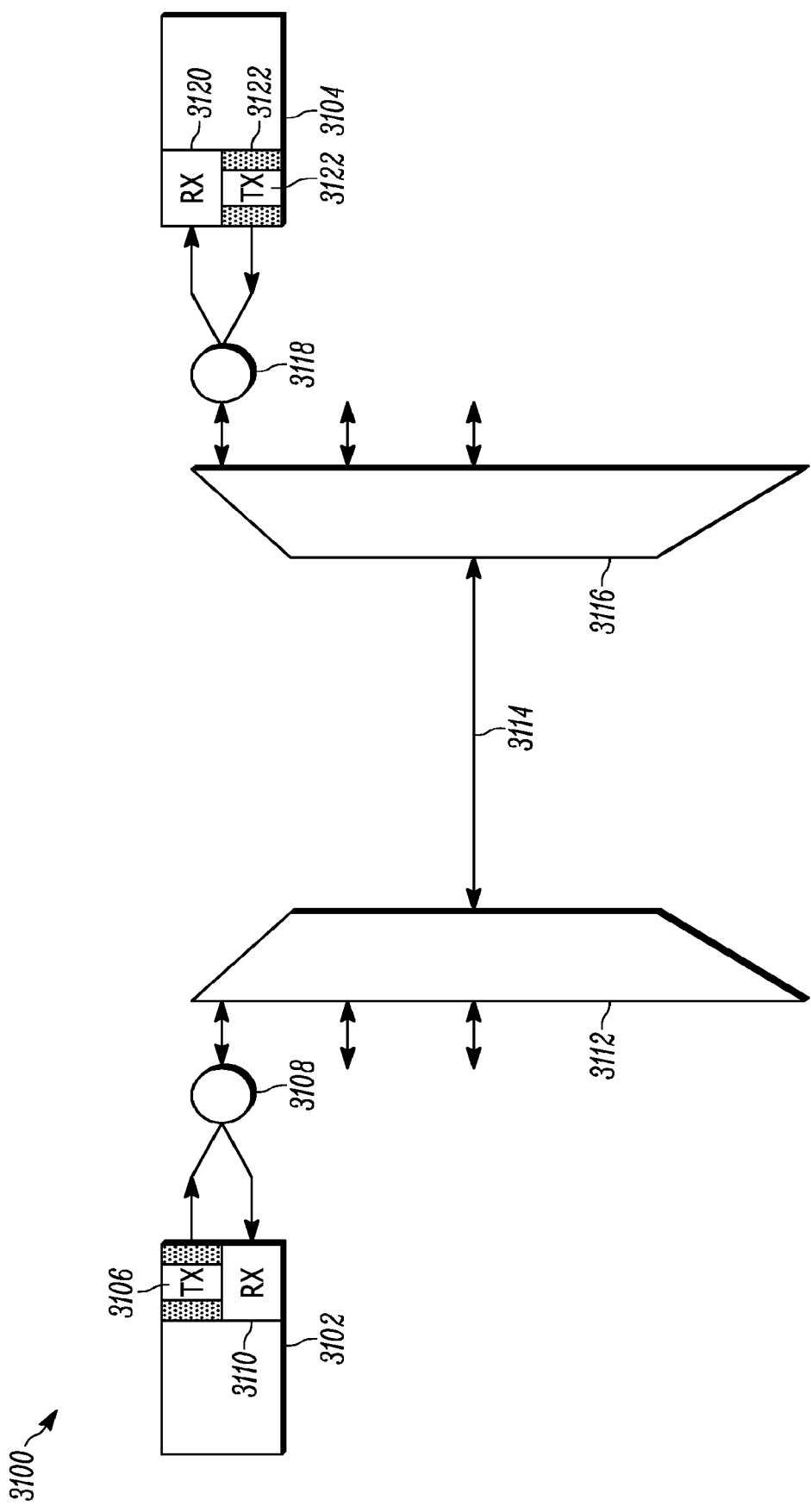
FIG. 31 illustrates a schematic of an embodiment of a bidirectional WDM transport link that utilizes coherent hardware-configured transceivers with AWG splitters of the present teaching.

FIG. 31 illustrates a schematic of a WDM transport link 3100 that utilizes coherent hardware-configured transceivers 3102, 3104 with AWG filters of the present teaching. An output of a coherent transmitter 3106 is connected to a port of a 1×2 splitter 3108. An input of a coherent receiver 3110 is connected to a second port of the 1×2 splitter 3108. The third port of the 1×2 splitter 3108 is connected to an AWG filter 3112. The AWG filter 3112 combines the light from each input port to a fiber 3114 that is connected to an AWG filter 3116. The fiber 3114 carries bidirectional optical traffic. An output port of the AWG filter 3116 is connected to one port of 1×2 splitter 3118. Coherent receiver 3120 is connected to another port of the 1×2 splitter 3118. Coherent transmitter 3122 is connected to a third port of the 1×2 splitter 3118. In some embodiments, transceivers 3102, 3104 may be located remotely, for example up to a few kilometers away, from the AWG 3112, 3116. This may be referred to as a remote PHY configuration. The AWG 3112, 3116 do not tune or change the filtering. The AWG 3112, 3116 do filter wavelength channels.

In the WDM transport link 3100, both sides of the link need the transceivers 3102, 3104 to operate on the same wavelength channel because the wavelength must pass through the filter of the AWGs 3112, 3116. It also requires that the transceivers 3102, 3104 operate at overlapping times to establish a connection. Using a master/slave technique, one of the transceivers 3102, 3104 is fast tuned, and the other of the transceivers 3102, 3104 is slow tuned. This provides overlap and detection on both sides of the link 3100. A handshake is used in this process to close the link for coherent given the filters of the AWGs 3112 3116 in the link 3100.

Figure 32:
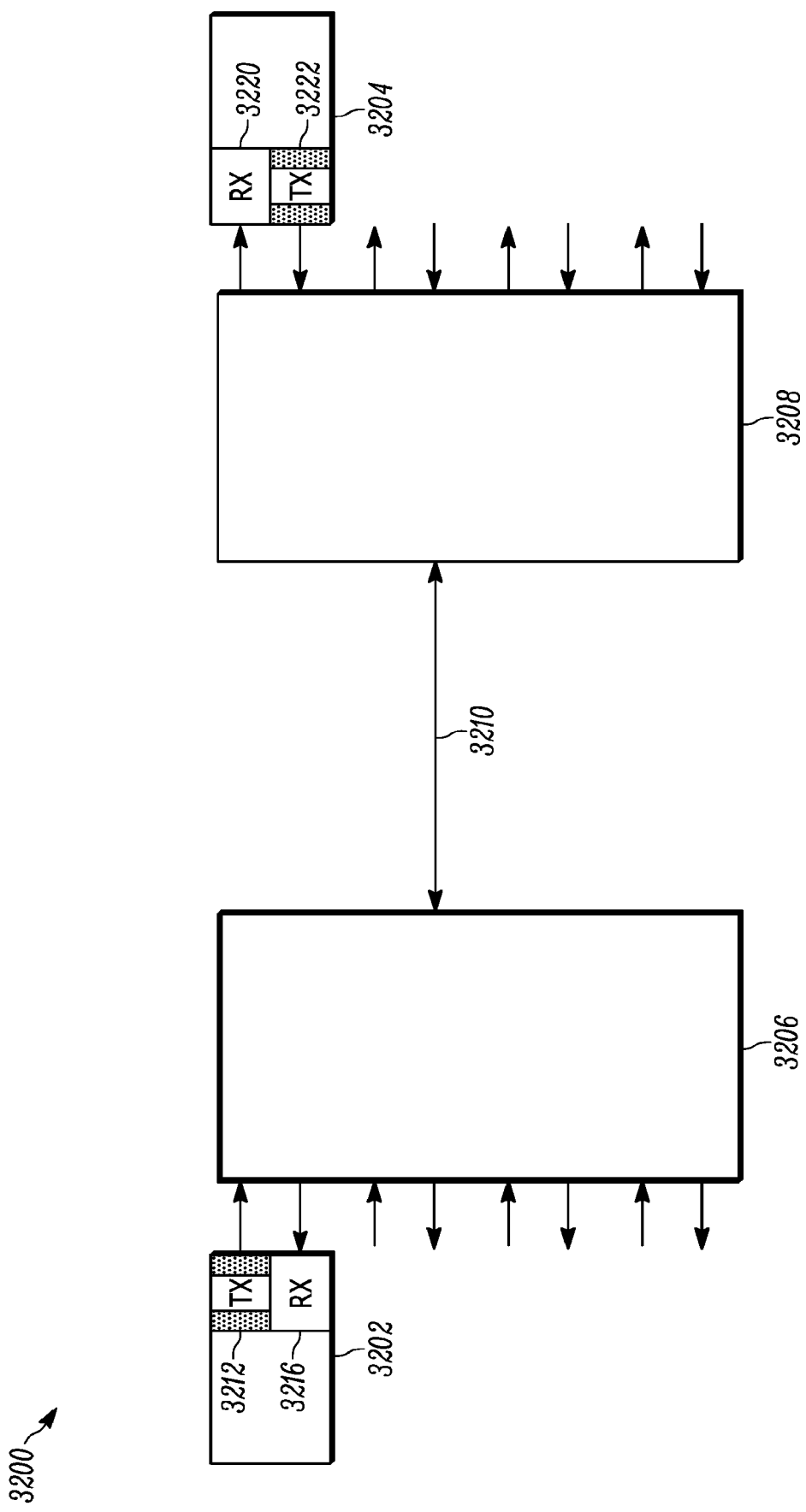
FIG. 32 illustrates a schematic of an embodiment of bidirectional WDM transport link that utilizes coherent hardware-configured transceivers with passive splitters with no filtering according to the present teaching.

FIG. 32 illustrates a schematic of a WDM transport link 3200 that utilizes coherent hardware-configured transceivers 3202, 3204 with passive splitters with no filtering according to the present teaching. The link 3200 uses passive splitters 3206, 3208 to combine optical signals from transceivers 3202, 3204. The link 3200 operates bidirectionally over fiber 3210. An output of a coherent transmitter 3212 is connected to a port of passive splitter 3206. An input of a coherent receiver 3216 is connected to a second port of the passive splitter 3206. The passive splitters 3206, 3208 have no wavelength filtering. The splitter 3206 combines and/or splits the light from each port to the fiber 3210 that is connected to splitter 3208. Coherent receiver 3220 is connected to a first port of the splitter 3208. Coherent transmitter 3222 is connected to a second port of the splitter 3208.

In some embodiments, transceivers 3202, 3204 is located remotely, for example up to a few kilometers away, from the respective splitters 3206, 3208 for a remote PHY configuration.

In the turn-up procedure for the embodiment of the link 3200 described in connection with FIG. 32, there are transmitters 3212, 3222 powering up, and searching through and checking established links. The turn-up must also work in the case where transmitters on one side power up, and transmitters on the far side are off. The power up search is provided by turning a local oscillator (LO) using a variable optical attenuator (VOA) in transceiver 3202 to dark state. This step prevents the LO signal from coupling to a utilized channel. Then the receiver 3220 in the transceiver 3204 is scanned through to find any occupied channels using the receiver mixer and RF detection. Any found occupied channels are not used. Next, the VOA is activated in transceiver 3202 and transmitter 3212 scans unoccupied channels with local LO, while detecting for far-side LO in receiver 3220.

The connection algorithm operates with multiple transmitters (not shown) connected to the link 3200 operating simultaneously. The passive splitter coherent architecture of link 3200 is relatively simple to connect up. There is no need to label any TX or RX fibers, and no need to align to any specific passive port. This allows a link to be established and bringing up a PHY layer for a data center without any higher layer software connection protocol. In some embodiments of a non-filtered link using coherent SFP+ transceivers, a separate and distinct control must be used separate from the SFP+ to support the passive splitter architecture and to reduce the cabling and ADD/DROP costs. These embodiments would specifically target low channel count coherent traffic use cases.

One feature of the present teaching is that the signaling for turn-up of non-filtered WDM links can be done without a complex higher-layer communication protocol. Rather, simple variations of fast and slow tuning using only components in the transceiver and/or link are used. These systems utilize the coherent receiver and local LO laser as a spectral detector of the presence of the far-side transmitter carrier. At startup, the number of wavelength channels tuned is based on the splitter port count. This can be set, for example, in data base or by a customer. The RF amplifiers are deactivated on the transmitter on startup. Also, the semiconductor optical amplifier/variable optical attenuator (SOA/VOA) are deactivated on the transmit side to eliminate any contention as the far-side receiver scans for existing channels. The far-side receiver scans using a local LO laser to mix and observe active channels, and also uses RF detection for modulation and looking for occupied channels.

In some embodiments, a specific connection routine for receiver scanning, transmitter setting, and wait states for far side connections to be established is used. This includes particular frames that allow a fast and slow technique for the tunable laser to establish connections without the complex protocols. The procedure to avoid contention is similar to legacy low-layer Ethernet copper connection management and collision avoidance techniques. However, in embodiments of the method according to the present teaching, these techniques are applied to coherent optical links propagating multiple wavelengths.

Steps of a method for establishing a hardware configured link comprising non-filtered splitters and coherent transceivers according to the present teaching generally include a step of searching for occupied channels and CW-LO signals by tuning a LO in a coherent receiver. The method also includes a step of modulating on an optical signal with a coherent transmitter, and a scan of CW-LO channels with a particular time sequence. Other steps include determining occupied channels and removing those channels from the transmitter scan of CW-LO channels in subsequent scans, determining at a transceiver pair a channel with which to establish a link based on an overlap of a CW-LO channel and receipt of an unmodulated LO carrier that mixes with a particular LO channel in the receiver, and RF modulating on the determined channel to establish a link. As will be clear to those skilled in the art from the example descriptions of operation of the method below, these steps can be performed separately or some or all can be performed simultaneously in various embodiments of the present teaching. The steps can also be implemented in some or all of the transceivers connected to a particular link, and these steps on various transceivers can be performed separately or simultaneously.

Referring back to FIGS. 30A-B, an optical spectrum 3000 of a transmitter with RF amplifiers turned off is shown as differentiated from an optical spectrum 3020 of a transmitter with RF amplifiers turned on are shown. To produce a spectrum 3000, the RF amplifiers are turned off, resulting in a single CW carrier signal spectrum. The SOA is turned on and in an "up" state. To produce a spectrum 3020, RF amplifiers are turned on, providing data modulation on the CW carrier, and allowing data to flow over the link. This feature of determining the difference between a received spectrum 3020 with modulation bandwidth and a CW LO spectrum 3000 that does not have modulation bandwidth, is used by the transceivers to both avoid using an occupied channel and to establish the channel for initiating a link as further described below. This differentiation capability is easily accomplished, for example, using the detection, mixing and processing available in a standard telecom receiver.

Figure 33C:
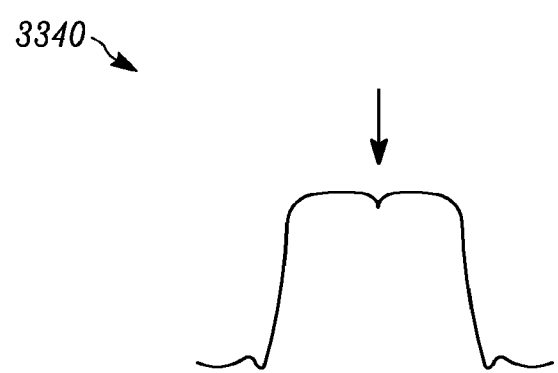
FIG. 33C illustrates a spectrum for a transceiver with RF modulation after successful completion of a connection according to an embodiment of a method using a connection protocol of the present teaching.

FIG. 33A illustrates a spectral time sequence 3300 of a transceiver in the tuning state with no RF modulation according to an embodiment of a method of connection protocol of the present teaching. The far end transceiver tunes the LO at the receiver to mix with incoming signals, thereby searching for occupied channels. FIG. 33B illustrates a spectral time sequence 3320 showing how a transceiver with no RF modulation tunes with a wait time between sequences to avoid collision according to an embodiment of a method using a connection protocol of the present teaching. Each start wavelength 3322 repeats with a particular period 3324 in a given transmitter to eliminate collisions between the other transmitters that are hooked onto the near side of the link. FIG. 33C illustrates a spectrum 3340 for a transceiver with RF modulation after successful completion of connection in a method of connection protocol according to the present teaching. The near end transmitter is on and the link is established and client data traffic is being sent across the link.

One feature of the present teaching is that the timing sequence for the LO fast scan used for search tuning and the slow scan tuning can be configured to achieve various objectives. For example, one objective is to allow a single laser in a transceiver package to perform both a LO fast scan used for search using the transceiver receiver and to perform the LO slow tuning that is transmitted to the other transceiver to determine wiring connectivity and wavelength channel for the connection. Other objectives include scalability with channel count. For example, the timing sequence should allow for a rapid convergence to a particular link connection and wavelength channel even if the channel count is small, and yet be able to search over a relatively large number of channels. For example, the system may operate with as few as one or two channels, up to as many as 16 channels in various embodiments. In principal, the present teaching is not limited to a particular number of channels. It is desirable that embodiments of the present teaching converge rapidly for a variety of channel counts. As a result, the present teaching is compatible with various timing sequences, including those described in detail herein.

Figure 34A:
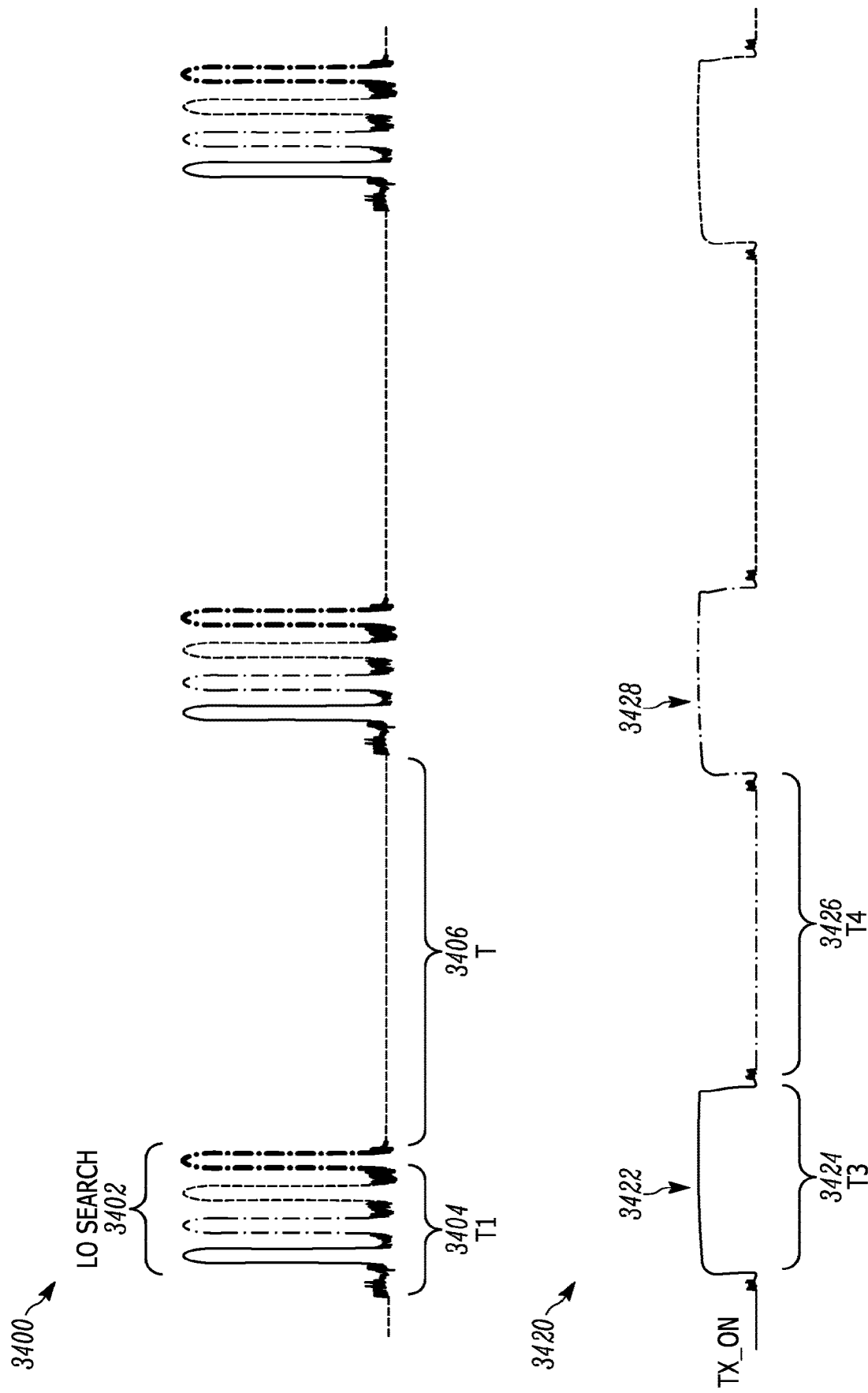
FIG. 34A illustrates spectral time sequences related to states of the search and connection steps according to embodiments of a method using a connection protocol of the present teaching.

FIG. 34A illustrates spectral time sequences 3400, 3420 related to states of the search and connection steps of embodiments of a method of connection protocol according to the present teaching. The different line types represent different spectral components for different wavelength channels. A LO search step that uses a generated fast scan 3402 with spectral time sequence 3400 is used to determine occupied channels as described herein. The spectral time sequence 3400 is generated by a local oscillator laser in a receiver and is not transmitted down the link. The fast scan, as described earlier, comprises a scan of the wavelength channels in the system with a relatively short duration of a dwell time per channel, and a complete channel scan time that is the time to step through each channel. This generated fast scan signal is used within the transceiver in which it is generated. Specifically, the generated fast scan signal is mixed with incoming signals to the receiver. The LO search step mixes in the receiver mixer the LO scanned spectral time sequence 3400 with any light that is present at the input to the far-side receiver and detects the optical signal from the mixer. The receiver mixer only produces a mixed receive signal when the LO wavelength channel produced by the receiver is coincident with a wavelength channel of an optical signal input to the receiver. Thus, a detected signal is only produced when the wavelength channel of an optical signal at an input of the mixer is coincident with an LO wavelength channel produced by the receiver laser. The detected signal at the coincident wavelength is further analyzed to determine its modulation bandwidth.

A spectral time sequence 3400 of a LO search step is shown where the far-side transceiver uses a fast scan of the receiver LO that includes a short duration scan through each of a predetermined number of channels to produce fast scan 3402. For example, in some embodiments, four channels are scanned, as shown in the figure. In general, the number of channels scanned is based on the characteristics of the splitter used. For example, a 1×4 splitter would equate to the four-scanned-wavelength embodiment. Larger port splitter sizes would support more wavelengths.

The modulation bandwidth of the detected mixed signal is used to identify the optical signal at the input of the receiver. A large modulation bandwidth is indicative of an occupied channel. In contrast, a continuous wave local oscillator signal does not have an appreciable modulation bandwidth. Therefore, a relatively small or negligible modulation bandwidth is indicative of a continuous wave local oscillator signal.

Using the measured modulation bandwidth of a mixed signal allows the system to identify a transmitter channel that can form a link connection between a pair of transceivers. The unmodulated signals for identifying link channels are differentiated in the receiver from occupied channels because they do not have modulation bandwidth. Thus, RF detection on the far-side receiver indicates which channels are already occupied with coherent modulation because they exhibit RF modulation bandwidth. If an occupied channel is identified, any occupied channel is dropped from the subsequent long duration, TX_ON state, scan. However, all channels are typically scanned in the LO search step. This scan allows determination of whether channels or fibers are disconnected. In some embodiments, the LO search step T1

3404 is of a duration to support on the order of 100 ms per channel and the system scans four channels. Thus, for n=4, T1=400 ms. In some embodiments, the LO search step interval, T 3406, is on the order of 2*m*T1, where m=unoccupied channels. Thus, the interval, T 3406, reduces as channels are determined to be occupied.

In a TX_ON state, the transmitter turns on with a CW unmodulated LO signal for unoccupied channels, thereby initiating a LO slow scan spectral time sequence 3420. The wavelength channel dwell duration, T3 3424, and scan interval, T4 3426, of the scan of the CW LO signals through the channels is set to avoid collisions with other transmitters and to ensure overlap with the receive LO search fast scan on the receive side of the link. In the embodiment of the method shown in FIG. 34A, the near-side transmitter scans a CW LO signal through a first wavelength channel 3422 for a duration T3 3424. In some embodiments, the time T3 3424 is on the order of 3 times T1 3402. The near-side transmitter waits a period T4 3426 before changing to the next wavelength channel 3428. T4 3426 may be a random time. In some embodiments, the time T4 3426 is on the order of 2*n+/−rand*T1, where rand=random time up to n*T1. The random time between different channels sent to the far-side transceiver is to enable the closure of connections, and overlap of the LO search. As channel number increases, one key is to keep T1 short to increase link closure time.

Figure 34B:
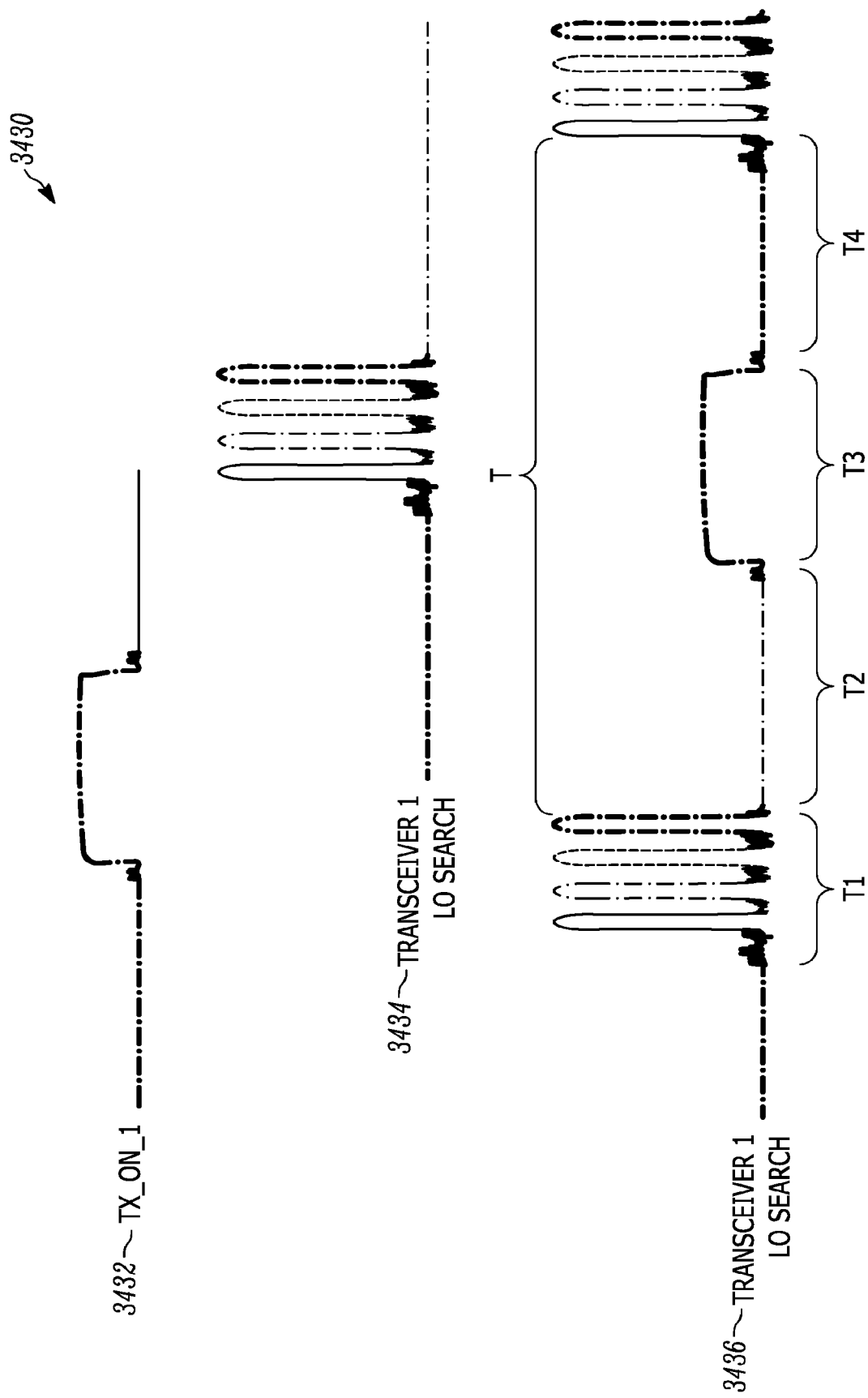
FIG. 34B illustrates spectral time sequences related to states of a transceiver and associated LO laser according to embodiments of a method using a connection protocol of the present teaching.

FIG. 34B illustrates spectral time sequences 3430 related to states of a transceiver and associated LO laser according to embodiments of a method using a connection protocol of the present teaching. The transceiver uses a single laser for both LO search and far end communication across the fiber link. The LO search occurs in some embodiments when LOS is asserted in the transceiver. Trace 3432 illustrates the LO sending a slow scan of LO signal across the link, where one period of transmission of one wavelength channel is shown. The transceiver LO search fast-scan is illustrated in trace 3434. The local receiver scans the possible channels using the fast sequence to determine if a signal is present on any channel incoming to the receiver. Trace 3436 shows a composite view of the use of a particular LO laser for the combination of receiver search and far end communication. LO search fast scan occupies a time duration T1, followed by an interval T before the slow-scan channel is transmitted. The transmitted channel slow scan dwells for duration T3 and then there is a wait interval, T4.

In some embodiments, T1 is a duration that allows a short pulse for each channel to be scanned in the LO search fast scan. Time T3 is equal to three times T1. Time T is equal to 2 times the number of channels times T1, T2 is T1 plus the number of channels times a random number times T1, where the random number is between zero and 0.99. Time T4 is T minus the sum of T2 plus T3. For example, if the channel count is four: T1=100 ms, T=800 ms, T3=300 ms, 100 ms<T2<396 ms, and 104 ms<T4<400 ms. As another example, for a channel count of three: T1=100 ms, T=600 ms, T3=300 ms, 100 ms<T2<297 ms, and 3 ms<T4<400 ms.

The illustration of the timing sequence of FIG. 34B in trace 3436 shows how it is possible to execute both the receive LO search fast scan and the transmitted slow channel scan with a single laser in the transceiver.

Figure 35:
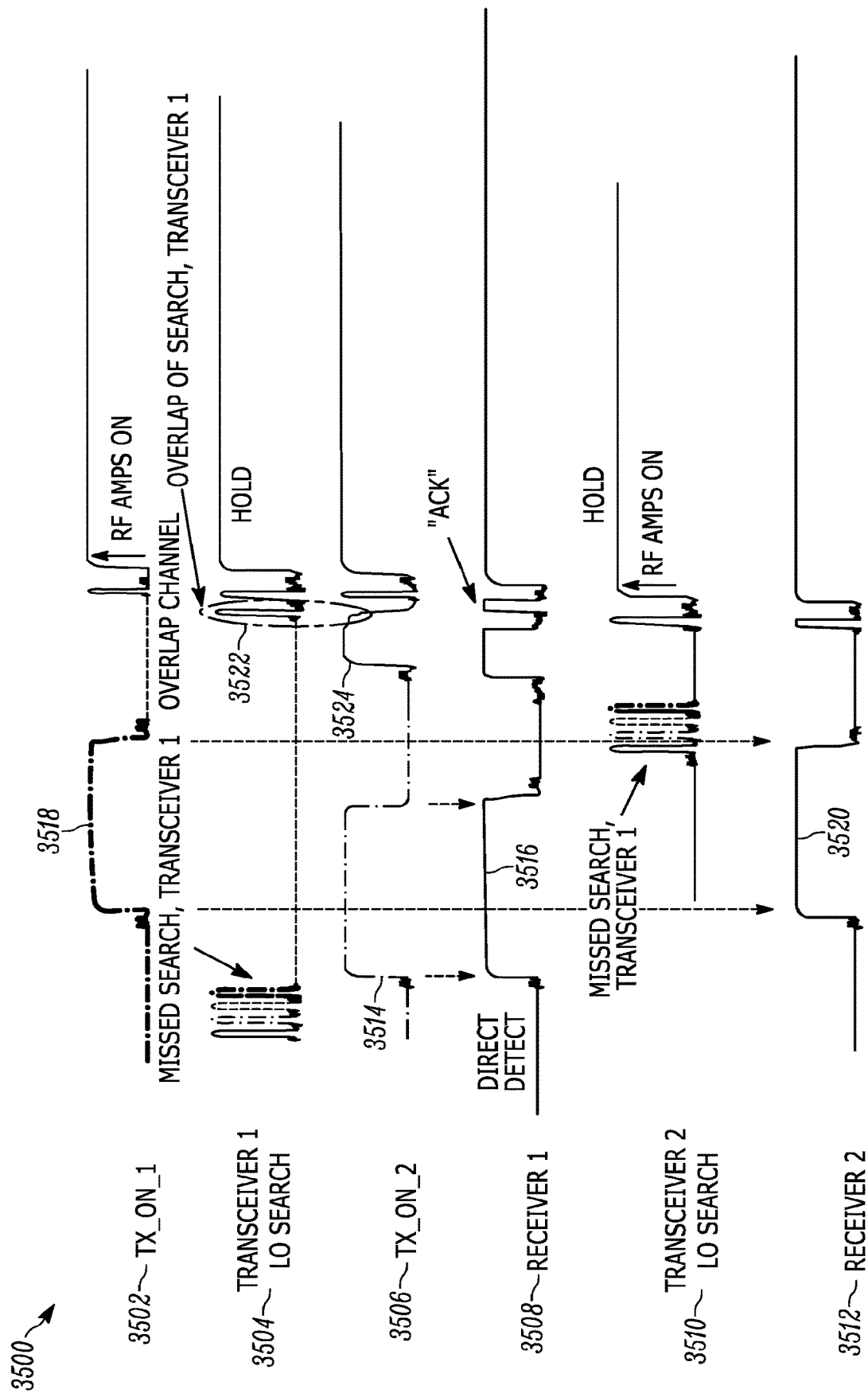
FIG. 35 illustrates a set of time sequences according to an embodiment of a method using a connection protocol of the present teaching for a non-filtered optical link that shows search and detection.

FIG. 35 illustrates a set of time sequences 3500 according to an embodiment a method using a connection protocol of the present teaching for a non-filtered optical link that shows search and detection. The time sequences 3500 include both spectral sequences and direct detect time sequences as appropriate. The same use of different line type for different wavelength channel is utilized in FIG. 35 as FIGS. 34A-B.

An illustration of a TX_ON_1 state spectral time sequence trace 3502 is shown where a slow scan sequence is initiated at ON state for the near-side transceiver, also referred to as transceiver 1. The spectral sequence associated with the LO search in transceiver 1 is illustrated in trace 3504. Note as described in connection with FIG. 34A-B, in some embodiments, a single laser LO may produce both the tuned sequences illustrated in traces 3502, 3504. A TX_ON_2 state spectral time sequence trace 3506 is also shown with an ON state for the far-side transceiver, also referred to as transceiver 2. The time received power from direct detection is illustrate in direct detect time sequence trace 3508. The spectral sequence associated with the LO search in transceiver 2 is illustrated in trace 3510. The direct detect time sequence for receiver in transceiver 2 is illustrated in trace 3512.

Both transmitters initiate a search sequence when they power ON, shown at the start of time sequence traces 3504 and 3510. Note that the designation "near-side" and "far-side" is for clarity of description only to distinguish two sides of the link. The system works bidirectionally, and without any particular designation of a near side and/or a far side of a link.

In operation, when transceiver 2 begins sending the optical signal 3514 slowly scanning through the channels and transmitting them to the link using its spectral time sequence of trace 3506, the direct detection in the near-side receiver detects light 3516 as shown in trace 3508 but the particular channel is not distinguished. Likewise, when the near-side transceiver begins sending the optical signal 3518 in a slow scan through the channels in its spectral time sequence 3502, the direct detection in the far-side receiver spectral time sequence 3512 detects light 3520 but the particular channel is not distinguished. However, the next tuned channel 3524 in the slow scan from transceiver 2 is picked up by receiver in transceiver 1. This is shown at the area 3522, which shows the overlap of the slow scanned channel 3524, and the match with the LO search fast scan channel in trace 3504. Thus, when the scan of LO search in transceiver 1 overlaps with the matching LO channel 3524 from the slow scan from transceiver 2, this channel is selected. An "ACK" pulse is generated. Transceiver 1 and transceiver 2 turn on RF modulation on this channel and the link is then established. After any RF amplifiers are turned on for a particular channel, that particular channel is now "UP" and the channel is dropped from subsequent LO searches.

Figure 36A:
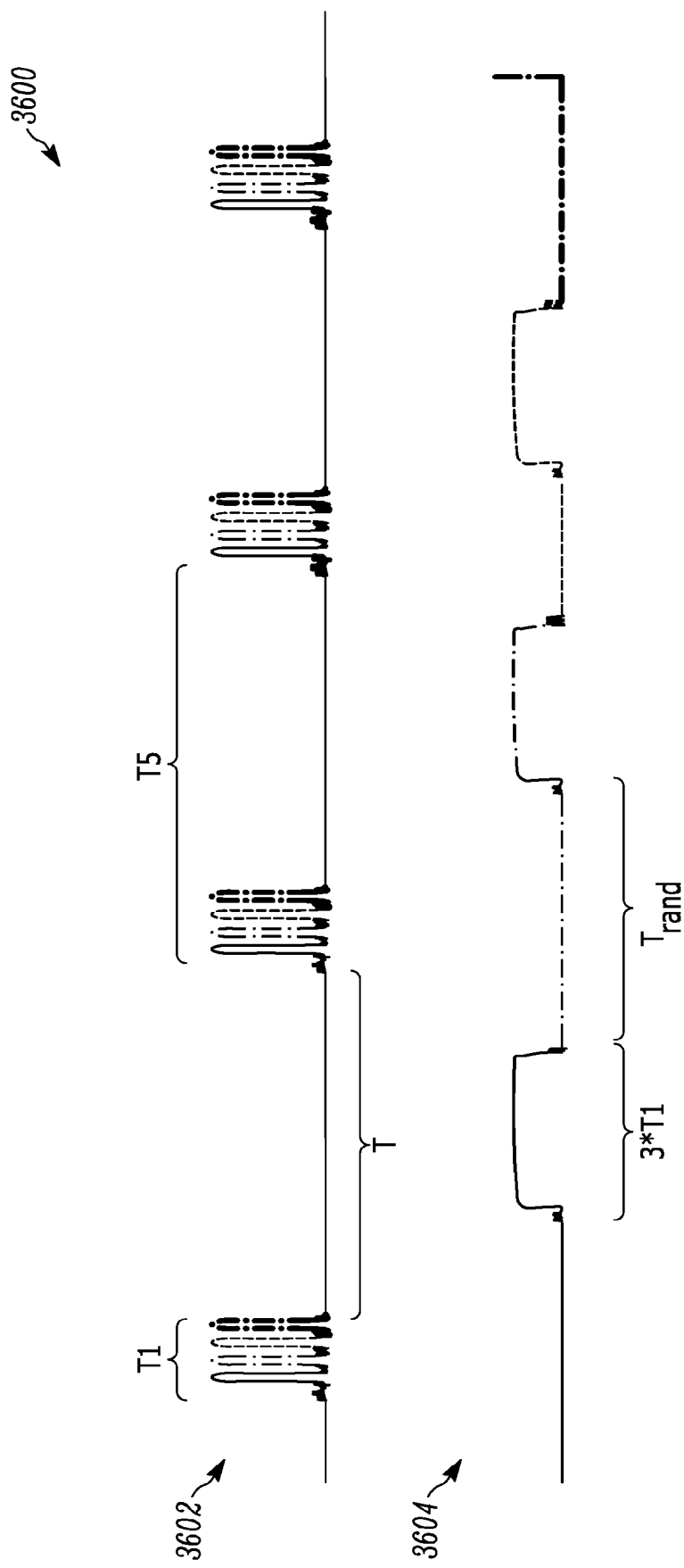
FIG. 36A illustrates spectral timing diagrams of an embodiment of a method of link establishment for a coherent link with a non-filtered passive splitter/combiner of the present teaching.
Figure 36B:
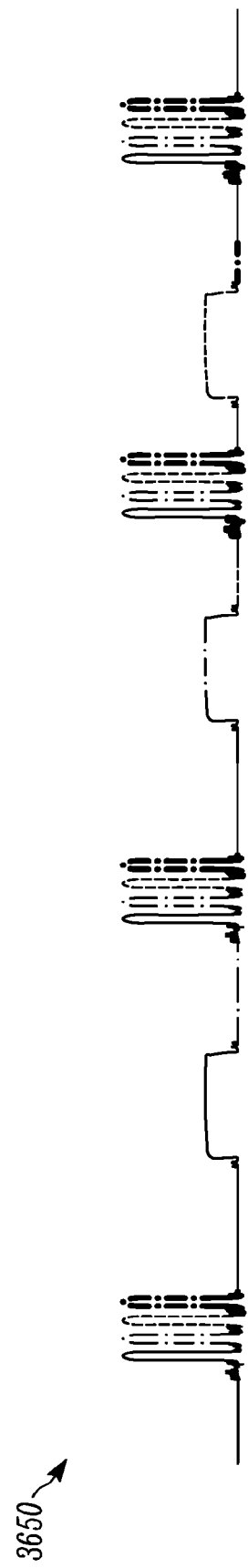
FIG. 36B illustrates a combined spectral timing diagram of the embodiment of a method of link establishment for a coherent link with a non-filtered passive splitter/combiner of FIG. 36A.

The framing sequence associated with the intervals T1, T, T3 and T4 described for the search scan of the unmodulated channels that was described in connection with FIG. 34A prevents collisions or duplication of channel overlaps. FIG. 36A illustrates spectral timing diagrams 3600 of an embodiment of a method of link establishment for a coherent link with a non-filtered passive splitter/combiner according to the present teaching. The LO search trace 3602 shows the timing is characterized by a search interval T1, and an interval between searches T. The LO fast scan search sequence has a period, T5=T1+T. The slow scan trace 3604 shows the timing is characterized by the duration of the dwell time on the slow-scan channel, 3*T1, and the interval until the next channel is tuned at a random time, $T_{rand}$, which is chosen to avoid collision with the LO search fast scan. For example, $T_{rand}$ may be the same as T4 as described in connection with FIG. 34A-B. FIG. 36B illustrates a combined spectral timing diagram 3650 of the embodiment of a method of link establishment for a coherent link with a non-filtered passive splitter/combiner of FIG. 36A. FIG.

36B illustrates how the timing allows a single laser to switch between the local oscillator receive search of LO fast scan that is used to search for incoming channels, and the transmitted slow scan signals because there is no overlap of the channel transmissions. That is, since T is fixed relative to T1, and the LO turns on for one side of the link for 3*T1 during a slow scan channel dwell time, and this occurs at $T_{rand}$, the probability of overlap to close the link is increased.

An important feature of the system and method for configuring optical links and other hardware configured optical network elements is the use of both a slow wavelength scan and a fast wavelength scan to exchange information between elements. The relative timing of these scans allows the elements to recognize each other and also to determine various other aspects of the link configuration, thereby allowing, for example, link establishment and sending of client data traffic over the link as well as communications of other element configuration information. As such, the present teaching describes wavelength scans that include slow scans and fast scans that are used together to support various embodiments of protocols for link setup. The wavelength scans are scans of the wavelength channels in a particular system that are characterized by a particular dwell time on each channel as well as a complete channel scan time that is the time it takes to scan through all the channels of the system given the particular dwell time per channel. One important feature to ensure convergence of the protocols is the relative timing of the slow scan and the fast scan. In general, a slow scan is a scan in which a duration of a dwell time on a particular wavelength channel is as long or longer than a duration of a complete scan of wavelength channels in a fast scan.

Slow scan and fast scan timing parameters are chosen such that based on detection of slow scan and fast scan signals, and determination of the duration of the detected light, the elements in the link can be configured. For example, in a link with two transceivers, the detecting of a pulse of light having the duration that is equal to the dwell time on the particular wavelength channel of a fast scan and the detecting of a signal from the link that has a duration that is equal to a dwell time on a particular wavelength channel of a slow scan allows transceivers on two sides of a link to automatically configure the link and send client data traffic. Various embodiments of the system determine the detection of a pulse of light having the duration that is equal to the dwell time on the particular wavelength channel of a fast scan and the detected signal from the link that has a duration that is equal to a dwell time on a particular wavelength channel of a slow scan in various ways as described herein.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. An optical transceiver comprising:
   a) a tunable transmitter having an electrical input and an optical output, the tunable transmitter configured to generate one of 1) an optical transmit signal at the optical output to perform a slow scan of wavelength channels with a first dwell time per channel and 2) an optical transmit signal at the optical output to perform a fast scan of wavelength channels with a second dwell time per channel, the first dwell time being longer than the second dwell time;
   b) a receiver having an electrical output and an optical input that receives an optical receive signal; and
   c) a processor having an input connected to the electrical output of the receiver and an output connected to the electrical input of the tunable transmitter,
   wherein the processor determines properties of the optical receive signal and instructs the tunable transmitter to generate the optical transmit signal having the fast scan of wavelength channels with the second dwell time per channel in response to the determined properties.

2. The optical transceiver of claim 1 wherein the receiver comprises a direct detection receiver.

3. The optical transceiver of claim 1 wherein the receiver comprises a coherent receiver.

4. The optical transceiver of claim 1 wherein the determined properties comprise a detection of optical power in the receiver.

5. The optical transceiver of claim 1 wherein the determined properties comprise a detection of the optical receive signal that exceeds a predetermined power threshold.

6. The optical transceiver of claim 1 wherein the determined properties comprise a detection of the optical receive signal that exceeds a predetermined duration.

7. The optical transceiver of claim 6 wherein the predetermined duration comprises a duration greater than 10 ms.

8. The optical transceiver of claim 1 wherein the determined properties comprise a loss-of-signal (LOS) indication.

9. The optical transceiver of claim 1 wherein the processor instructs the tunable transmitter to generate the optical transmit signal having the slow scan of wavelength channels upon startup of the transceiver.

10. The optical transceiver of claim 1 wherein the processor instructs the tunable transmitter to generate the optical transmit signal having the slow scan of wavelength channels upon power on of the transceiver.

11. The optical transceiver of claim 1 wherein the processor instructs the tunable transmitter to generate the optical transmit signal having the slow scan of wavelength channels subsequent to an idle state of the transceiver.

12. The optical transceiver of claim 1 wherein the processor instructs the tunable transmitter to generate the optical transmit signal having the slow scan of wavelength channels upon a loss-of-signal (LOS) indication.

13. The optical transceiver of claim 1 wherein the processor instructs the tunable transmitter to generate the optical transmit signal having the slow scan of wavelength channels upon completion of the fast scan of wavelength channels.

14. The optical transceiver of claim 1 wherein the tunable transmitter is further configured to have a HOLD state stopping the scan at a current wavelength channel and wherein the processor instructs the tunable transmitter to enter the HOLD state upon a determination that the optical receive signal exceeds a threshold.

15. The optical transceiver of claim 14 wherein the threshold comprises a power threshold.

16. The optical transceiver of claim 14 wherein the threshold comprises a duration threshold.

17. The optical transceiver of claim 14 wherein the processor instructs the tunable transmitter to generate a transmission of live traffic subsequent to entering the HOLD state.

18. The optical transceiver of claim 1 wherein at least one of the slow scan of wavelength channels and the fast scan of wavelength channels comprises a scan through wavelength channels of the ITU grid.

19. The optical transceiver of claim 1 wherein at least one of the slow scan of wavelength channels and the fast scan of wavelength channels comprises a scan through a predetermined number, N, of wavelength channels.

20. The optical transceiver of claim 1 wherein the tunable transmitter is further configured to have a BEACON state with a dwell time at the current wavelength channel that is shorter than the first dwell time per channel.

* * * * *